United States Patent
Nomura et al.

(10) Patent No.: US 12,552,492 B2
(45) Date of Patent: Feb. 17, 2026

(54) VEHICLE CONTROL METHOD

(71) Applicant: HONDA MOTOR CO., LTD., Tokyo (JP)

(72) Inventors: Naoki Nomura, Saitama (JP); Hirotaka Onuki, Saitama (JP); Makoto Hattori, Saitama (JP); Masayuki Sunamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 236 days.

(21) Appl. No.: 18/281,184

(22) PCT Filed: Mar. 10, 2022

(86) PCT No.: PCT/JP2022/010603
§ 371 (c)(1),
(2) Date: Sep. 8, 2023

(87) PCT Pub. No.: WO2022/191285
PCT Pub. Date: Sep. 15, 2022

(65) Prior Publication Data
US 2024/0149974 A1 May 9, 2024

(30) Foreign Application Priority Data

Mar. 10, 2021 (JP) .................. 2021-038636

(51) Int. Cl.
*B62M 6/50* (2010.01)
(52) U.S. Cl.
CPC .................. *B62M 6/50* (2013.01)
(58) Field of Classification Search
CPC . B62M 6/50; B62M 6/55; B62M 25/08; B62J 45/412; B62J 45/413; B62J 43/20; B62J 50/22; G01M 17/007; G06Q 50/04
See application file for complete search history.

(56) References Cited

U.S. PATENT DOCUMENTS 6,591,929 B1 7/2003 Tsuboi et al.
11,511,827 B2 * 11/2022 Nomura ................. B62M 11/04
(Continued)

FOREIGN PATENT DOCUMENTS

DE 102019115312 B3 11/2020
EP 4029769 A1 7/2022
(Continued)

OTHER PUBLICATIONS

JP 2019165698 A with English translation; date filed Mar. 26, 2018; date published Oct. 3, 2019. (Year: 2019).*

(Continued)

*Primary Examiner* — Calvin Cheung
(74) *Attorney, Agent, or Firm* — Paratus Law Group, PLLC

(57) ABSTRACT

A vehicle management method includes assembling a vehicle body of a vehicle and a power source to be mounted on the vehicle, acquiring, at a first time, first gear-ratio-related information which is information related to a gear ratio of a transmission section, the transmission section being a whole or part of a power transmission mechanism between the power source and a wheel of the vehicle, storing the first gear-ratio-related information in a storage unit mounted on the vehicle or a storage unit of an external device provided to be capable of communication with the vehicle, acquiring, at a second time after the first time, second gear-ratio-related information which is information related to the gear ratio of the transmission section, and comparing the first gear-ratio-related information stored in the storage unit with the second gear-ratio-related information.

23 Claims, 30 Drawing Sheets

(56) References Cited

U.S. PATENT DOCUMENTS

| | | | |
|---|---|---|---|
| 2012/0226400 A1 | 9/2012 | Hsu et al. | |
| 2015/0345620 A1* | 12/2015 | Watarai | B62M 11/16 701/52 |
| 2016/0101827 A1* | 4/2016 | Usui | B62M 25/08 701/51 |
| 2016/0321845 A1 | 11/2016 | Maeda et al. | |
| 2022/0089251 A1 | 3/2022 | Nomura et al. | |

FOREIGN PATENT DOCUMENTS

| | | |
|---|---|---|
| JP | H07-002164 A | 1/1995 |
| JP | H11-005583 A | 1/1999 |
| JP | 2000-006875 A | 1/2000 |
| JP | 2000-280972 A | 10/2000 |
| JP | 2001-039377 A | 2/2001 |
| JP | 2002-240772 A | 8/2002 |
| JP | 2013-043528 A | 3/2013 |
| JP | 2016-157167 A | 9/2016 |
| WO | WO 2015/111395 A1 | 7/2015 |
| WO | WO 2021/049646 A1 | 3/2021 |

OTHER PUBLICATIONS

May 24, 2022, Translation of International Search Report issued for related PCT Application No. PCT/JP2022/010603.

Mar. 24, 2025, European Search Report issued for related EP Application No. 22767239.1.

May 24, 2022, translation of International Search Opinion issued for related PCT Application No. PCT/JP2022/010603.

Jul. 1, 2025, European Search Report issued for related EP Application No. 22767239.1.

Robert Bosch GMBH, Bosch Diagnostic Tool Manual, Retrieved from; URL:https://www.jasma.pt/documentos/Agentes/SCOTT/2021/Bosch%20info/User%20Manual%20IBD%20eng.pdf, Dec. 31, 2020, pp. 1-53.

Anshul Srivastava, E-Bike Manufacturing, Quality Control & In-Process Inspections, Retrieved from; URL: https://proqc.com/blog/e-bike-manufacturing-quality-control-in-process-inspections/, Oct. 13, 2020, pp. 1-5.

* cited by examiner

FIG. 21 [VEHICLE DATA ACQUISITION PHASE (AT TIME OF ASSEMBLING)]

[TRAVEL DATA ACQUISITION PHASE (AFTER ASSEMBLING)]

[FLOW AT TIME OF ASSEMBLING]

[FLOW AT TIME OF ASSEMBLING CHECK]

FIG. 27

PHOTOGRAPH
(ENTIRE PHOTOGRAPH)

PHOTOGRAPH
(VEHICLE BODY NUMBER)

CHECK ITEMS

1. IS THERE NO LOOSENESS OR DAMAGE IN ASSIST UNIT? ☑
2. DOES ASSIST FUNCTION PERFORM NORMALLY? IS THERE NO STRANGE NOISE? ☑
3. IS THERE NO GREASE LEAKAGE FROM ASSIST UNIT? ☑
4. IS THERE NO LOOSENESS OR DAMAGE IN CONNECTION PORTION OF ELECTRIC WIRING? ☑
5. IS THERE NO DISCONNECTION OF CORD? IS ASSEMLING STATE TO FRAME APPROPRIATE? ☑
6. DOES BATTERY LOCK KEY OPERATE? ☑
7. IS ASSEMBLING SATTE OF BATTERY RELIABLE? ☑
8. IS DISPLAY LAMP TURNED ON? IS THERE NO ABNORMALITY DISPLAYED? ☑
9. DOES DRAINING OF BATTERY BECOME FASTER? ☑
10. IS IT IN MAXIMUM GEAR STAGE? ☑

QUALIFIED
(PLEASE PERFORM OPERATION CHECK AND GEAR RATIO ACQUISITION)
[2022/04/25  11:30:30]

[FLOW AT TIME OF OPERATION CHECK]

VEHICLE CONTROL METHOD

CROSS REFERENCE TO PRIOR APPLICATION

This application is a National Stage Patent Application of PCT International Patent Application No. PCT/JP2022/010603 (filed on Mar. 10, 2022) under 35 U.S.C. § 371, which claims priority to Japanese Patent Application No. 2021-038636 (filed on Mar. 10, 2021), which are all hereby incorporated by reference in their entirety.

TECHNICAL FIELD

The present invention relates to a vehicle management method.

BACKGROUND ART

An electric assist bicycle has been known which assists a stepping force of a crank pedal with power of a motor (for example. Patent Literature 1). In the electric assist bicycle, an upper limit value of an assist force and an upper limit value of an assist ratio with respect to a vehicle speed are established in the regulations. For example, the following are established in the regulations of Japan.

"In a case where a bicycle is caused to travel at a speed of less than 24 kilometers per hour, a ratio of a force for compensating a force of a person by using a motor with respect to the force of the person is equal to or less than a numerical value determined in (1) or (2) according to a classification of the speed listed in (1) or (2).

(1) Speed less than 10 kilometers per hour: 2
(2) Speed of equal to or more than 10 kilometers per hour and less than 24 kilometers per hour: a numerical value obtained by calculations of subtracting 10 from a numerical value indicating a travel speed by kilometers per hour, then dividing the obtained numerical value by 7, and further subtracting the newly obtained numerical value from 2"

That is, according to the regulations of Japan, the upper limit value of the assist ratio with respect to the vehicle speed is required to be 2 until the vehicle speed reaches 10 km/h, and the assist ratio is required to be gradually decreased from 2 to 0 when the vehicle speed changes from 10 km/h to 24 km/h, as indicated by a solid line in FIG. 2. The electric assist bicycle is assumed to be sold as a completed vehicle. That is, the following features are presented since the electric assist bicycle is sold as a completed vehicle.

(A) A torque sensor is built in an assist unit, and remodeling and improvement thereof are difficult. (B) A pulser is built in a wheel or in a gear part of a driving system, and a vehicle speed is estimated based on a rotation speed of the wheel or the gear part of the driving system, a gear ratio, and a circumferential length of the wheel. At this time, it is difficult to change a wheel size (increase a diameter), and it is difficult to remodel and improve the driving system.

In a completed vehicle, on the premise of these features, it is guaranteed that the vehicle speed is not faked and the assist ratio does not be deviated from the regulations.

On the other hand, there is also an electric assist unit which can be used in retrofitting an existing bicycle frame. For example, Patent Literature 2 discloses an electric assist unit which can be used in retrofitting an existing bicycle frame without making a large design change to the existing bicycle frame. The term "retrofitting" means assembling, later at a shop or the like, an assist device including an electric assist unit to a vehicle body (regardless of whether the vehicle body is brand new or used) which is not sold as an electric bicycle by a vehicle body manufacturer (maker).

CITATION LIST

Patent Literature

Patent Literature 1: JPH11-005583A
Patent Literature 2: JP2001-039377A

SUMMARY OF INVENTION

Technical Problem

It is also naturally necessary for an electric assist unit, which can be used in retrofitting, to be in compliance with the regulations. Since a torque sensor is built in the electric assist unit for retrofitting, it is unlikely to change an assist force. On the other hand, regarding the electric assist unit for retrofitting, a relationship between a rotation speed of a motor or a crank and a vehicle speed can be easily changed by changing settings of an assembling target bicycle or the electric assist unit, and accordingly, there is a risk that regulation compliance of an assist ratio cannot be ensured. This may occur not only in the electric bicycle but also in a vehicle for which an assist ratio with respect to a vehicle speed is established by the regulations. In addition, even in the case of an electric bicycle sold as a completed vehicle, it is preferable to manage a regulation compliance state thereof.

The present invention provides a vehicle management method capable of managing a regulation compliance state of a vehicle.

Solution to Problem

The present invention provides a vehicle management method, the method including:
  assembling a vehicle body of a vehicle and a power source to be mounted on the vehicle;
  acquiring, at a first time, first gear-ratio-related information which is information related to a gear ratio of a transmission section, the transmission section being a whole or part of a power transmission mechanism between the power source and a wheel of the vehicle;
  storing the first gear-ratio-related information in a storage unit mounted on the vehicle or a storage unit of an external device provided to be capable of communication with the vehicle;
  acquiring, at a second time after the first time, second gear-ratio-related information which is information related to the gear ratio of the transmission section; and
  comparing the first gear-ratio-related information stored in the storage unit with the second gear-ratio-related information.

Advantageous Effects of Invention

According to the present invention, by comparing the first gear-ratio-related information and the second gear-ratio-related information acquired at different times, it is possible to manage the remodeling and improvement after the assembling, which may cause a regulation non-compliance state.

BRIEF DESCRIPTION OF DRAWINGS

FIG. 27 is a diagram illustrating an example of assembling check items displayed on a store tablet 60.

DESCRIPTION OF EMBODIMENTS

Hereinafter, an electric bicycle management method will be described with reference to the drawings as an example of an embodiment of a vehicle management method of the present invention.

<Correlation Between Parties>

Figure 1:
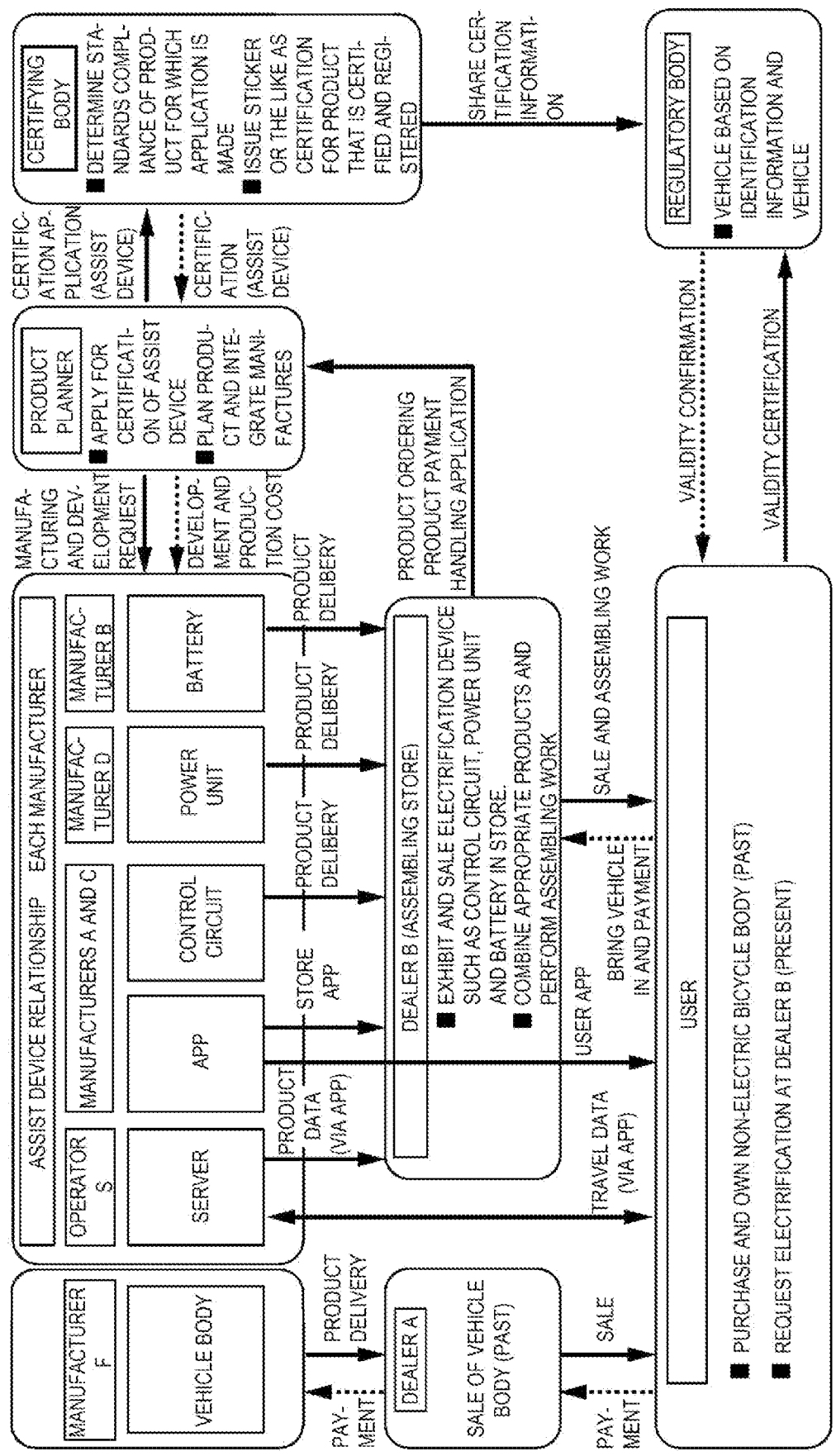
FIG. 1 is a diagram illustrating a correlation between parties involved in an electric bicycle management method according to an embodiment of the present invention.

First, a description will be given of a correlation between parties involved in the electric bicycle management method. FIG. 1 is a party correlation diagram in which parties involved in the electric bicycle management method are summarized.

The parties involved in the electric bicycle management method include a plurality of manufacturers A, C, D. and B which manufacture parts of an assist device and the like, an operator S which operates a server, a manufacturer F which manufactures a vehicle body of a non-electric bicycle to which an assist device (a power unit, a control circuit, and a battery) is to be assembled, a dealer A which sells the vehicle body of the non-electric bicycle, a user (hereinafter, also referred to as a user) which purchases the non-electric bicycle from the dealer A, a dealer B which assembles the assist device to the non-electric bicycle in response to a request from the user, a product planner which performs product planning of the assist device and integrates the manufacturers A. C. D, and B and the operator S, a certifying body that determines standards compliance of the assist device or the electric bicycle to which the assist device has been assembled, and a regulatory body that regulates an illegal vehicle. The correlation of the parties is an example, and another party may be involved, and at least a part of the plurality of manufacturers A, C, D, and B and the operator S (hereinafter, may be referred to as a manufacturer or the like) may be integrated. The manufacturer, the user, and the product planner may be a natural person or a corporation, or may be an association, a financial group, a private organization, or the like without a juridical personality. In the following description, it is assumed that the certifying body determines the standards compliance of an electric bicycle to which an assist device has been assembled. Hereinafter, an electric bicycle corresponding to a combination certified and registered by the certifying body may be referred to as a certified vehicle.

The manufacturer F delivers a vehicle body of a non-electric bicycle to the dealer A and receives a payment. The dealer A sells the vehicle body of the non-electric bicycle to a user and receives a payment.

The user is a person who purchases a non-electric bicycle (a non-electric bicycle body) from the dealer A and owns the non-electric bicycle, and is a person who wants electrification of the non-electric bicycle. The user brings the vehicle body of the non-electric bicycle to the dealer B and requests electrification of the non-electric bicycle brought to the dealer B. The user makes a payment to the dealer B.

The product planner requests the manufacturers A, C, D, and B and the operator S to manufacture and develop various devices, and pays development and production costs.

The operator S develops, manufactures, and owns a server. The server collects, stores, and performs necessary processing and the like on information on the electric bicycle. The server communicates with a control circuit of the electric bicycle or a portable terminal of a user via a user app to exchange travel data and the like, and communicates with a computer (for example, a tablet terminal with a camera) of the dealer B via a store app to exchange vehicle data and the like. The server may be a distributed server including a plurality of server devices or a distributed virtual server (cloud server) created in a cloud environment. The server and the portable terminal are examples of an external device.

The manufacturer A develops an app (application software) for easily managing the electric bicycle, provides a user app to the user, and provides a store app to the dealer B.

The manufacturer C develops and manufactures a control circuit holding a control program, and delivers the control circuit to the dealer B. The manufacturer D develops and manufactures a power unit (power unit in FIG. 1) and delivers the power unit to the dealer B. The control circuit and the power unit may be delivered to the dealer B after being integrated by the manufacturer C, the manufacturer D, or the like before being delivered to the dealer B. or may be delivered to the dealer B separately and then integrated by the dealer B, or may be delivered to the dealer B separately and then assembled separately.

The manufacturer B develops and manufactures a battery and delivers the battery to the dealer B.

The dealer B exhibits and sells an assist device (an electrification device in the drawing) in a store, and performs assembling work by appropriately assembling the assist device to a non-electric bicycle brought in. The dealer B assembles the assist device to the non-electric bicycle, and then sells the electric bicycle to a user.

The product planner requests the manufacturers A, C, D, and B and the operator S to manufacture and develop various devices, and applies for a certification of the electric bicycle to the certifying body. It is preferable that the product planner applies for certifications of all combinations of the non-electric bicycle, the power unit, the control circuit, and the battery assumed in advance. For example, when there are ten combinations thereof, applications for ten types of electric bicycles are made. The certifying body determines the standards compliance of the electric bicycle for which an application is made, and issues a sticker or the like as a certification for a product which is certified and registered. The certifying body shares certification information with the regulatory body.

The regulatory body is, for example, the police, and regulates an illegal vehicle based on the certification information provided from the certifying body and a state of the electric bicycle.

Figure 20:
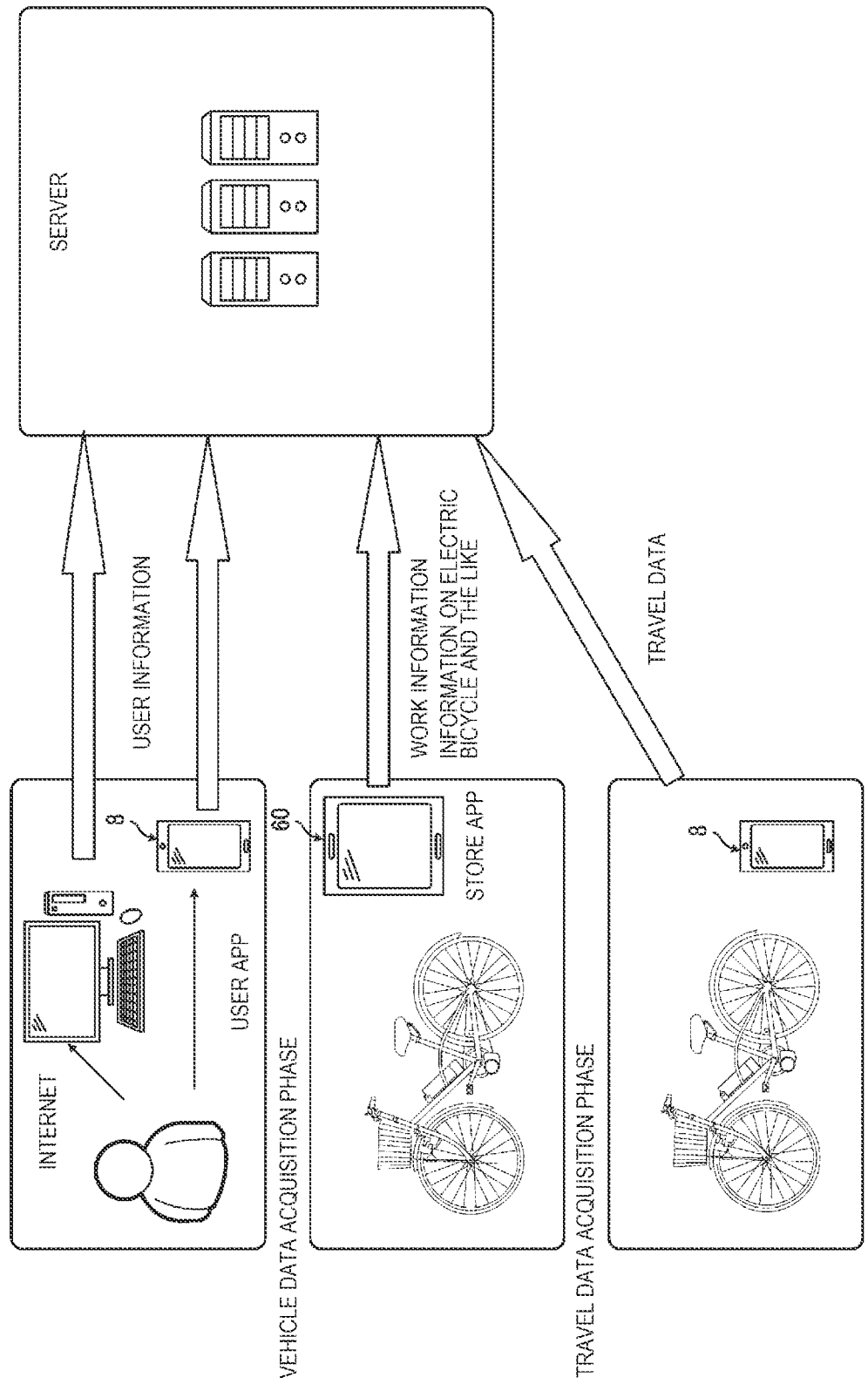
FIG. 20 is a diagram illustrating an information acquisition phase of a server.

The server is configured to be accessible from a personal computer owned by a user, a portable terminal 8 in which a user app is installed, a tablet in which a store app is installed (hereinafter referred to as a store tablet 60), and the like. As illustrated in FIG. 20, the server exchanges information with these information terminals in three phases.

A first phase is a user information acquisition phase. In the user information acquisition phase, the server acquires personal information (hereinafter also referred to as user information) input by the user via the user app or the like before the user uses the electric bicycle to which the assist device is assembled. The user information includes, for example, a name, an address, a mobile phone number, and a mail address of the user.

Figure 21:
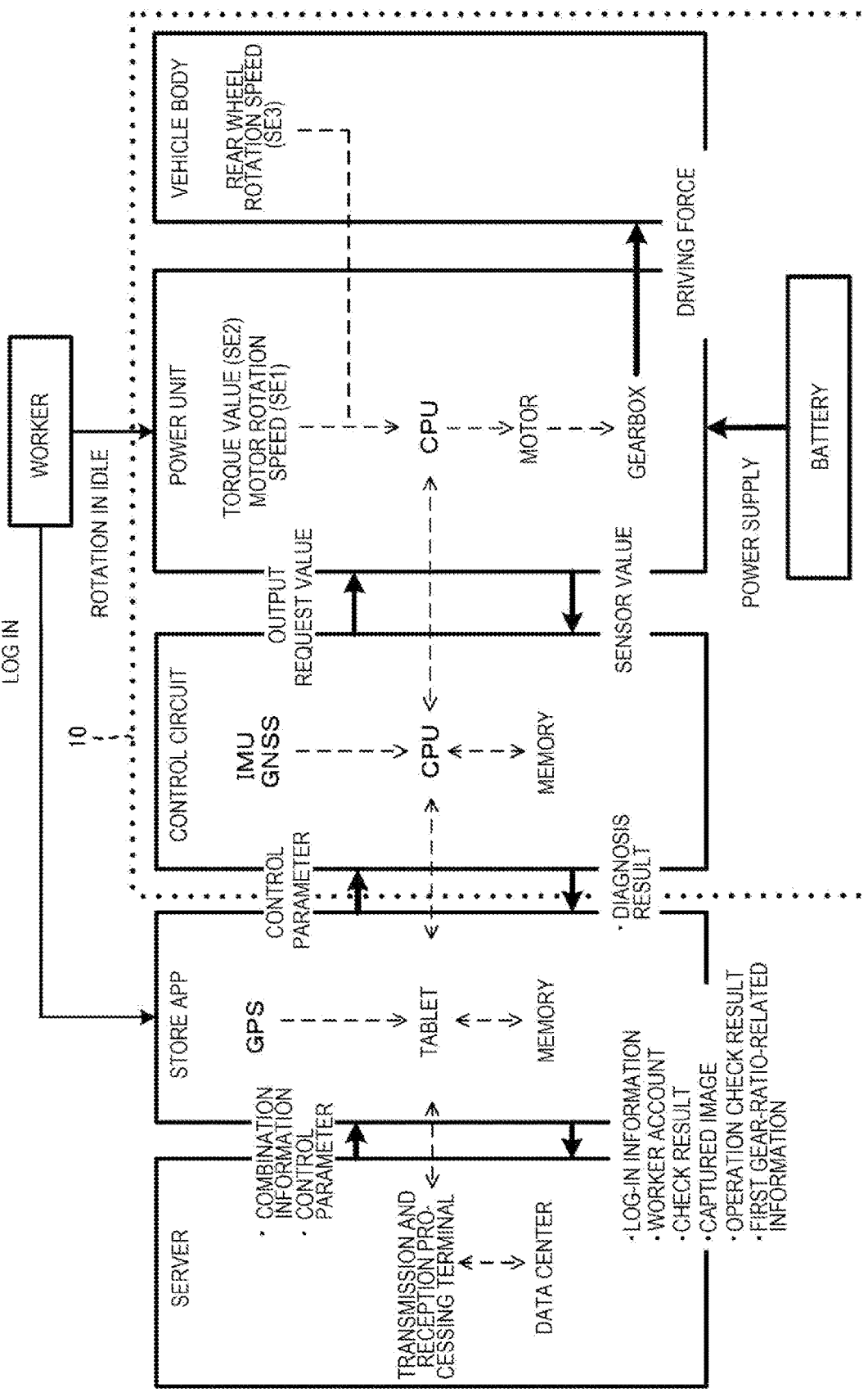
FIG. 21 is a diagram illustrating a relationship between devices in a vehicle data acquisition phase (at the time of assembling).

The second phase is a vehicle data acquisition phase. In the vehicle data acquisition phase, at the time of assembling the assist device at the dealer B, the server acquires, via the store app, a worker account, work information related to assembling work, or information related to a state of the vehicle body, the power unit, or the electric bicycle after being assembled. FIG. 21 is a diagram illustrating a relationship between the devices in the vehicle data acquisition phase (at the time of assembling). Note that the server and the tablet (store app) are wirelessly connected via a mobile communication system, the tablet (store app) and the control circuit are wirelessly connected via Bluetooth (registered trademark) (hereinafter also referred to as BT connection), the control circuit and the power unit are connected by a wire, and the power unit and a rear wheel rotation speed sensor of the vehicle body are connected by a wire.

Figure 22:
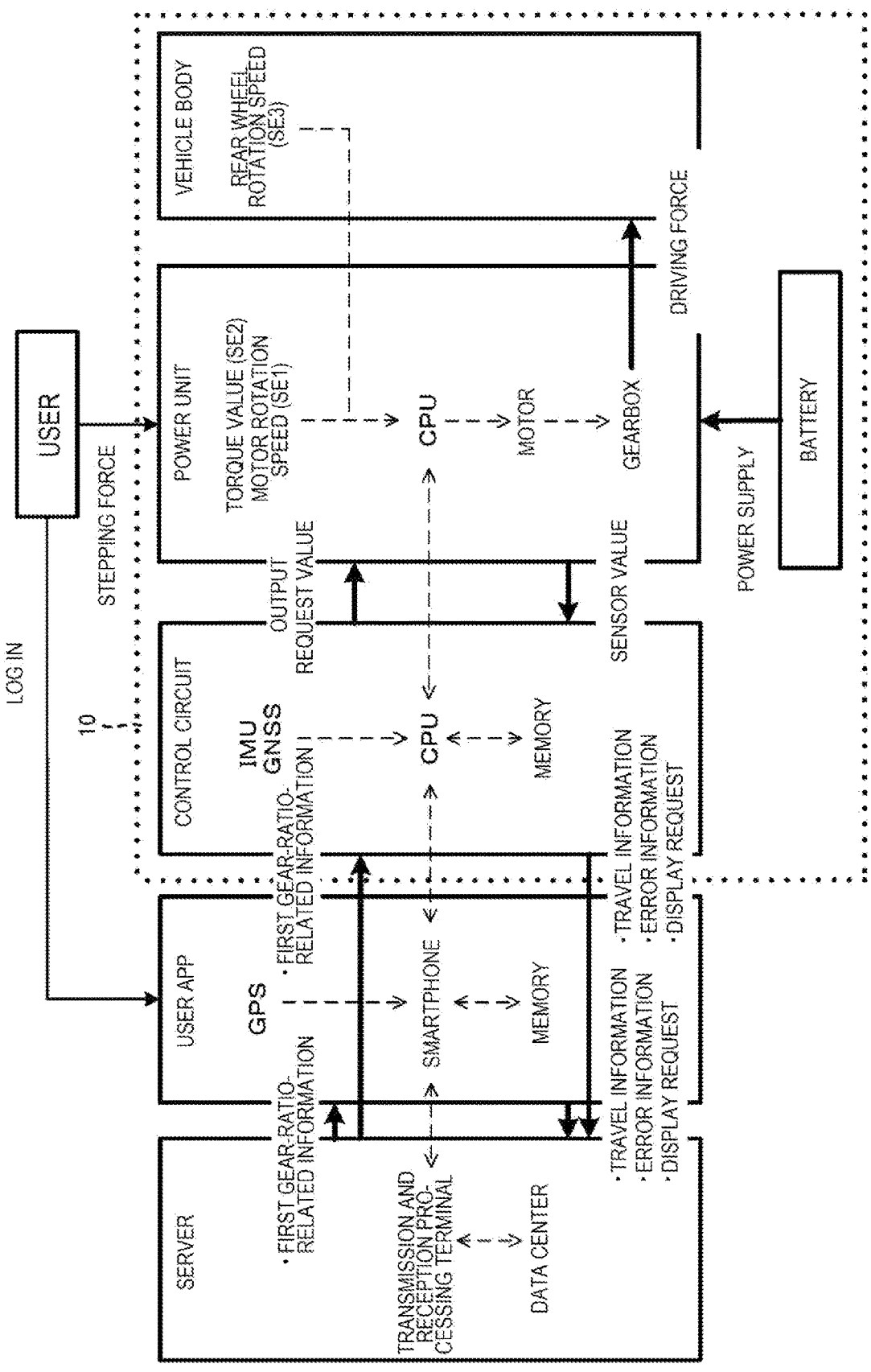
FIG. 22 is a diagram illustrating a relationship between devices in a travel data acquisition phase (after assembling).

The third phase is a travel data acquisition phase. In the travel data acquisition phase, the server acquires travel data, error information, and the like from the portable terminal 8 owned by the user and/or from the control circuit assembled to the vehicle body, when the user uses the electric bicycle after the assist device is assembled at the dealer B. FIG. 22 is a diagram illustrating a relationship between the devices in the travel data acquisition phase (after assembling). The server and a smartphone (user app) are wirelessly connected via a mobile communication system, and the smartphone (user app) and the control circuit are wirelessly connected via Bluetooth.

It is needless to say that the electric bicycle retrofitted with the assist device complies with the regulations at the time of being sold from the dealer B to the user, and thereafter, an electric bicycle management method is important in order to maintain the electric bicycle in a complying state complying with the regulations.

<Regulations>

Here, the regulations imposed on the electric bicycle in Japan will be described.

Figure 2:
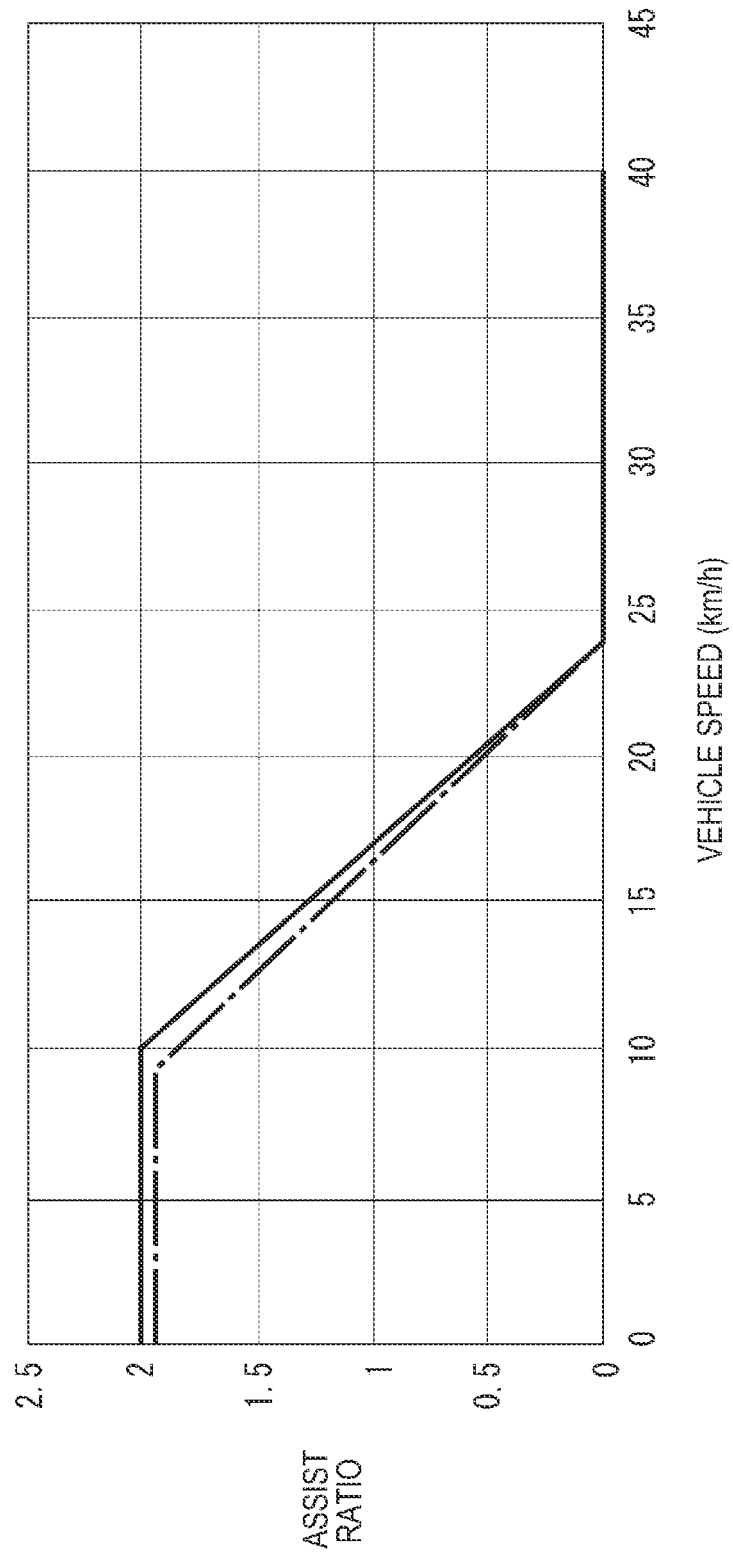
FIG. 2 is a graph illustrating a relationship between an assist ratio and a vehicle speed of an electric assist bicycle.

According to the regulations of Japan, as indicated by a solid line in FIG. 2 (the same applies to the solid lines in FIGS. 6 and 9), the upper limit value of the assist ratio is 2 until the vehicle speed reaches 10 [km/h], and the assist ratio needs to be gradually decreased from 2 to 0 when the vehicle speed changes from 10 [km/h] to 24 [km/h]. Therefore, for example, as illustrated in FIG. 2, the control circuit manufactured by the manufacturer C is programmed to obtain an assist ratio indicated by a one-dot chain line which does not go beyond the regulation (solid line) of Japan. The example indicated by the one-dot chain line in FIG. 2 is set such that a predetermined allowance (margin) with respect to an upper limit of the assist ratio is secured in a range of less than 10 [km/h] and a range of 10 [km/h] to 24 [km/h].

<Control Program>

Differently from a completed vehicle in which an assist device is incorporated in advance, in a case of retrofitting with the assist device, various types of vehicle bodies of the electric bicycle to which the assist device can be assembled are involved. Since bicycles have different vehicle body resistances (transmission losses) depending on types thereof, the program incorporated in the control circuit needs to appropriately set an allowance (margin). If the allowance (margin) is not appropriate, there is a possibility that a regulation compliance state is observed in a city cycle with a large vehicle body resistance, whereas a regulation non-compliance state is observed in a sport cycle with a small vehicle body resistance. Therefore, the program of the control circuit is preferably initially set with a reference of a bicycle having a small vehicle body resistance value, and may be initially set on an assumption of a bicycle having a minimum loss. On the other hand, if the allowance (margin) is too large, an actual assist ratio is reduced. Therefore, the dealer B preferably performs fitting by adding an optimization coefficient (correction value) to the program in consideration of a safety factor for each type of vehicle. The dealer B may perform fine fitting for each vehicle type without using the optimization coefficient (correction value). The allowance (margin) may be actually included in a current command value for a target torque, or may be included in a map to be referred to (for example, FIG. 10).

<Vehicle Structure>

Next, an example of an electric bicycle to which an assist device is assembled will be described.

Figure 3:
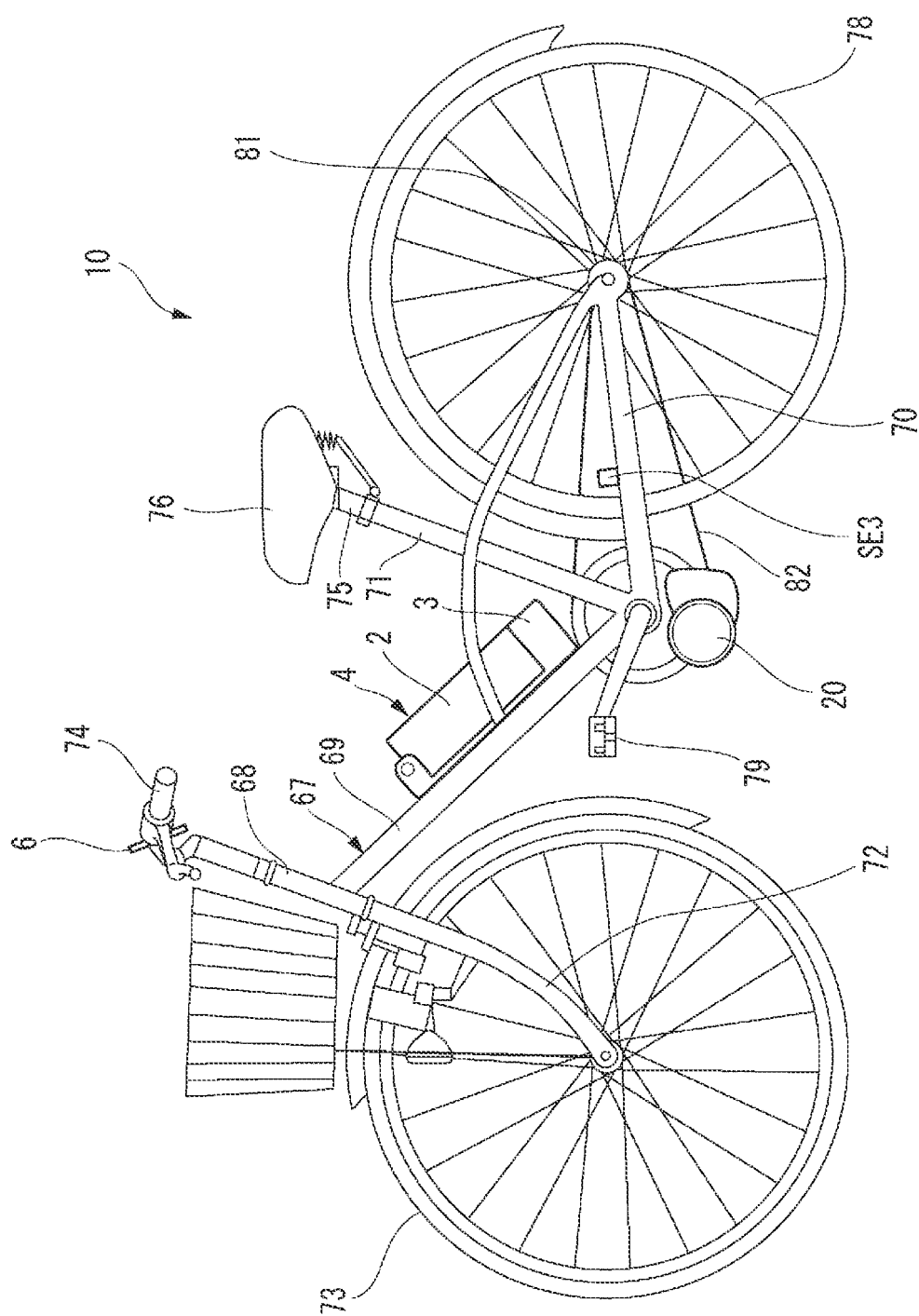
FIG. 3 is a side view of an electric bicycle 10.

As illustrated in FIG. 3, an electric bicycle 10 is an electric assist bicycle which includes a front wheel 73, a rear wheel 78, a bicycle frame 67, a power unit 20 driving the rear wheel 78, and a battery unit 4 electrically connected to the power unit 20, and which is capable of outputting an assist force generated by the power unit 20.

The bicycle frame 67 includes a head pipe 68 at a front end, a down pipe 69 going down toward a rear side from the head pipe 68 and extending from a front portion to a rear portion of a vehicle body, a support pipe 66 (see FIG. 4) fixed to a rear end of the down pipe 69 and extending in a left-right direction, a seat post 71 rising upward from the support pipe 66, and a pair of left and right rear forks 70 extending rearward from the support pipe 66.

Front forks 72 are supported by the head pipe 68 so as to be steerable, and the front wheel 73 is pivotally supported by lower ends of the front forks 72. A steering handlebar 74 is provided at an upper end of the front forks 72. The steering handlebar 74 is provided with a portable terminal holder 6 for holding the portable terminal 8 (see FIG. 23) owned by the user. Note that the portable terminal holder 6 is not essentially necessary, and the portable terminal 8 of the user may be attached to (stored by) the user himself/herself or a wearing article (clothes, bag) of the user. The rear wheel 78 as a drive wheel is pivotally supported between rear ends of the pair of left and right rear forks 70 extending rearward from the seat post 71. A support shaft 75 including a seat 76 at an upper end thereof is attached to the seat post 71 such that a position of the seat 76 in an up-down direction can be adjusted.

The battery unit 4 which supplies electric power to the power unit 20 is detachably fixed to the down pipe 69. More specifically, in the battery unit 4, a base 3 is assembled to an upper surface of the down pipe 69, and a battery 2 is detachably held by the base 3.

The battery unit 4 includes the base 3 assembled to the down pipe 69, and the battery 2 detachably attached to the base 3 and including a plurality of cells therein.

Figure 23:
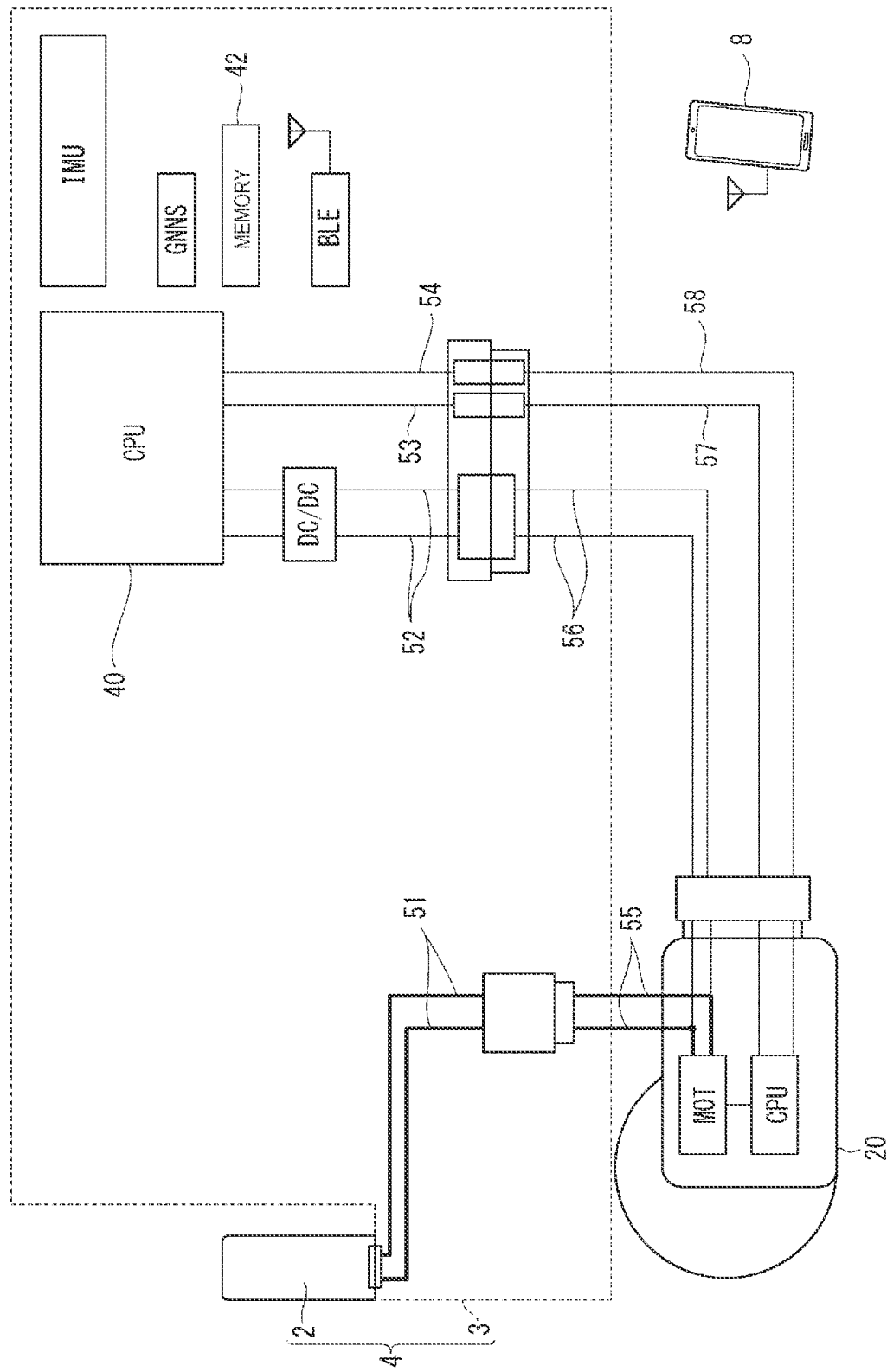
FIG. 23 is a diagram illustrating electric paths and communication paths of the power unit 20, a battery 2, and a control circuit 40 in the electric bicycle 10.

As illustrated in FIG. 23, the base 3 accommodates a control circuit 40 (CPU), a converter DC/DC, an inertial measurement unit (IMU), a global navigation satellite system (GNSS), a memory 42, and a Bluetooth (registered trademark) low energy (BLE) communication device.

FIG. 23 is a diagram illustrating electric paths and communication paths of the power unit 20, the battery 2, and the control circuit 40 in the electric bicycle 10.

The control circuit 40 calculates a torque to be generated by a motor M of the power unit 20 so that an assist force determined by a pedal stepping force described later and an assist ratio corresponding to a vehicle speed of the electric bicycle 10 is generated. Accordingly, the motor M operates in accordance with a CPU of the power unit 20 which receives a calculation result (drive request) from the control circuit 40. The converter DC/DC steps down a supplied DC voltage as a DC voltage to generate a power supply voltage for the control circuit 40, the inertial measurement device IMU, the GNSS, the memory 42, and the BLE communication device.

The inertial measurement device IMU is, for example, a 9-axis sensor having functions of a 3-axis acceleration sensor, a 3-axis angular velocity sensor, and a 3-axis azimuth sensor, and detects a mounting posture of the control circuit 40. The GNSS acquires position information of the electric bicycle 10. The memory is, for example, an SD card, and temporarily or permanently holds information, travel data, and the like of the electric bicycle 10. The BLE communication device is a communication device for performing a BT connection (Bluetooth communication) with the portable terminal 8 of the user or the like.

In an electric system and a communication system configured as described above, electric power from the battery 2 is supplied to the motor M of the power unit 20 via power lines 51 and 55, and electric power supplied from the power unit 20 via the power lines 56 and 52 and stepped down by the converter DC/DC is supplied to the control circuit 40, the inertial measurement device IMU, the GNSS, the memory, and the BLE communication device. Then, in a state where electric power is supplied to the control circuit 40, when an activation request for the power unit 20 is made via the user app, a power-on signal is transmitted to the power unit 20 via signal lines 53 and 57, and the CPU of the power unit 20 is activated. When the power unit 20 is activated, information exchange is performed between the power unit 20 and the control circuit 40 via communication lines 54 and 58, and information exchange can be performed between the control circuit 40 and the portable terminal 8 of the user and the like via the BLE communication device.

Returning to FIG. 3, a pair of crank pedals 79 are coupled to a left end and a right end of a crankshaft 83 which coaxially penetrates the support pipe 66 of the bicycle frame 67. A stepping force applied to the crank pedal 79 is transmitted to the crankshaft 83 and input to an endless chain 82 via a drive sprocket 80 (see FIG. 4). The chain 82 is wound around the drive sprocket 80 and a driven sprocket 81 provided on an axle of the rear wheel 78.

Figure 4:
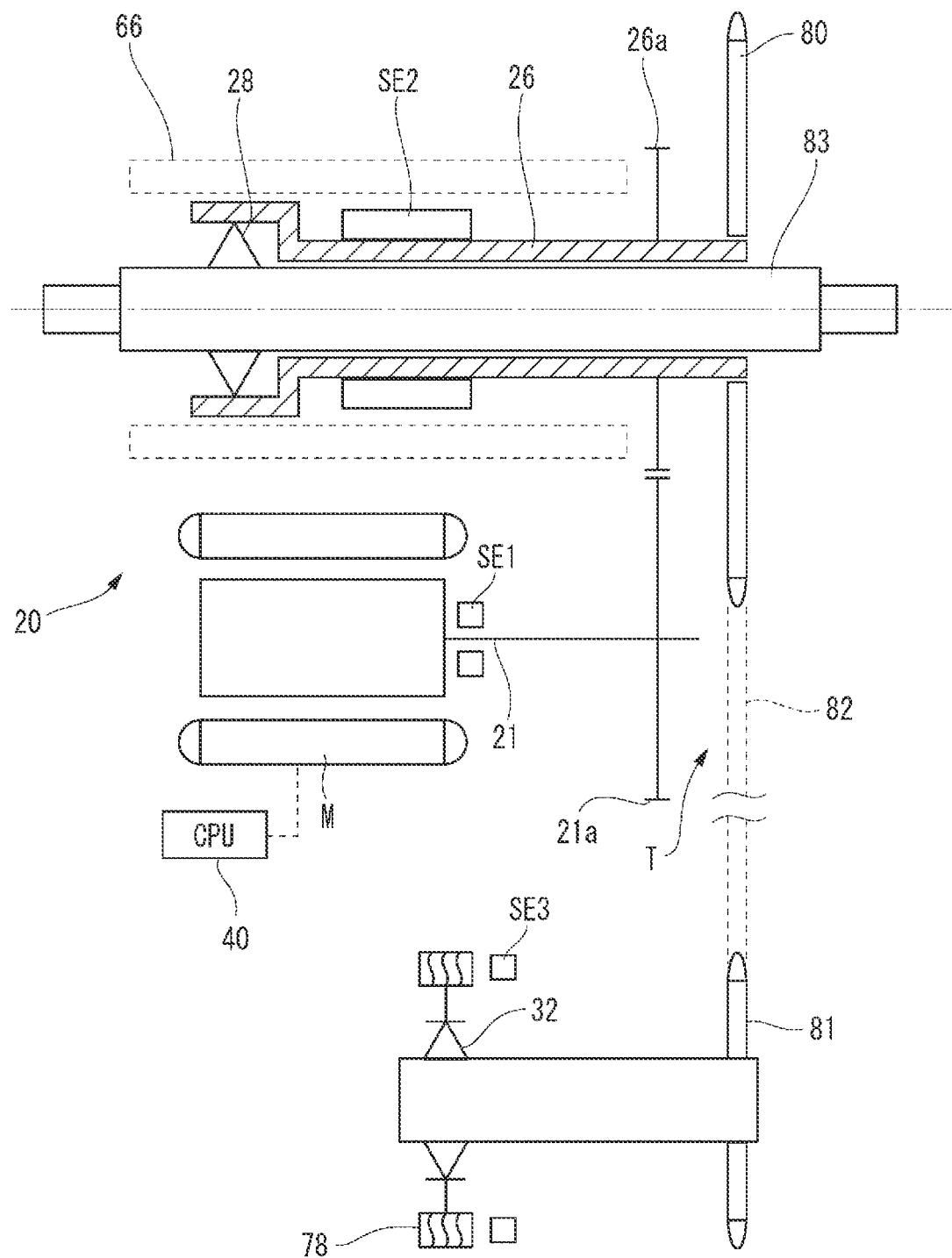
FIG. 4 is a schematic diagram of a power transmission mechanism T including a power unit 20.

Referring also to FIG. 4, the power unit 20 is configured to be able to be retrofitted around the support pipe 66 of the bicycle frame 67 such that the motor M and the crankshaft 83 are unitized.

In the power unit 20, an output shaft 21 of the motor M and the crankshaft 83 are disposed in parallel inside a case 24. The crankshaft 83 is rotatably supported on an inner side of a cylindrical sleeve 26 via a first one-way clutch 28. At an outer peripheral side of the sleeve 26, a driven gear 26a meshing with a motor output gear 21a provided on the output shaft 21 of the motor M and the drive sprocket 80 are fixed. Accordingly, a torque of the motor M is transmitted to the drive sprocket 80 via the motor output gear 21a, the driven gear 26a, and the sleeve 26. That is, the motor M is provided in parallel with the crank pedal 79.

A second one-way clutch 32 is provided between the driven sprocket 81 and the rear wheel 78.

In the electric bicycle 10 configured as described above, when the crank pedal 79 is pedaled in an advancing direction (also referred to as a forward rotation direction or a forward direction), the first one-way clutch 28 is engaged, and forward rotation power of the crankshaft 83 is transmitted to the drive sprocket 80 via the sleeve 26 and is further transmitted to the driven sprocket 81 via the chain 82. At this time, since the second one-way clutch 32 is also engaged, the forward rotation power transmitted to the driven sprocket 81 is transmitted to the rear wheel 78.

On the other hand, when the crank pedal 79 is pedaled in a reversing direction (also referred to as reverse rotation direction or a reverse direction), the first one-way clutch 28 is not engaged, reverse rotation power of the crankshaft 83 is not transmitted to the sleeve 26, and the crankshaft 83 idles.

Further, for example, when the forward rotation power in the advancing direction (forward rotation direction) is input from the rear wheel 78 as in the case where the electric bicycle 10 is pushed in the advancing direction, the second one-way clutch 32 is not engaged and the forward rotation power of the rear wheel 78 is not transmitted to the driven sprocket 81. Therefore, the rear wheel 78 rotates relative to the driven sprocket 81. On the other hand, when the reverse rotation power in the reversing direction (reverse rotation direction) is input from the rear wheel 78 as in the case where the electric bicycle 10 is pushed in the reversing direction, the second one-way clutch 32 is engaged, and the reverse rotation power of the rear wheel 78 is transmitted to the driven sprocket 81, and is further transmitted to the drive sprocket 80 via the chain 82. At this time, since the first one-way clutch 28 is also engaged, the reverse rotation power transmitted to the drive sprocket 80 is transmitted to the crankshaft 83 and the crank pedal 79, and the crankshaft 83 and the crank pedal 79 are reversely rotated.

The power unit 20 is provided with a motor rotation speed sensor SE1 which detects a rotation speed of the motor M. The sleeve 26 is provided with a torque sensor SE2 which detects a torque value Tq generated by a force of stepping on the crank pedal 79 by a rider (hereinafter referred to as a pedal stepping force). The motor rotation speed sensor SE1 includes a magnet and a Hall IC provided at an outer peripheral portion of the output shaft 21 of the motor M. The torque sensor SE2 includes a magneto-striction type torque sensor disposed at an outer peripheral portion of the sleeve 26. In the present embodiment, in order to simplify the description, a gear ratio between the motor output gear 21*a* and the driven gear 26*a* is set to 1, and the rotation speed of the motor M and a rotation speed of the sleeve 26 are normally equal to each other. Accordingly, an output value of the motor rotation speed sensor SE1 can be regarded as the rotation speed of the sleeve 26. The rear wheel 78 is provided with a rear wheel rotation speed sensor SE3 which acquires a rotation speed of the rear wheel 78. The rear wheel rotation speed sensor SE3 is assembled together with the power unit 20 at the dealer B at the time of assembling the assist device.

The control circuit 40 which controls the power unit 20 calculates the force of stepping on the crank pedal 79 by the rider (hereinafter referred to as the pedal stepping force) based on the torque value Tq which is an output value of the torque sensor SE2, and performs PWM control over the motor M so that an assist force determined by the pedal stepping force and an assist ratio corresponding to the vehicle speed of the electric bicycle 10 is generated.

Here, a relationship between the rotation speeds of the respective members of the electric bicycle 10 and the gear ratio will be described.

In general, the gear ratio is a ratio of a rotation speed of an output part with respect to a rotation speed of an input part. In the electric bicycle 10, the rotation speed of the input part is the rotation speed of the sleeve 26, and the rotation speed of the output part is the rotation speed of the rear wheel 78. In the present embodiment, since the gear ratio between the motor output gear 21*a* and the driven gear 26*a* is set to 1, the rotation speed of the sleeve 26 is equal to the rotation speed of the motor M detected by the motor rotation speed sensor SE1. The rotation speed of the sleeve 26 is equal to the rotation speed of the crankshaft 83 in a state where the first one-way clutch 28 is engaged.

Figure 5:
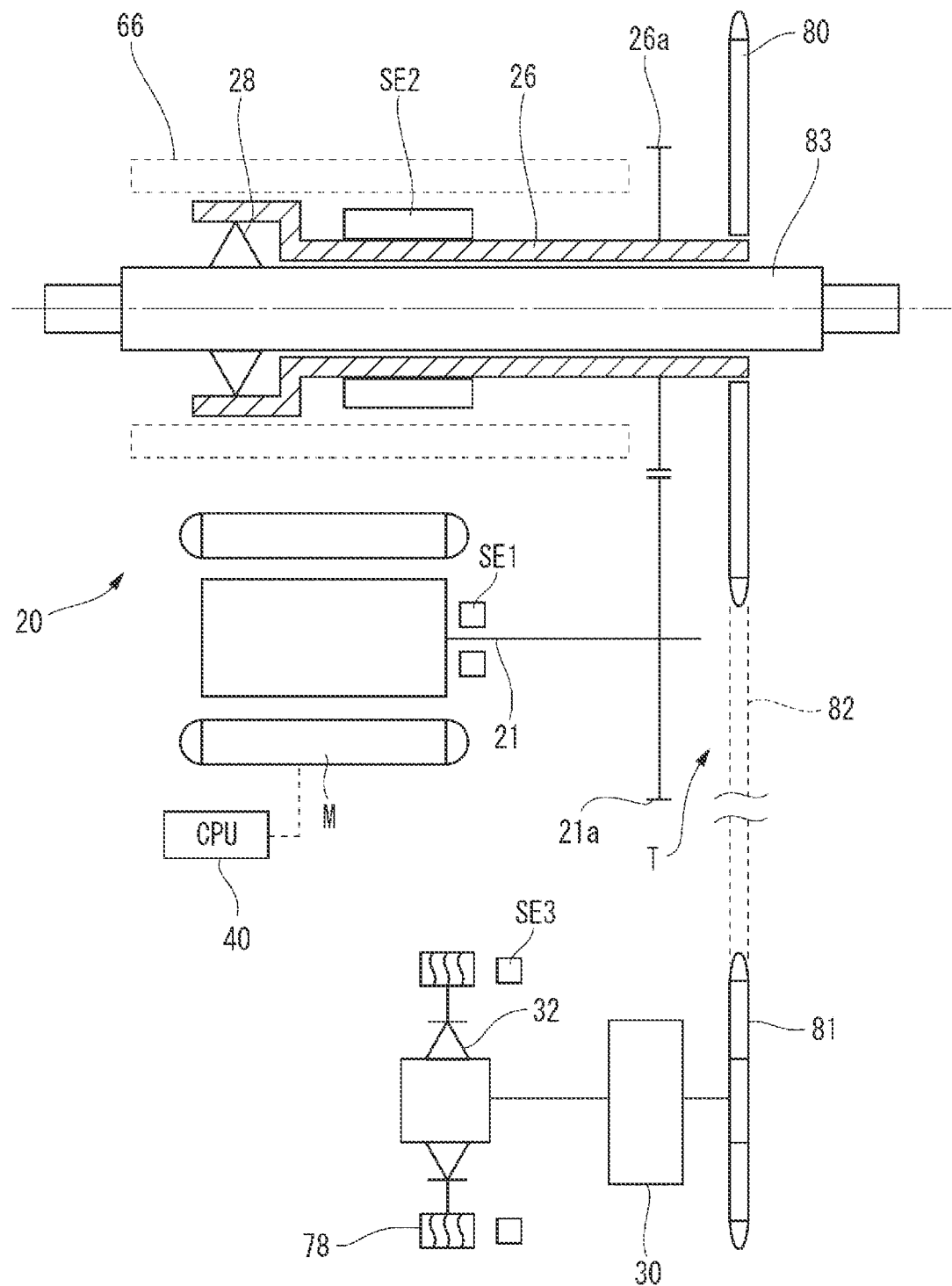
FIG. 5 is a schematic diagram of the power transmission mechanism T including a power unit 20 according to a modification.

The rotation of the sleeve 26 is transmitted to the driven sprocket 81, and the driven sprocket 81 obtains a different rotation speed due to a difference in outer diameter between the drive sprocket 80 and the driven sprocket 81. Further, the rotation of the driven sprocket 81 is transmitted to the rear wheel 78, and the rear wheel 78 obtains a different rotation speed due to a switching transmission device 30 (see FIG. 5) freely provided between the driven sprocket 81 and the rear wheel 78. These components constitute a power transmission mechanism T which transmits the power input to the sleeve 26 to the rear wheel 78. The rotation speed of the rear wheel 78 is detected by a rear wheel rotation speed sensor SE3.

Assuming that the rotation speed of the sleeve 26, which is the rotation speed of the input part, is Ni [rpm], the rotation speed of the rear wheel 78, which is the rotation speed of the output part, is No [rpm], a gear ratio between the drive sprocket 80 and the driven sprocket 81 is Rg, and a gear ratio of the switching transmission device 30 is Rt, the rotation speed No [rpm] of the rear wheel 78 is expressed by the following equation (1).

$$No \text{ [rpm]}=Ni \text{ [rpm]} \times Rg \times Rt \tag{1}$$

The gear ratio Rg between the drive sprocket 80 and the driven sprocket 81 in the equation (1) is expressed by the following equation (2), where D [m] is the outer diameter of the drive sprocket 80 and d [m] is the outer diameter of the driven sprocket 81.

$$Rg=\pi D/\pi d=D/d \tag{2}$$

The gear ratio Rt of the switching transmission device 30 is appropriately set.

In addition, when the gear ratio of the power transmission mechanism T (hereinafter, referred to as a composite gear ratio) is set as Rc, the composite gear ratio Rc is expressed by multiplying the gear ratio Rg between the drive sprocket 80 and the driven sprocket 81 by the gear ratio Rt of the switching transmission device 30, as indicated by the equation (3). Note that, as in the present embodiment illustrated in FIG. 4, in the electric bicycle 10 in which the switching transmission device 30 is not provided, Rt=1.

$$Rc=Rg \times Rt \tag{3}$$

When the equation (1) is rewritten using the equation (3), the rotation speed No [rpm] of the rear wheel 78 is expressed by the following equation (4) using the rotation speed Ni [rpm] of the sleeve 26 and the composite gear ratio Rc of the power transmission mechanism T.

$$No \text{ [rpm]}=Ni \text{ [rpm]} \times Rc \tag{4}$$

When the rotation speed No [rpm] of the rear wheel 78 in the equation (4) and a circumferential length Ct [m] of the rear wheel 78 are used, a speed (hereinafter referred to as the vehicle speed) No' [km/h] of the electric bicycle 10 is expressed by the following equation (5).

$$No' \text{ [km/h]}=Ni \text{ [rpm]} \times Rc \times Ct \text{ [m]} \times 60/1000 \tag{5}$$

Further, when a distance (hereinafter, referred to as a travel distance) by which the electric bicycle 10 travels while the sleeve 26 as the input part makes one rotation is set as L [m], the travel distance L [m] is expressed by the following equation (6).

$$L \text{ [m]}=Rc \times Ct \text{ [m]} \tag{6}$$

Figure 6:
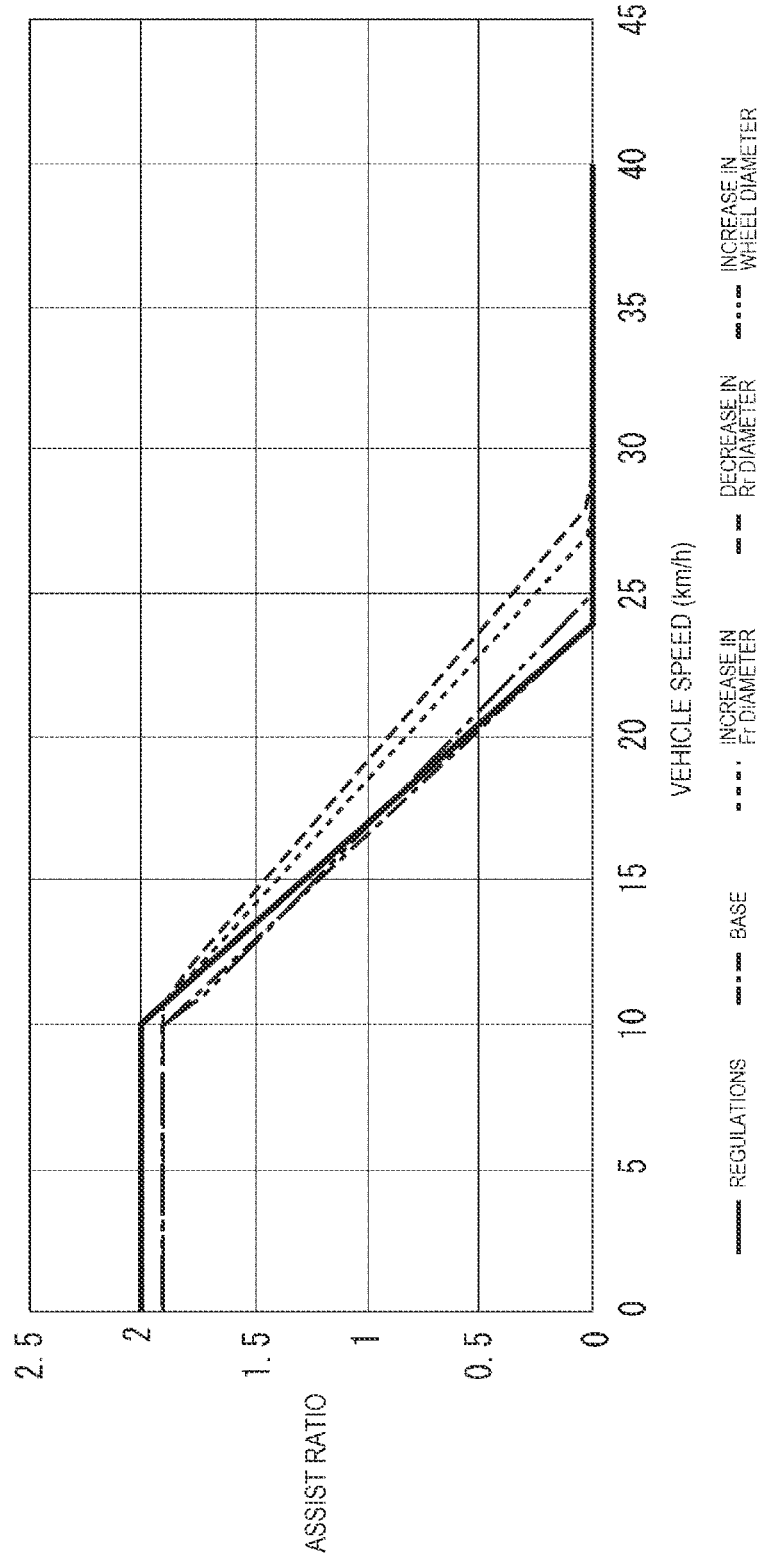
FIG. 6 is a graph illustrating a relationship between the assist ratio and the vehicle speed of the electric assist bicycle, which illustrates influence on the assist ratio caused by remodeling and improvement.

In a case where an electric bicycle (a base in FIG. 6) serving as a reference illustrated in FIG. 6 is assumed, since the number of teeth (front cogs) of the drive sprocket 80 is 44, and the number of teeth (rear cogs) of the driven sprocket 81 is 13, the composite gear ratio Rc is 3.38, and the rotation speed of the rear wheel 78 in the equation (4) is expressed by the following equation (7).

$$No\ [\text{rpm}]=Ni\ [\text{rpm}]\times 3.38 \quad (7)$$

In addition, since the circumferential length Ct of the rear wheel 78 of the electric bicycle (the base in FIG. 6) serving as a reference illustrated in FIG. 6 is 2096×10-3 [m], the vehicle speed No' [km/h] of the electric bicycle 10 in equation (5) is expressed by the following equation (8).

$$No'\ [\text{km/h}]=Ni\ [\text{rpm}]\times 3.38\times(2096\times 10\text{-}3\ [\text{m}])\times 60/1000 \quad (8)$$

Further, since the composite gear ratio Rc of the electric bicycle (the base in FIG. 6) serving as a reference illustrated in FIG. 6 is 3.38 and the circumferential length Ct of the rear wheel 78 is 2096×10-3 [m], the travel distance L [m] in the equation (6) by which the electric bicycle travels while the sleeve 26 of the electric bicycle 10 makes one rotation is expressed by the following equation (9).

$$L\ [\text{m}]=3.38\times 2096\times 10\text{-}3\ [\text{m}]\approx 7084\times 10\text{-}3 \quad (9)$$

<Vehicle Management Method>

Figure 7:
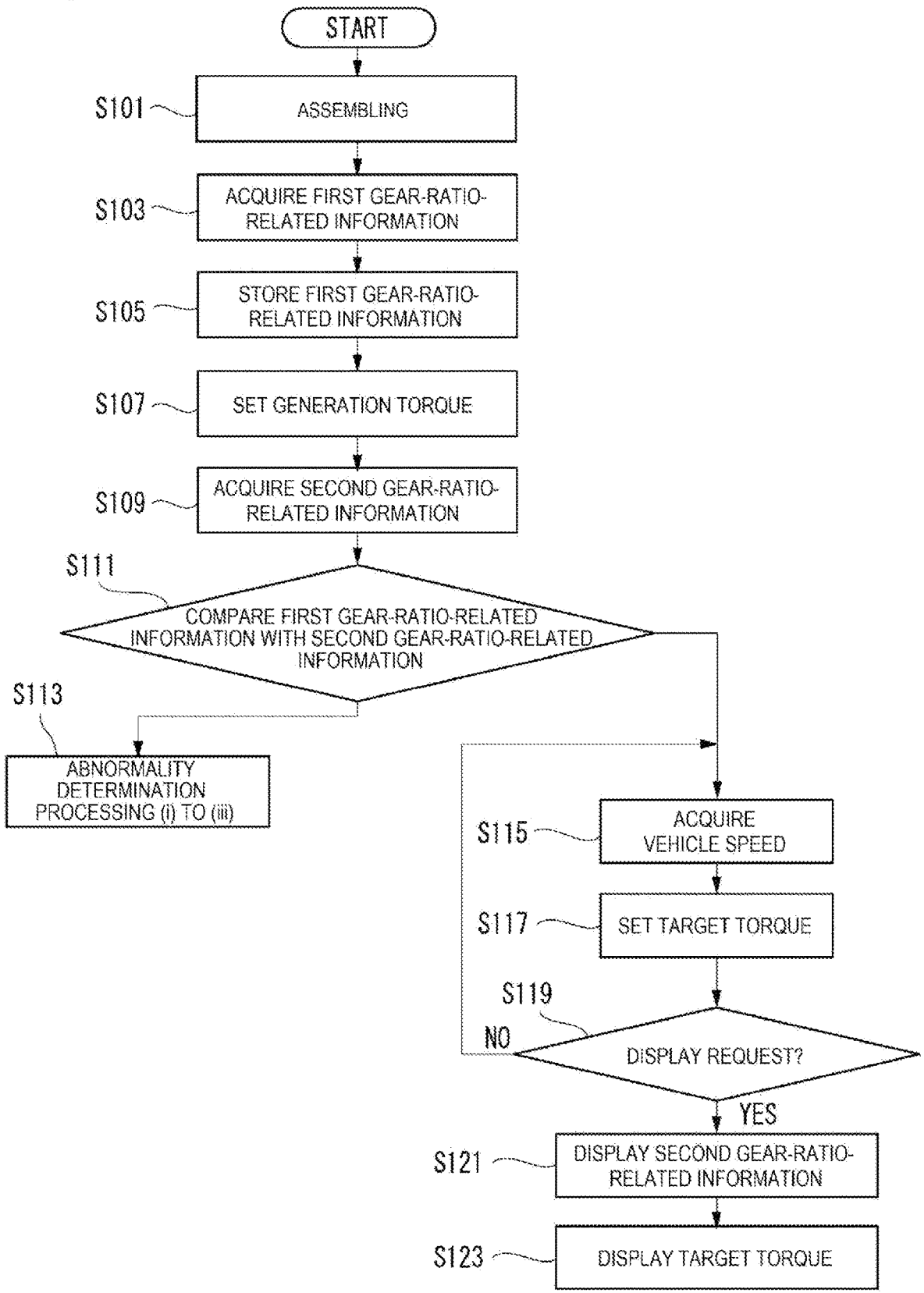
FIG. 7 is a flowchart of the electric bicycle management method according to the embodiment of the present invention.

Next, a management method of the electric bicycle 10 will be described with reference to FIG. 7.

The management method of the electric bicycle 10 includes: an assembling step S101 of assembling the above-described assist device to a vehicle body of a non-electric bicycle; a first gear-ratio-related information acquisition step S103 of acquiring first gear-ratio-related information which is information related to a gear ratio of a transmission section and acquired at a time of assembling the assist device (hereinafter referred to as the time of assembling), the transmission section being the entire power transmission mechanism T, the time of assembling being a first time; a first gear-ratio-related information storage step S105 of storing the first gear-ratio-related information; a generation torque setting step S107 of setting a generation torque to be generated by the motor M; a second gear-ratio-related information acquisition step S109 of acquiring second gear-ratio-related information which is information related to a gear ratio of the transmission section at a time after the time of assembling the assist device (hereinafter, after assembling), the time after the time of assembling being a second time; a gear-ratio-related information comparison step S111 of comparing the first gear-ratio-related information with the second gear-ratio-related information; an abnormality determination step S113 of performing abnormality determination or the like; a vehicle speed acquisition step S115 of acquiring a vehicle speed; and a target torque setting step S117 of setting a motor torque command value to be instructed to the motor M.

The first gear-ratio-related information and the second gear-ratio-related information may be the above-described composite gear ratio Rc, the vehicle speed No' [km/h], or the travel distance L [m]. In the following description of the gear-ratio-related information comparison step S111 and the abnormality determination step S113, a case of using the composite gear ratio Rc will be described as an example.

The assembling step S101, the first gear-ratio-related information acquisition step S103, the first gear-ratio-related information storage step S105, and the generation torque setting step S107 are mainly performed at the dealer B at the time of assembling. Note that S101, S103, S105, and S107 will be described later with reference to more specific examples of a flow at the time of assembling, a flow at the time of assembling check, and a flow at the time of operation check, which are performed at the dealer B at the time of assembling the assist device.

(First Gear-Ratio-Related Information Acquisition Step S103)

When the gear ratio Rg between the drive sprocket 80 and the driven sprocket 81 and the gear ratio Rt of the switching transmission device 30 are known, the dealer B may calculate the composite gear ratio Rc according to the above equation (3), may calculate the composite gear ratio Rc according to the above equation (4) based on the rotation speed of the motor M detected by the motor rotation speed sensor SE1 and the rotation speed of the rear wheel 78 detected by the rear wheel rotation speed sensor SE3 after actual running, or may calculate the composite gear ratio Rc by a bench test. In a case of a certified vehicle, the composite gear ratio Rc is known. Hereinafter, the composite gear ratio Rc at the time of assembling is referred to as a reference composite gear ratio Rc1.

The reference composite gear ratio Rc1 is a reference composite gear ratio in a transmission stage having the highest gear ratio when the power transmission mechanism T includes the switching transmission device 30. For example, in a case of a switching transmission device 30 having three stages in which the gear ratio increases in an order of a first stage, a second speed, and a third speed, if the motor M is controlled according to a preset program, a situation may occur in which a transmission stage having a larger gear ratio does not comply with the regulations. Accordingly, when the power transmission mechanism T includes the switching transmission device 30 capable of switching the gear ratios, the reference composite gear ratio Rc1 is set based on the gear ratio in the transmission stage (maximum transmission stage) having the maximum gear ratio, so that it is possible to more accurately determine a state where the electric bicycle 10 does not comply with the regulations.

Figure 8:
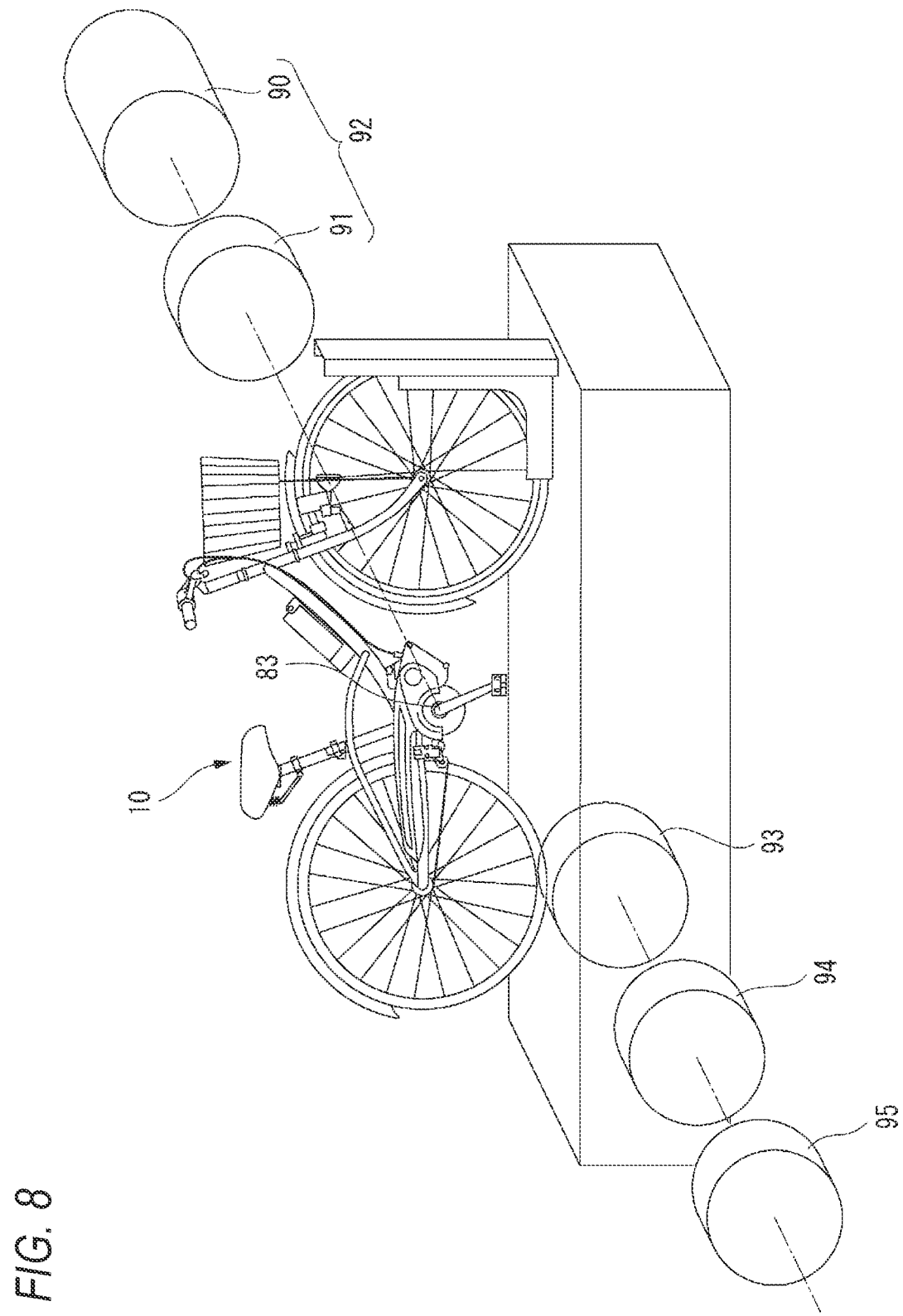
FIG. 8 is a schematic diagram of a bench test.

As illustrated in FIG. 8, in a bench test performed in a case where the electric bicycle is not a certified vehicle, in a state where the electric bicycle 10 is held on the bench, a pedal crank drive device 92 including a drive motor 90 and a torque and rotation speed detector 91 is used instead of a human being to perform pedaling, a rotation output P1 (W) is input to the crankshaft 83, and an input rotation speed N (min−1) and an input torque T (N·m) thereof are measured. On the other hand, the rear wheel 78 is brought into contact with a roller 93, and a travel speed V (km/h) and a wheel driving force F (N) of the electric bicycle 10 are measured by a torque and rotation speed detector 94. In FIG. 8, a reference sign 95 denotes a power load absorbing device. The rotation speed Ni [rpm] of the sleeve 26 is calculated based on the input rotation speed N (min−1) obtained in the bench test, the rotation speed No [rpm] of the rear wheel 78 is calculated based on the travel speed V (km/h), and the composite gear ratio Rc is calculated based on the equation (4).

Note that, the rotation output P1 of the crankshaft 83 is expressed by the following equation (10), the drive output P2 (W) of the electric bicycle is expressed by the following equation (11), and an assist ratio α is expressed by the following equation (12).

$$P1=0.105\times N\times T \quad (10)$$

$$P2=0.278\times V\times F \quad (11)$$

$$\alpha=(P2-P1)/P1 \quad (12)$$

(First Gear-Ratio-Related Information Storage Step S105)

Returning to FIG. 7, the dealer B may store the reference composite gear ratio Rc1 acquired in the first gear-ratio-related information acquisition step S103 in the memory of the control circuit 40, in the memory of the server, or in the memory of the portable terminal 8 of the user which is capable of communicating with the electric bicycle 10. The portable terminal 8 is not limited to a case of being capable of directly communicating with the electric bicycle 10, and may be capable of indirectly communicating with the electric bicycle 10 via the server.

(Generation Torque Setting Step S107)

After assembling the assist device and before selling to the user, the dealer B corrects a program (control software), which is incorporated in advance, according to the type of the bicycle brought in as described above, and sets the generation torque to be generated by the motor M. In this correction, for example, the preset program may be multiplied by an appropriate correction coefficient according to the type of the bicycle to which the assist device is assembled, or the program may be modified to obtain an appropriate numerical value. The generation torque is preferably set for each vehicle speed. The generation torque may be an upper limit generation torque set based on the upper limit value of the assist ratio. As long as the generation torque is equal to or less than the upper limit generation torque, the dealer B can freely set the generation torque by correcting the program. When a generation torque setting is pre-installed, the setting at the dealer B can be omitted. The setting of the generation torque is not a setting in which an absolute value of tire-end power (output) or the like is used as a reference, but is specified by "a ratio to a stepping force input" as illustrated in FIG. 2. Therefore, the same setting can be used for all vehicles regardless of the gear ratio, and the generation torque setting can be pre-installed in the memory of the control circuit 40 or the like.

Figure 9:
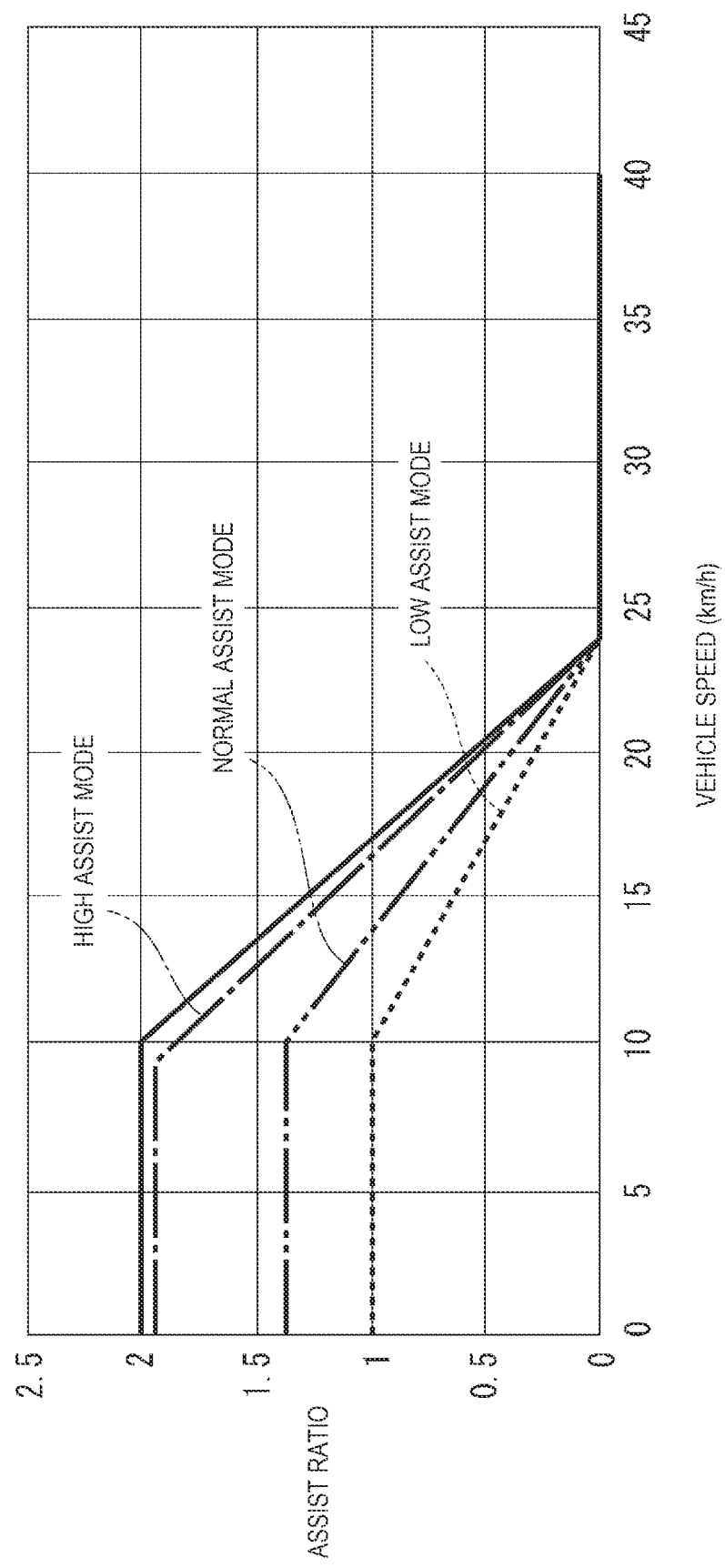
FIG. 9 is a graph illustrating a relationship between the assist ratio and the vehicle speed of the electric assist bicycle, which illustrates a difference in assist ratio depending on a mode.

The electric bicycle 10 may include a plurality of assist modes. For example, three assist modes selectable by the user, that is, a normal assist mode, a high assist mode having a higher assist ratio than the normal assist mode, and a low assist mode having a lower assist ratio than the normal assist mode are provided. In this case, as illustrated in FIG. 9, the generation torque in the high assist mode is set to an upper limit torque or a value near the upper limit torque, the generation torque in the normal assist mode is set to be smaller than the generation torque in the high assist mode, and the generation torque in the low assist mode is set to be further smaller than the generation torque in the normal assist mode. With any one of the three assist modes as a reference, the generation torques in the other assist modes can be easily set by multiplying the generation torque in the reference mode by a coefficient.

(Second Gear-Ratio-Related Information Acquisition Step S109)

Returning to FIG. 7, during traveling of the electric bicycle 10 after assembling of the assist device (after sale of the electric bicycle 10), the control circuit 40 calculates the composite gear ratio Rc according to the above equation (4) based on the rotation speed of the motor M detected by the motor rotation speed sensor SE1 at all times or at a predetermined cycle and the rotation speed of the rear wheel 78 detected by the rear wheel rotation speed sensor SE3 at all times or at a predetermined cycle, and stores the composite gear ratio Rc in at least one of the control circuit 40 of the electric bicycle 10, the server, and the portable terminal 8 of the user. Hereinafter, the composite gear ratio Rc after assembling of the assist device is referred to as a present composite gear ratio Rc2. The present composite gear ratio Rc2 is a gear ratio detected without using the reference composite gear ratio Rc1, and may be calculated according to an equation obtained by modifying the equation (5) using another method (for example, a GPS, a cycle computer, or the like described later). It is preferable that the present composite gear ratio Rc2 is the gear ratio in the gear stage (maximum gear stage) having the largest gear ratio.

(Gear-Ratio-Related Information Comparison Step S111)

In the gear-ratio-related information comparison step S111, the reference composite gear ratio Rc1 and the present composite gear ratio Rc2 are compared by a comparison program incorporated in any of the memory of the control circuit 40 of the electric bicycle 10, the memory of the server, and the memory of the portable terminal 8 of the user.

When the reference composite gear ratio Rc1 is stored in the memory of the control circuit 40 of the electric bicycle 10 in the first gear-ratio-related information storage step S105, the comparison between the reference composite gear ratio Rc1 and the present composite gear ratio Rc2 is preferably performed by the control circuit 40.

When the reference composite gear ratio Rc is stored in the memory of the server in the first gear-ratio-related information storage step S105, the reference composite gear ratio Rc1 may be transmitted from the server to the control circuit 40 of the electric bicycle 10 and the comparison may be performed by the control circuit 40, or the server may acquire the present composite gear ratio Rc2 from the control circuit 40 of the electric bicycle 10 and the comparison may be performed by the server.

When the reference composite gear ratio Rc1 is stored in the memory of the portable terminal 8 of the user in the first gear-ratio-related information storage step S105, the reference composite gear ratio Rc1 may be transmitted from the portable terminal 8 of the user to the control circuit 40 of the electric bicycle 10 and the comparison may be performed by the control circuit 40, or the portable terminal 8 of the user may acquire the present composite gear ratio Rc2 from the control circuit 40 of the electric bicycle 10 and the comparison may be performed by the portable terminal 8 of the user.

In the generation torque setting step S107, as described above, a setting is made to obtain the assist ratio indicated by the one-dot chain line (the base in FIG. 6), for example, which does not go beyond the regulation (solid line) of Japan illustrated in FIG. 6. However, it is assumed that when the electric bicycle 10 is remodeled or improved, the electric bicycle 10 erroneously enters a state of not complying with the regulations. For example, when the diameter of the drive sprocket 80 is increased (increase in Fr diameter in FIG. 6), the diameter of the driven sprocket 81 is reduced (decrease in Rr diameter in FIG. 6), or a diameter of the rear wheel 78 is increased (increase in wheel diameter in FIG. 6), there is a risk of establishment of the state of not complying with the regulations. In order to avoid leaving the electric bicycle 10 in such a state of not complying with the regulations, the reference composite gear ratio Rc and the present composite gear ratio Rc2 are compared in the abnormality determination step S113.

(Abnormality Determination Step S113)

In the abnormality determination step S113, when the reference composite gear ratio Rc1 and the present composite gear ratio Rc2 are different from each other, at least one of (i) to (iii) is executed.

(i) The power transmission mechanism T is determined as abnormal.

(ii) Information for suppressing or prohibiting driving using the power transmission mechanism T is generated.

(iii) Information for reporting to at least one of an occupant (user) of the electric bicycle 10, an assembling worker of the vehicle body and the power unit 20, a manufacturer of the electric bicycle 10, a manufacturer of the power unit 20, a manager of the electric bicycle 10, a manager of the power unit 20, a party which certifies the electric bicycle 10, or a regulatory party of the electric bicycle 10 is generated. Hereinafter, the parties listed in (iii) are referred to as a user or the like.

In the present embodiment, the dealer B corresponds to the assembling worker of the vehicle body and the power unit 20 and the manufacturer of the electric bicycle 10, and the manufacturer D corresponds to the manufacturer of the power unit 20. Although not illustrated in FIG. 1, when a manager of the electric bicycle 10 and a manager of the power unit 20 are present, a report may be made to these managers. The party certifying the electric bicycle 10 is the certifying body in FIG. 1, and includes a representative, an official, and the like of the certifying body (organization). The regulatory party of the vehicle is the regulatory body in FIG. 1, and includes a representative, an official, and the like of the regulatory body (organization). With the processing of (i), the state of the electric bicycle 10 not complying with the regulations can be detected. With the processing of (ii), it is possible to avoid using the electric bicycle 10 in the state of not complying with the regulations. With the processing of (iii), the user or the like can recognize that remodeling and improvement causing the regulation non-compliance state are performed on the electric bicycle 10.

In the abnormality determination step S113, when the reference composite gear ratio Rc and the present composite gear ratio Rc2 are not different from each other, at least one of (iv) to (vi) is executed.

(iv) The power transmission mechanism T is determined as normal.

(v) Information for permitting driving using the power transmission mechanism T is generated.

(vi) Information for notifying at least one of an occupant (user) of the electric bicycle 10, an assembling worker of the vehicle body and the power unit 20, a manufacturer of the electric bicycle 10, a manufacturer of the power unit 20, a manager of the electric bicycle 10, a manager of the power unit 20, a party which certifies the electric bicycle 10, or a regulatory party of the electric bicycle 10 is generated.

With the processing of (iv), the state of the electric bicycle 10 complying with the regulations can be detected. With the processing of (v), it is possible to permit using the electric bicycle 10 in the state of complying with the regulations. With the processing of (vi), the user or the like can recognize that remodeling and improvement causing the regulation non-compliance state are not performed on the electric bicycle 10.

<Control System>

Here, a control system 400 related to the management method of the electric bicycle 10 will be described with reference to FIGS. 14 to 17. In the control system 400, all of the functions do not need to be executed by the control circuit 40 of the electric bicycle 10, and a part of the functions may be executed by the server or the portable terminal 8 (app) of the user. As illustrated in FIGS. 14 to 17, the control system 400 includes a motor control unit 410, a memory 420 configured to store the first gear-ratio-related information acquired at the time of assembling the assist device, a first gear-ratio-related information acquisition unit 430 configured to acquire the first gear-ratio-related information from the memory 420, a second gear-ratio-related information acquisition unit 440 configured to acquire the second gear-ratio-related information after assembling of the assist device, an abnormality determination unit 450 configured to determine an abnormal state or a normal state of the power transmission mechanism T, and a reporting unit 460 configured to notify the abnormal state or the normal state of the power transmission mechanism T.

First Example

Figure 14:
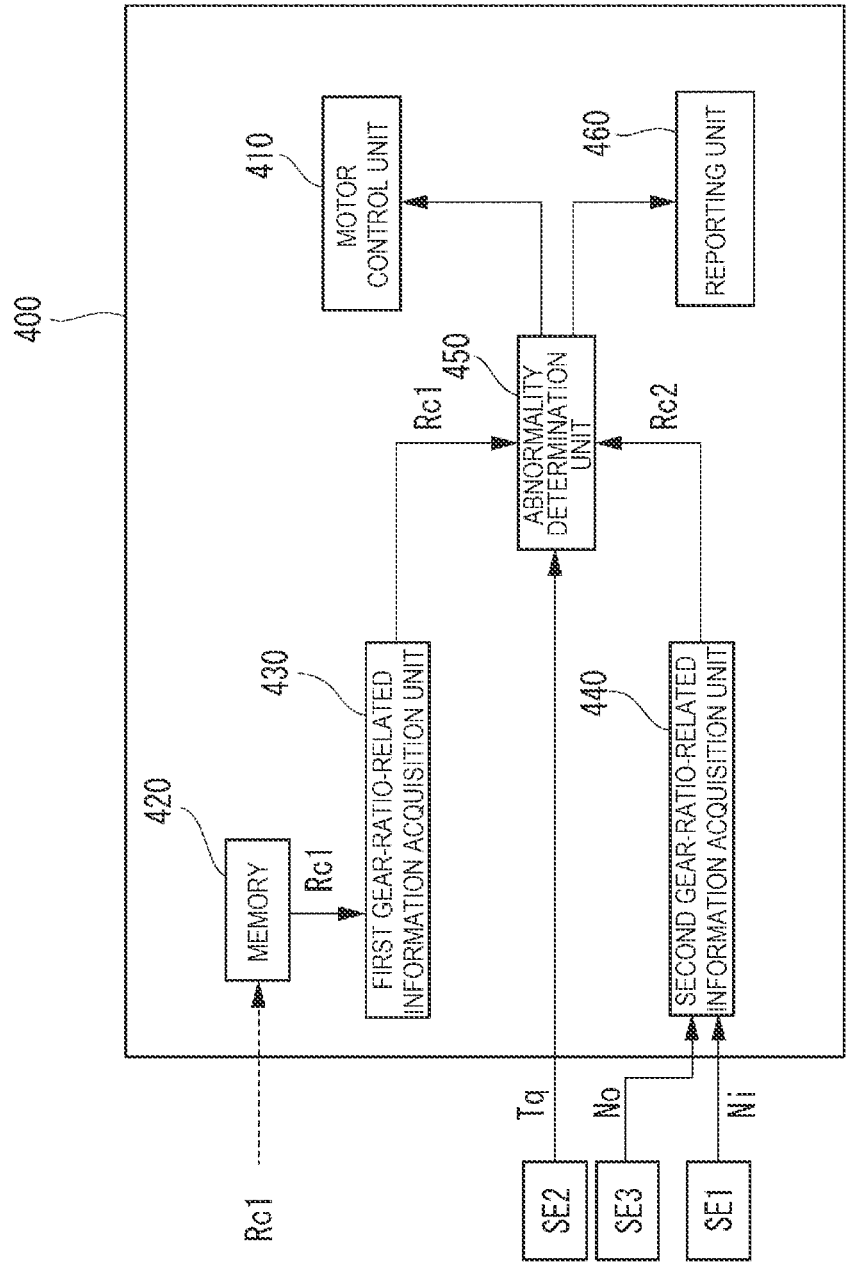
FIG. 14 is a functional block diagram of a control system according to a first example.

FIG. 14 is a functional block diagram according to a first example. In the first example, the above-described composite gear ratio Rc is used as the first gear-ratio-related information and the second gear-ratio-related information.

In the first example, the dealer B stores the reference composite gear ratio Rc1 of the power transmission mechanism T at the time of assembling the assist device in the memory 420.

The first gear-ratio-related information acquisition unit 430 acquires the reference composite gear ratio Rc1 from the memory 420. The second gear-ratio-related information acquisition unit 440 acquires the rotation speed Ni [rpm] of the motor M and the rotation speed No [rpm] of the rear wheel 78, which is the rotation speed of the output part, after assembling of the assist device, for example, and calculates the present composite gear ratio Rc2.

The abnormality determination unit 450 compares the reference composite gear ratio Rc1 acquired by the first gear-ratio-related information acquisition unit 430 with the present composite gear ratio Rc2 calculated by the second gear-ratio-related information acquisition unit 440, determines the power transmission mechanism T as abnormal when the present composite gear ratio Rc2 and the reference composite gear ratio Rc1 are different from each other, and determines the power transmission mechanism T as normal when the present composite gear ratio Rc2 and the reference composite gear ratio Rc1 are not different from each other. Here, the torque value Tq detected by the torque sensor SE2 is input to the abnormality determination unit 450. The abnormality determination unit 450 does not perform the abnormality determination or the normality determination when the torque value is zero. This is because the gear ratio of the power transmission mechanism T cannot be accurately acquired if abnormality determination of the power unit 20 is performed at the time when no torque generated by the pedal stepping force or by the driving force of the motor M is applied. Determination accuracy can be improved by performing the abnormality determination of the power transmission mechanism T or the like at the time when the torque value Tq of the torque sensor SE2 is larger than zero.

It is sufficient that the torque value Tq of the torque sensor SE2 is larger than zero, and at least one of the pedal stepping force and the driving force of the motor M does not essentially need to be transmitted to the rear wheel 78, and may be output to the extent that the second one-way clutch 32 is engaged. Conversely, at the time of the abnormality determination processing, the motor control unit 410 may control the motor M such that the motor M outputs a driving force to the extent that the second one-way clutch 32 is engaged.

When the present composite gear ratio Rc2 and the reference composite gear ratio Rc1 are different from each other, the reporting unit 460 gives a warning sign to the occupant or makes a report to the manufacturer, the manager, and the like. By giving a warning sign to the occupant, it is possible to cause the occupant to recognize that the power transmission mechanism T is in the regulation non-compliance state. By making a report to the manufacturer, the manager, and the like, it is possible to cause the manufacturer, the manager, and the like to recognize that remodeling and improvement causing the regulation non-compliance state may be performed on the power transmission mechanism T. When the present composite gear ratio Rc2 and the reference composite gear ratio Rc1 are not different from each other, the reporting nit 460 may notify the occupant, the manufacturer, the manager, and the like that the power transmission mechanism T is in the regulation compliance state.

The motor control unit 410 can suppress or prohibit the driving of the motor M when there is an abnormality such as the power transmission mechanism T not complying with the regulations. By suppressing or prohibiting the driving of the motor M, it is possible to avoid riding the electric bicycle 10 in the state of not complying with the regulations. Suppressing the driving of the motor M means, for example, performing control to output only a small driving force from the motor M. In addition, the motor control unit 410 may perform control such that the driving force is output from the motor M within a range not departing from the regulations based on the present composite gear ratio Rc2.

Second Example

Figure 15:
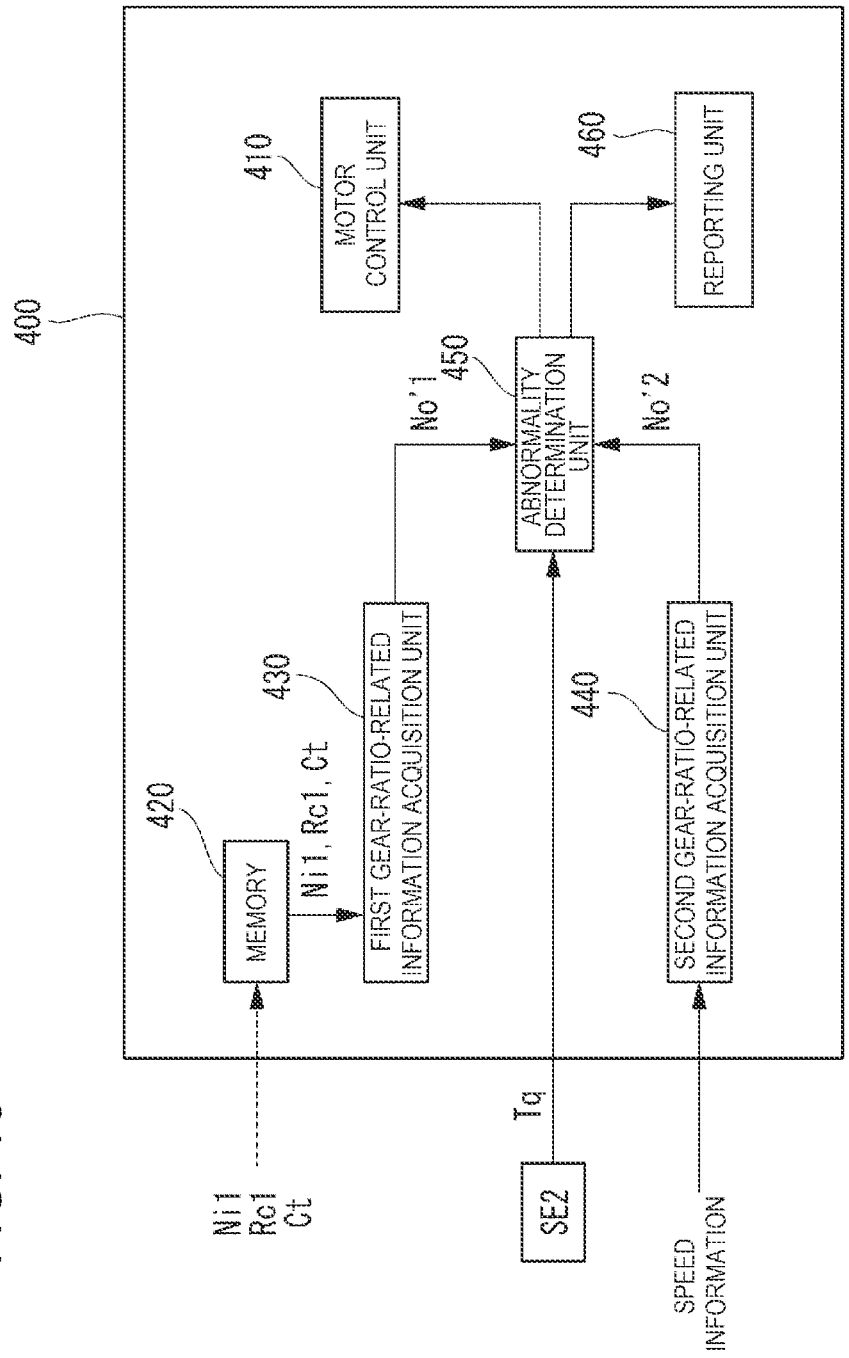
FIG. 15 is a functional block diagram of a control system according to a second example.

FIG. 15 is a functional block diagram according to a second example. In the second example, the above-described vehicle speed No' [km/h] is used as the first gear-ratio-related information and the second gear-ratio-related information.

In the second example, the dealer B stores the rotation speed Ni [rpm] of the motor M (hereinafter, the rotation speed of the motor M at this time is referred to as Ni1 [rpm]), the reference composite gear ratio Rc of the power transmission mechanism T, and the circumferential length Ct [m] of the rear wheel 78 at the time of assembling the assist device in the memory 420.

The first gear-ratio-related information acquisition unit 430 acquires the rotation speed Ni1 of the motor M, the reference composite gear ratio Rc1, and the circumferential length Ct of the rear wheel 78 from the memory 420. Based on the above equation (5), the first gear-ratio-related information acquisition unit 430 calculates a reference vehicle speed No'1 [km/h] by using the rotation speed Ni1 of the motor M, the reference composite gear ratio Rc1, and the circumferential length Ct of the rear wheel 78 at the time of assembling the assist device.

The second gear-ratio-related information acquisition unit 440 acquires an actual vehicle speed No'2 [km/h], which is an actual vehicle speed of the electric bicycle 10 when the rotation speed of the motor M is Ni1 [rpm] after assembling of the assist device. The actual vehicle speed No'2 [km/h] is acquired from a GPS, a cycle computer, or the like. That is, the actual vehicle speed No'2 [km/h] is the vehicle speed No' [km/h] acquired without using the reference vehicle speed No'1 [km/h].

The abnormality determination unit 450 compares the reference vehicle speed No'1 [km/h] calculated by the first gear-ratio-related information acquisition unit 430 with the actual vehicle speed No'2 [km/h] acquired by the second gear-ratio-related information acquisition unit 440, and determines the power transmission mechanism T as abnormal when the actual vehicle speed No'2 [km/h] and the reference vehicle speed No'1 [km/h] are different from each other. The abnormality determination unit 450 receives the torque value Tq detected by the torque sensor SE2, and does not perform the abnormality determination when the torque value is zero, as in the first example. Functions of the reporting unit 460 and the motor control unit 410 are the same as those in the first example. When the vehicle speed No' [km/h] is used as the first gear-ratio-related information and the second gear-ratio-related information, the vehicle speed No' [km/h] also includes a component of the circumferential length Ct of the rear wheel 78, and thus it is possible to determine an abnormality caused by an increase in diameter of the rear wheel 78 and an abnormality caused by a decrease in diameter of the rear wheel 78.

(Modification of Second Example)

Figure 16:
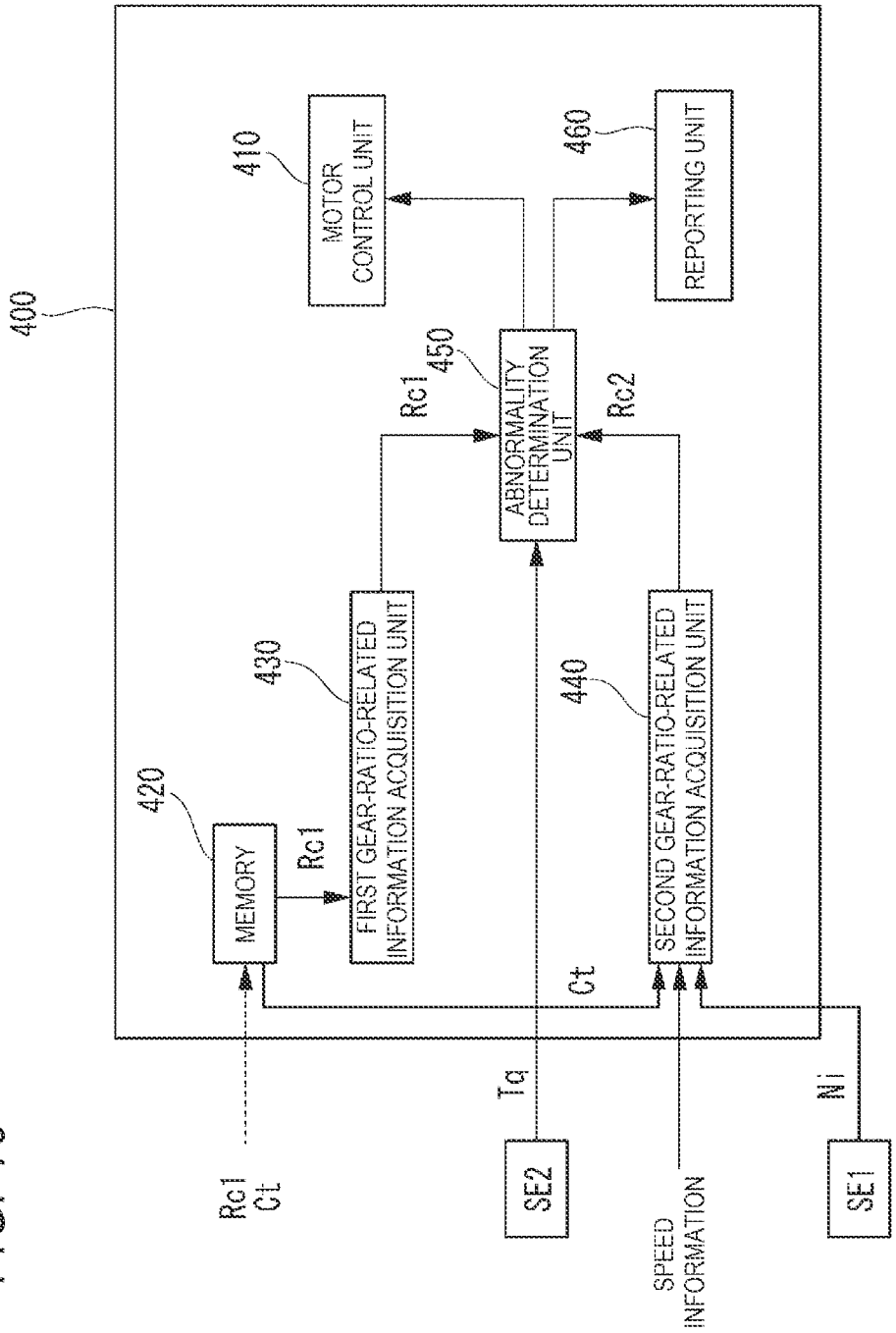
FIG. 16 is a functional block diagram of a control system according to a modification of the second example.

FIG. 16 is a functional block diagram according to a modification of the second example. In the above-described second example, the second gear-ratio-related information acquisition unit 440 needs to acquire the actual vehicle speed No'2 [km/h] which is the actual vehicle speed of the electric bicycle 10 when the rotation speed of the motor M is Ni1 [rpm] after assembling of the assist device, which is the same as when the reference vehicle speed No'1 [km/h] is calculated. However, the second gear-ratio-related information acquisition unit 440 can acquire the present composite gear ratio Rc2 from the following expression (13), which is obtained by modifying the expression (5), regardless of the rotation speed Ni [rpm] of the motor M after the assembling of the assist device.

$$Rc = No' \text{ [km/h]} \times 1/Ni \text{ [rpm]} \times 1/Ct \text{ [m]} \times 1000/60 \quad (13)$$

Specifically, the second gear-ratio-related information acquisition unit 440 acquires the circumferential length Ct [m] of the rear wheel 78 from the memory 420, acquires the rotation speed Ni [rpm] of the motor M from the motor rotation speed sensor SE1, acquires the actual vehicle speed No'2 [km/h] from a GPS, a cycle computer, or the like, and acquires the present composite gear ratio Rc2 from the equation (13).

The abnormality determination unit 450 compares the reference composite gear ratio Rc1 stored in the memory 420 with the present composite gear ratio Rc2 calculated by the second gear-ratio-related information acquisition unit 440, determines the power transmission mechanism T as abnormal when the present composite gear ratio Rc2 and the reference composite gear ratio Rc1 are different from each other, and determines the power transmission mechanism T as normal when the present composite gear ratio Rc2 and the reference composite gear ratio Rc are not different from each other. The abnormality determination unit 450 receives the torque value Tq detected by the torque sensor SE2, and does not perform the abnormality determination when the torque value is zero, as in the first example. Functions of the reporting unit 460 and the motor control unit 410 are the same as those in the first example. When the present composite gear ratio Rc2 obtained from the equation (13) is used, since the vehicle speed No' [km/h] for calculating the present composite gear ratio Rc2 includes a component of the circumferential length Ct of the rear wheel 78, it is possible to determine an abnormality caused by an increase in diameter of the rear wheel 78 and an abnormality caused by a decrease in diameter of the rear wheel 78.

Further, according to the present modification, it is possible to determine whether the power transmission mechanism T is abnormal or normal regardless of the rotation speed Ni [rpm] of the motor M after the assembling of the assist device.

Third Example

Figure 17:
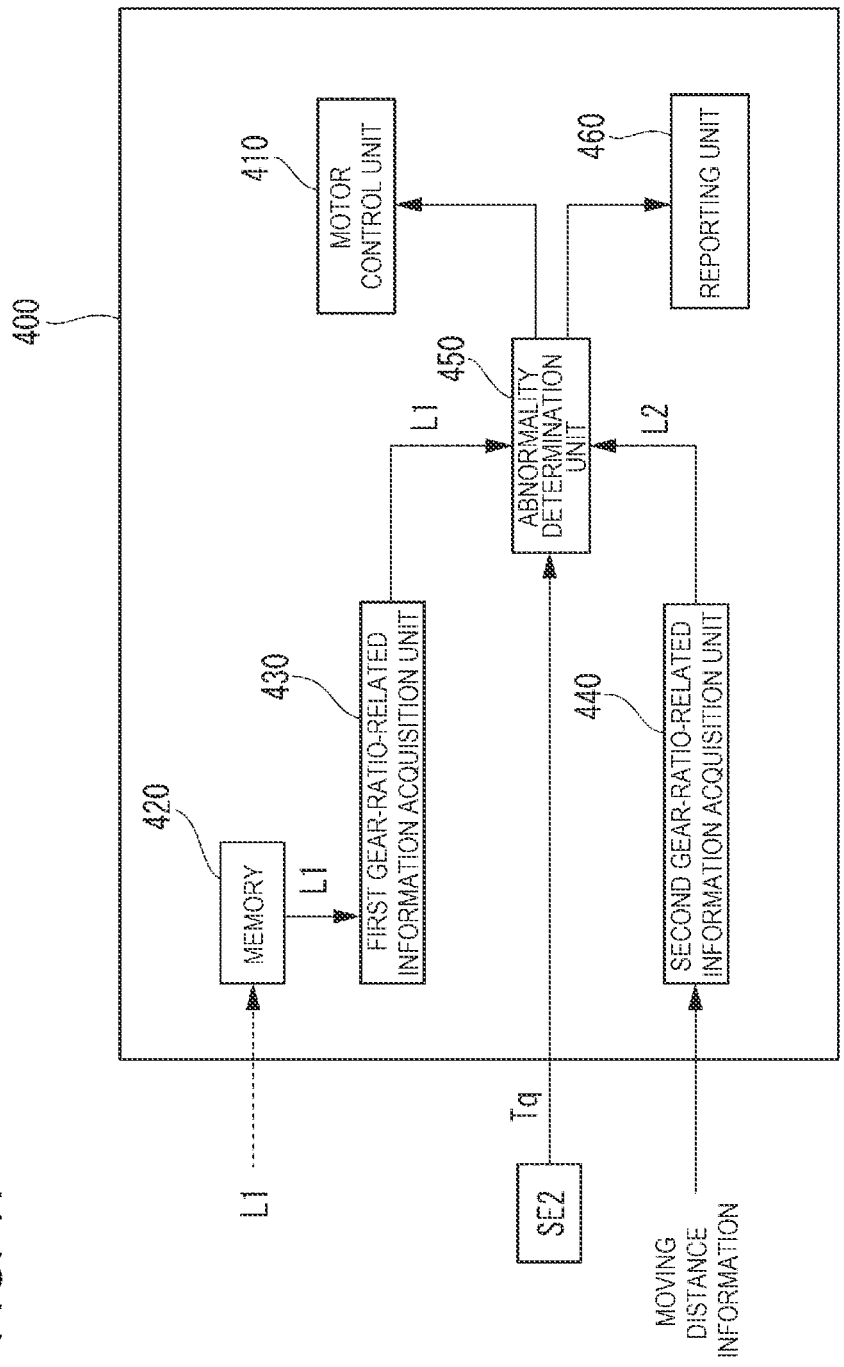
FIG. 17 is a functional block diagram of a control system according to a third example.

FIG. 17 is a functional block diagram according to a third example. In the third example, the travel distance L [m] is used as the first gear-ratio-related information and the second gear-ratio-related information.

In the third example, the manufacturer or the like stores the travel distance L [m] at the time of assembling the assist device (hereinafter, the travel distance L at the time of assembling is referred to as a reference travel distance L1) in the memory 420. The reference travel distance L1 [m] is calculated using the reference composite gear ratio Rc1 and the circumferential length Ct [m] of the rear wheel 78 based on the equation (6).

The first gear-ratio-related information acquisition unit 430 acquires the reference travel distance L1 [m] from the memory 420. The second gear-ratio-related information acquisition unit 440 acquires a travel distance L [m] after the assembling of the assist device (hereinafter, the travel distance L after the assembling of the assist device is referred to as an actual travel distance L2). The actual travel distance L2 [m] is acquired from a GPS, a cycle computer, or the like. That is, the actual travel distance L2 [m] is the travel distance L acquired without using the reference travel distance L1.

The abnormality determination unit 450 compares the reference travel distance L1 [m] acquired by the first gear-ratio-related information acquisition unit 430 with the actual travel distance L2 [m] acquired by the second gear-ratio-related information acquisition unit 440, determines the power transmission mechanism T as abnormal when the actual travel distance L2 [m] and the reference travel distance L1 [m] are different from each other, and determines the power transmission mechanism T as normal when the actual travel distance L2 [m] and the reference travel distance L1 [m] are not different from each other. The abnormality determination unit 450 receives the torque value Tq detected by the torque sensor SE2, and does not perform the abnormality determination when the torque value is zero, as in the first example. Functions of the reporting unit 460 and the motor control unit 410 are the same as those in the first example. When the travel distance L [m] is used as the first gear-ratio-related information and the second gear-ratio-related information, since the travel distance L [m] includes a component of the circumferential length Ct of the rear wheel 78, it is possible to determine an abnormality caused by an increase in diameter of the rear wheel 78 and an abnormality caused by a decrease in diameter of the rear wheel 78.

(Vehicle Speed Acquisition Step S115)

Returning to FIG. 7, when the reference composite gear ratio Rc1 and the present composite gear ratio Rc2 are not different from each other, driving (electric assist) using the power transmission mechanism T is allowed, and the control circuit 40 acquires the vehicle speed of the electric bicycle 10 during traveling of the electric bicycle 10. The vehicle speed No' [km/h] of the electric bicycle 10 may be calculated according to the above equation (5) based on the rotation speed Ni [rpm] of the motor M acquired from the motor rotation speed sensor SE1 and the present composite gear ratio Rc2 stored in one of the memories, or may be calculated according to the equation (5) using the rotation speed No [rpm] of the rear wheel 78 acquired from the rear wheel rotation speed sensor SE3 instead of Ni [rpm]×Rc in the above equation (5). The vehicle speed No' [km/h] of the electric bicycle 10 may be acquired from a GPS, a cycle computer, or the like.

(Target Torque Setting Step S117)

When the generation torque set in the generation torque setting step S107 is the generation torque for each vehicle speed, the control circuit 40 determines a target torque to be instructed to the motor M, based on the present vehicle speed No' and the set generation torque. More specifically, the control circuit 40 acquires an assist ratio based on the vehicle speed No' based on the graph of the vehicle speed versus assist ratio in FIG. 9, and determines the target torque based on the torque value Tq acquired by the torque sensor SE2 and the assist ratio.

Figure 10:
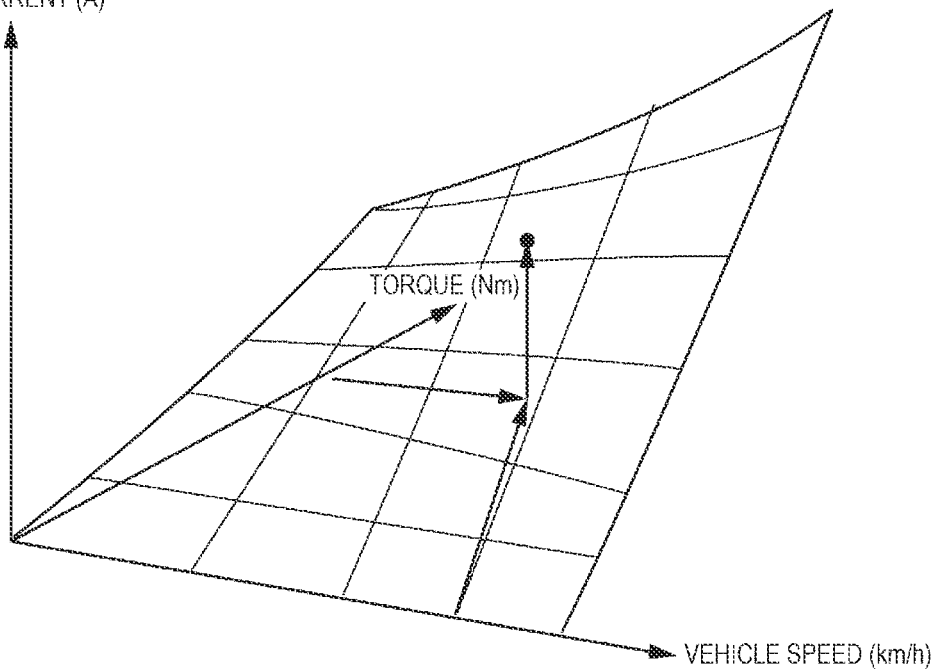
FIG. 10 is a control map in which a current value for a vehicle speed No' and a motor torque is set.

The control circuit 40 can set a current command for the motor M based on a three-dimensional control map as illustrated in FIG. 10 in which a current value (A) for the vehicle speed (km/h) and the (target) torque (N·m) is set.

In addition, in the management method of the electric bicycle 10, processing of displaying necessary data is performed in response to a request from the regulatory body. As illustrated in FIG. 7, in the management method of the electric bicycle 10, when there is a request from the regulatory body (YES in S119), a second gear-ratio-related information display step S121 of displaying the second gear-ratio-related information and a target torque display step S123 of displaying the target torque set in the target torque setting step S117 are executed. When there is no request from the regulatory body (NO in S119), the vehicle speed acquisition step S115 and the target torque setting step S117 are repeated during traveling of the electric bicycle 10.

In the second gear-ratio-related information display step S121, the latest present composite gear ratio Rc2 is displayed on a display unit of the electric bicycle 10 or on the portable terminal 8 of the user. Instead of displaying the present composite gear ratio Rc2, information indicating that the present composite gear ratio Rc2 is different or not different from the reference composite gear ratio Rc1 may be displayed. Accordingly, the regulatory body can easily determine that the second gear-ratio-related information and the first gear-ratio-related information are different or not different from each other. In other words, the regulatory body can easily determine that remodeling and improvement possibly causing the regulation non-compliance state are performed, or remodeling and improvement possibly causing the regulation non-compliance state are not performed.

In the target torque display step S123, the target torque is displayed for each speed on the display unit of the electric bicycle 10 or on the portable terminal 8 of the user. Since the "target torque" and the "generation torque" (actual value) actually generated by the motor are always the same, the "target torque" may be replaced with the "generation torque". In the following description, a case where the generation torque is displayed in the target torque display step S123 is described.

Figure 30:
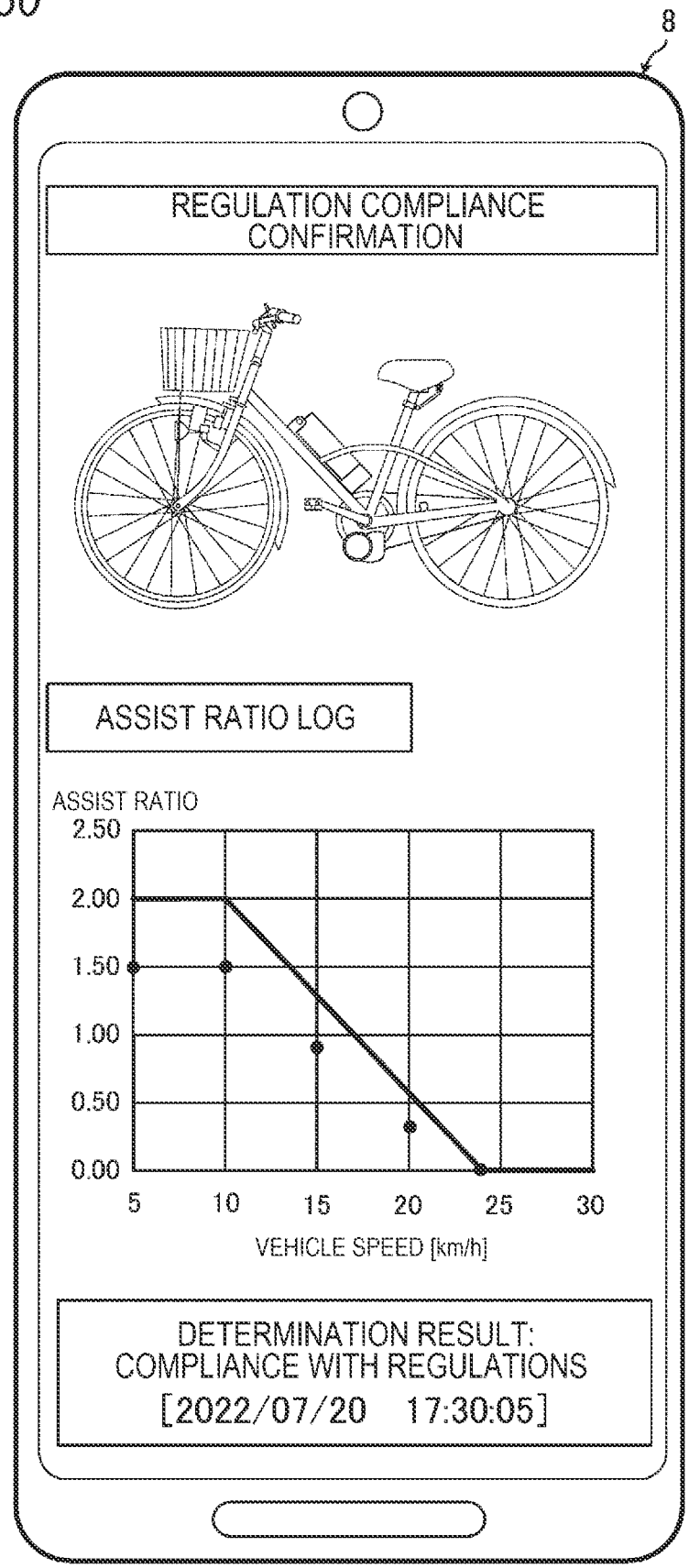
FIG. 30 is a diagram illustrating an example of a regulation compliance confirmation screen displayed on a portable terminal 8 of a user.

FIG. 30 is a diagram illustrating an example of a regulation compliance confirmation screen displayed on the portable terminal 8 of the user.

An image of the electric bicycle 10, an assist ratio log, a determination result, and a determination date and time are displayed on the regulation compliance confirmation screen, for example. As will be described later, the image of the electric bicycle 10 is captured by a worker of the dealer B, by using a camera of the store tablet 60, at the time of assembling the assist device. In the assist ratio log, in a graph illustrating a relationship between the assist ratio and the vehicle speed, actual assist ratios (black circles in the drawing) are displayed together with upper limit values (a thick black line in the drawing) of the assist ratio established by the regulations.

In this example, the actual assist ratios are stored and displayed at intervals of 5 km/h. The actual assist ratios may be subjected to filtering processing. The filtering processing removes, from simple calculation values calculated in the target torque setting step S117, a value calculated when the generation torque is large, an unstable value which does not exceed a predetermined time, such as less than 3 seconds, or the like. For example, when it is determined to store (display) the assist ratio at the time of the vehicle speed being 15 km/h, the control circuit 40 stores an average value of filter values corresponding to 15 [km/h]±a predetermined width or the maximum value of the filter values corresponding to 15 [km/h]±the predetermined width, as the assist ratio (actual value) at the time of the vehicle speed being 15 km/h.

The determination result is displayed as, for example, "in compliance with regulations" when all the displayed assist ratios are smaller than the corresponding upper limit values of the assist ratio established by the regulations. By also displaying the determination date and time, false compliance by image capture can be prevented. Accordingly, the regulatory body can easily and accurately determine that assist going beyond the regulations is not performed, and the user can prove the validity.

[First Modification]

Figure 11:
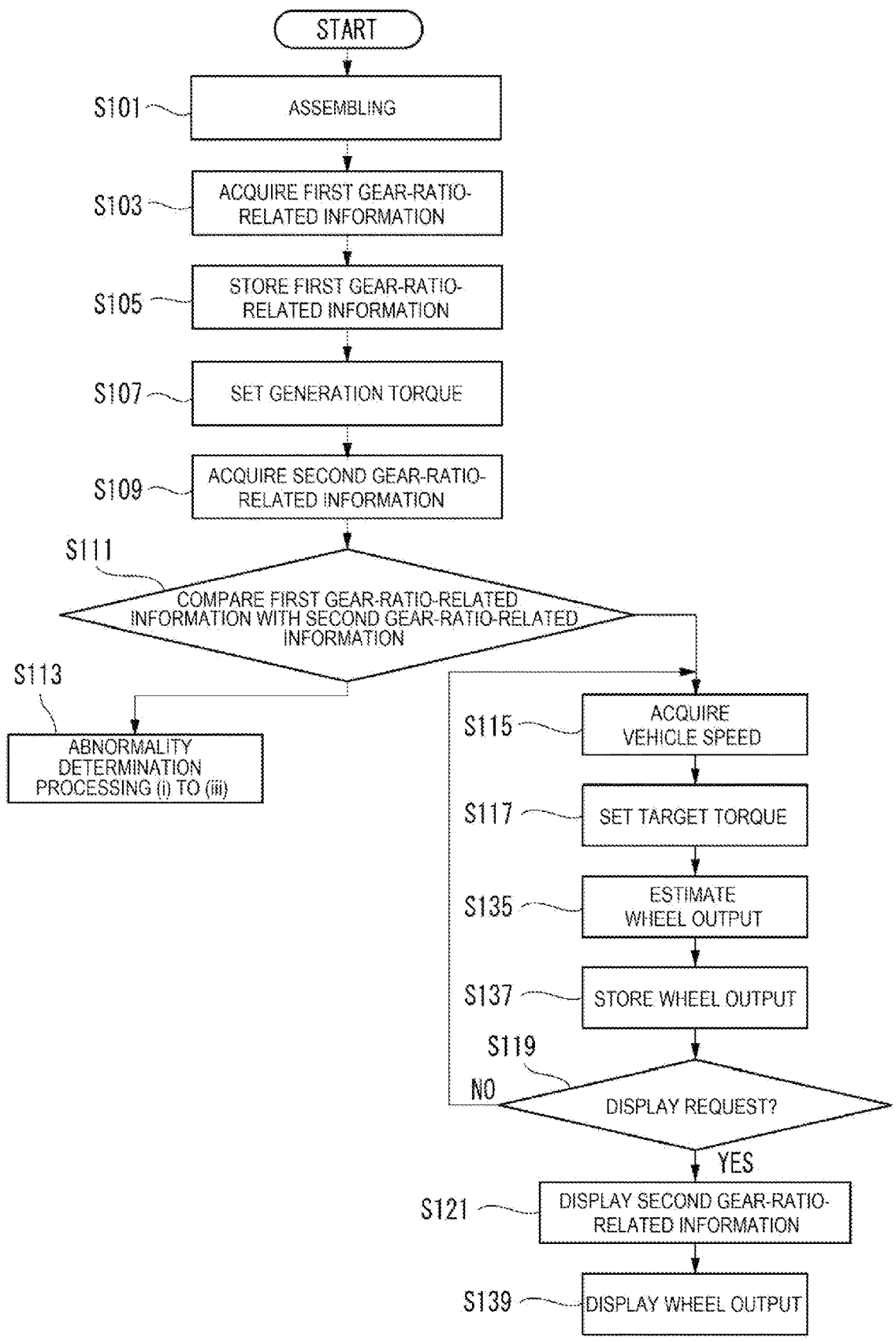
FIG. 11 is a flowchart of an electric bicycle management method according to a first modification.

Next, a modification of the management method of the electric bicycle 10 will be described with reference to FIG. 11.

In the above-described embodiment, when there is a request from the regulatory body, the target torque is displayed in the target torque display step S123 on the assumption that the target torque is always the same as the generation torque. But in this modification, instead of the target torque display step S123, a wheel output display step S139 for displaying a wheel output which is an output from the rear wheel 78 is executed.

The target torque is a target value for determining a current command value to be generated by the motor M, whereas the wheel output is a value actually output from the rear wheel 78. The wheel output includes a transmission loss in the power transmission mechanism T or the like, and thus is more suitable for determining the regulation compliance state than is the target torque.

Therefore, in the management method of the electric bicycle 10 according to the present modification, after the target torque setting step S117, a wheel output estimation step S135 of estimating the wheel output and a wheel output storage step S137 of storing the wheel output are executed.

(Wheel Output Estimation Step S135)

The wheel output is calculated according to the above equation (11). The travel speed V (km/h) in the equation (11) may be calculated using the rotation speed No [rpm] of the rear wheel 78 detected by the rear wheel rotation number sensor SE3, or may be acquired from a GPS, a cycle computer, or the like.

A wheel driving force F (N) in the equation (11) is calculated according to the following equation (14).

$$F=(Mq+Tq)\times 1/Rc2\times 1/RD-R \quad (14)$$

The Mq is a motor torque [N·m], the Tq is a torque [N·m] generated by the pedal stepping force detected by the torque sensor SE2, the Rc2 is the present composite gear ratio described above, the RD is a radius [m] of the rear wheel 78, and the R is the optimization coefficient (correction value).

(Vehicle Output Storage Step S137)

The wheel output estimated in the wheel output estimation step S135 may be stored in the memory of the control circuit 40, may be stored in the memory of the server, or may be stored in the memory of the portable terminal 8 of the user which is capable of communicating with the electric bicycle 10.

(Vehicle Output Display Step S139)

In the wheel output display step S139, the wheel output is displayed on the display unit of the electric bicycle 10 or on the portable terminal 8 of the user. Instead of displaying the wheel output, information indicating that the wheel output does not exceed or exceeds an upper limit wheel output may be displayed. Further, instead of displaying the wheel output, an actual assist ratio calculated based on the equations (10) to (12) may be displayed, and information indicating that the assist ratio complies with the regulation or does not comply with the regulation may be displayed.

[Second Modification]

When the electric bicycle 10 is provided with the switching transmission device 30 having a plurality of gear stages with different gear ratios, the gear stage is displayed on a display window of a switching input device provided on a handlebar in a general electric bicycle. However, since the display window of the switching input device is small, it is difficult to see the gear stage particularly during traveling. On the other hand, it is conceivable to provide a gear stage detection sensor on the bicycle to display a detection result thereof. However, it is not preferable to separately provide a sensor for detecting the gear stage. As described above, in the management method of the electric bicycle 10, the present composite gear ratio Rc2 (hereinafter referred to as a front-rear gear ratio) is acquired in the second gear-ratio-related information acquisition step S109.

Here, a description will be given of a front-rear gear ratio of a general bicycle provided with an external mounting type switching device.

Figure 13:
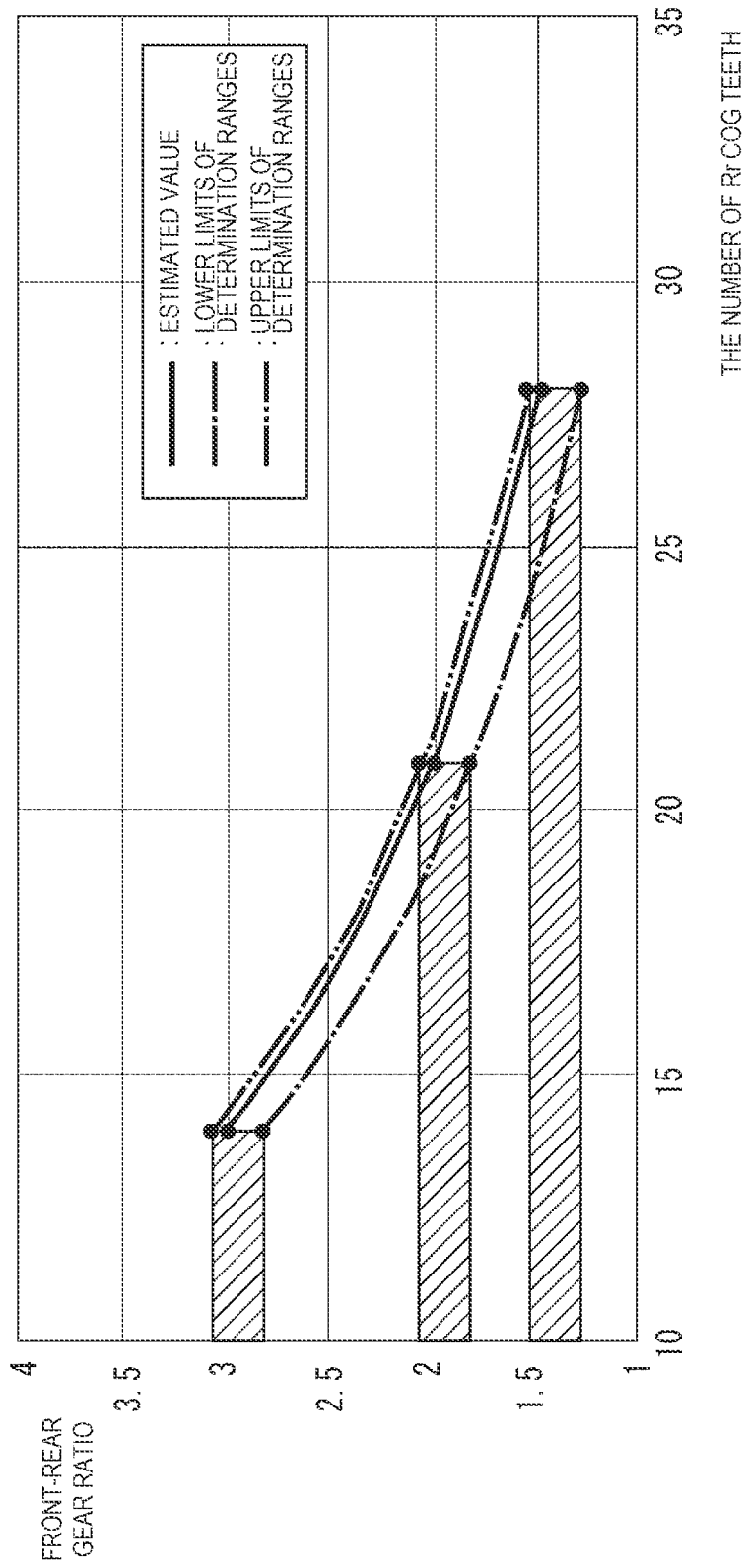
FIG. 13 is a graph illustrating a relationship between the number of teeth of a driven sprocket (the number of Rr cog teeth) and a front-rear gear ratio.

The front-rear gear ratio of the bicycle is determined according to the number of teeth (the number of Rr cog teeth) of the driven sprocket 81 of the rear wheel 78 selected by the switching device as illustrated in FIG. 13. However, the front-rear gear ratio is not always constant at all times, and has a vertical width with respect to a theoretical gear ratio indicated by a solid line. An amplitude at which the gear ratio increases with respect to a theoretical value is smaller than an amplitude at which the gear ratio decreases with respect to the theoretical value. This is because the bicycle is provided with a one-way clutch.

Figure 12:
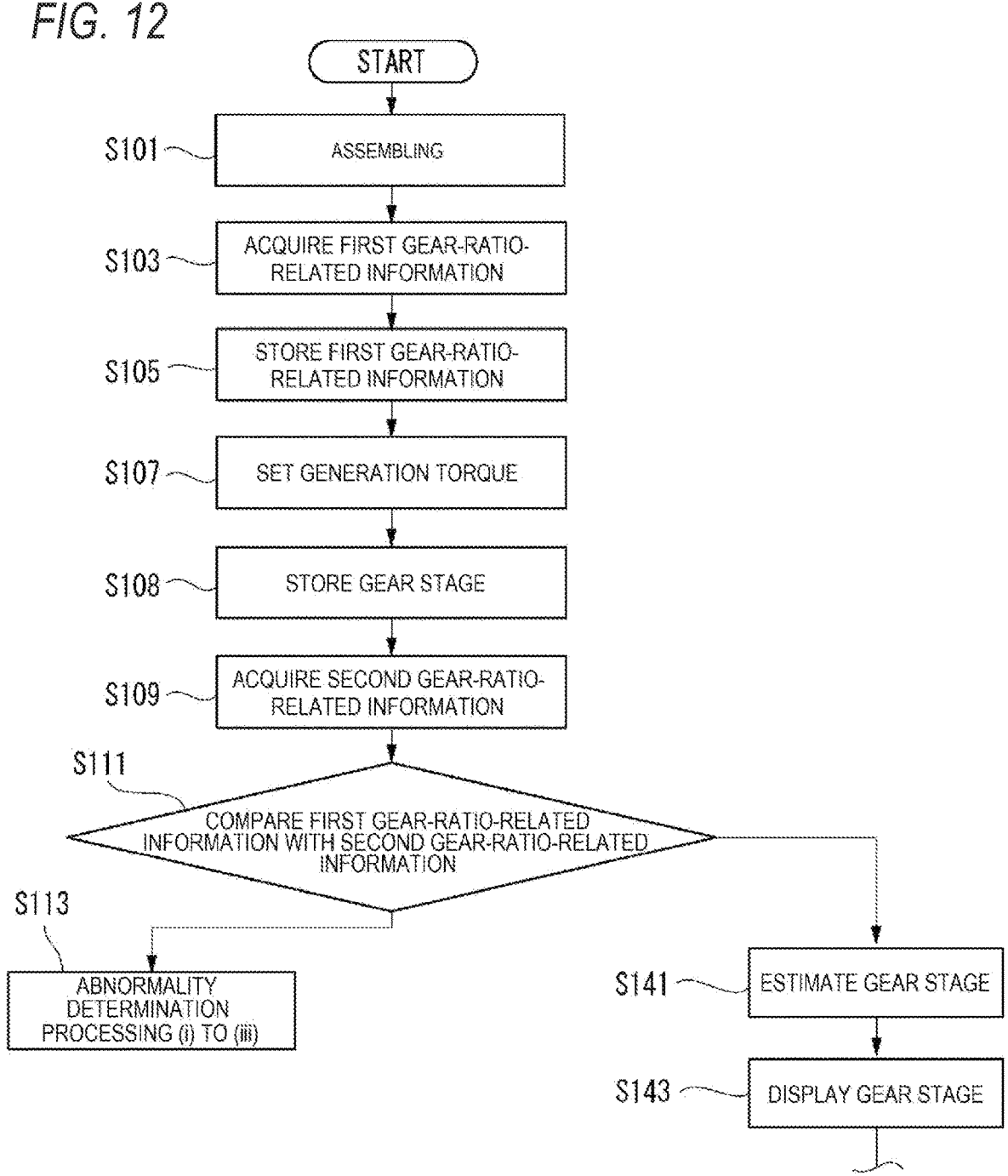
FIG. 12 is a flowchart of an electric bicycle management method according to a second modification.

Therefore, as illustrated in FIG. 12, the dealer B stores the front-rear gear ratio, which has a predetermined width, and the gear stage in association with each other at the time of assembling the assist device (gear stage storage step S108). For example, in the example in FIG. 13, front-rear gear ratios from 2.75 to 3.2 are stored correspondingly to a third gear stage, front-rear gear ratios from 1.8 to 2.1 are stored correspondingly to a second gear stage, and front-rear gear ratios from 1.25 to 1.6 are stored correspondingly to a first gear stage. A relationship between a front-rear gear ratio and the gear stage may be stored in the memory of the control circuit 40, may be stored in the memory of the server, or may be stored in the memory of the portable terminal 8 of the user which is capable of communicating with the electric bicycle 10. In the case of a certified vehicle, a relationship between the front-rear gear ratio and the gear stage is known, and may be pre-installed in the memory of the control circuit 40 or the like. Then, during traveling of the electric bicycle 10, the present composite gear ratio Rc2 is acquired, the gear stage is estimated from the present composite gear ratio Rc2 (gear stage estimation step S141), and the estimated gear stage is displayed on the display unit of the electric bicycle 10 or on the portable terminal 8 of the user (gear stage display step S143).

The gear stage estimation is preferably performed when the second one-way clutch 32 is engaged. This is because if the gear stage estimation is performed in a state where the second one-way clutch 32 is not engaged, the gear ratio cannot be accurately acquired.

The gear stage estimation is also preferably used to acquire the present composite gear ratio Rc2 in the second gear-ratio-related information acquisition step S109. Specifically, assuming the number of a plurality of gear stages as n, n determination ranges are set within a range of values that the second gear-ratio-related information can take, and when the second gear-ratio-related information is included in an m-th determination range, the gear stage is estimated to be an m stage. Accordingly, it is possible to acquire the second gear-ratio-related information at the maximum gear stage at which the electric bicycle 10 is likely to be in the state of not complying with the regulations, and it is possible to more accurately determine the state of the electric bicycle 10 not complying with the regulations.

Figure 18:
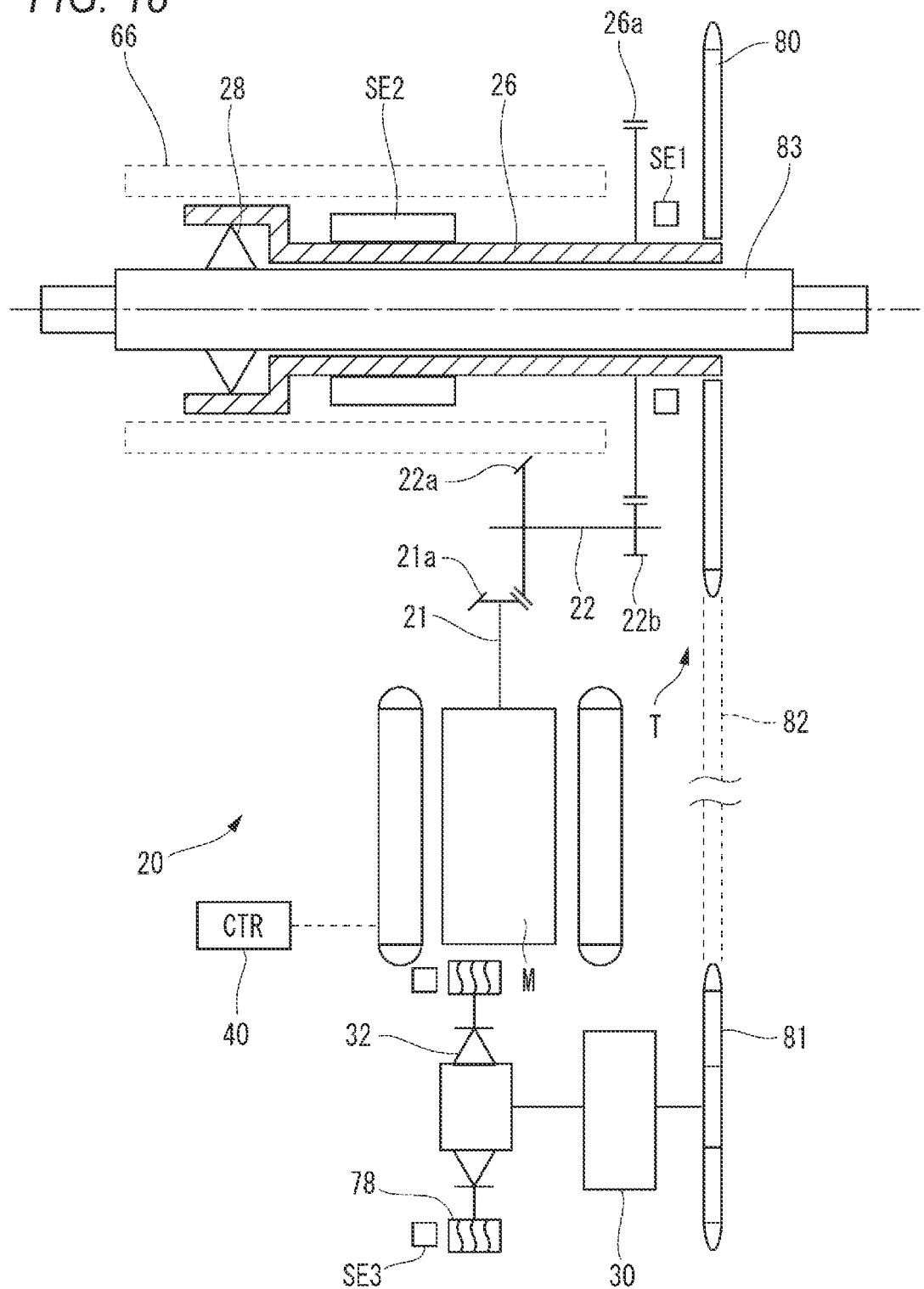
FIG. 18 is an explanatory diagram of a modification of the power transmission mechanism.

In the power unit 20 of the above embodiment, the output shaft 21 of the motor M and the crankshaft 83 are disposed parallel to each other. As in a modification illustrated in FIG. 18, the output shaft 21 of the motor M may be disposed perpendicularly to the crankshaft 83. Power of the motor M is transmitted to an idle shaft 22 by, for example, a bevel gear mechanism.

Figure 19:
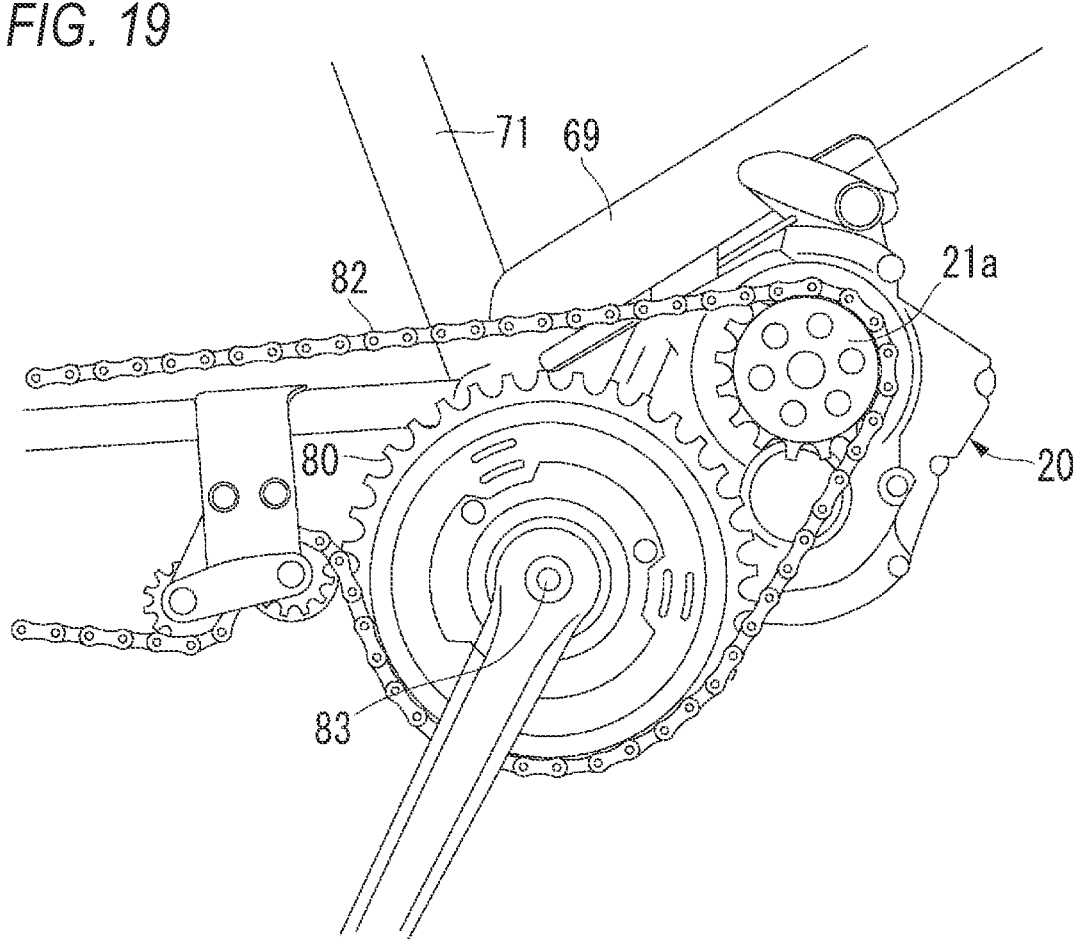
FIG. 19 is an explanatory diagram of another modification of the power transmission mechanism.

FIG. 19 is an explanatory diagram according to another modification of the power transmission mechanism T.

As illustrated in FIG. 19, the power transmission mechanism T according to the present modification is configured such that the chain 82 is wound around the drive sprocket 80, the motor output gear 21a of the motor M, and the driven sprocket 81 provided on the axle of the rear wheel 78, and power of the motor M is directly transmitted to the chain 82. Even with such a power transmission mechanism T, the abnormality determination of the power transmission mechanism T can be performed using the above-described management method of the electric bicycle 10.

Finally, the flow at the time of assembling, the flow at the time of assembling check, and the flow at the time of operation check, which are performed at the dealer B, will be described.

Figure 24:
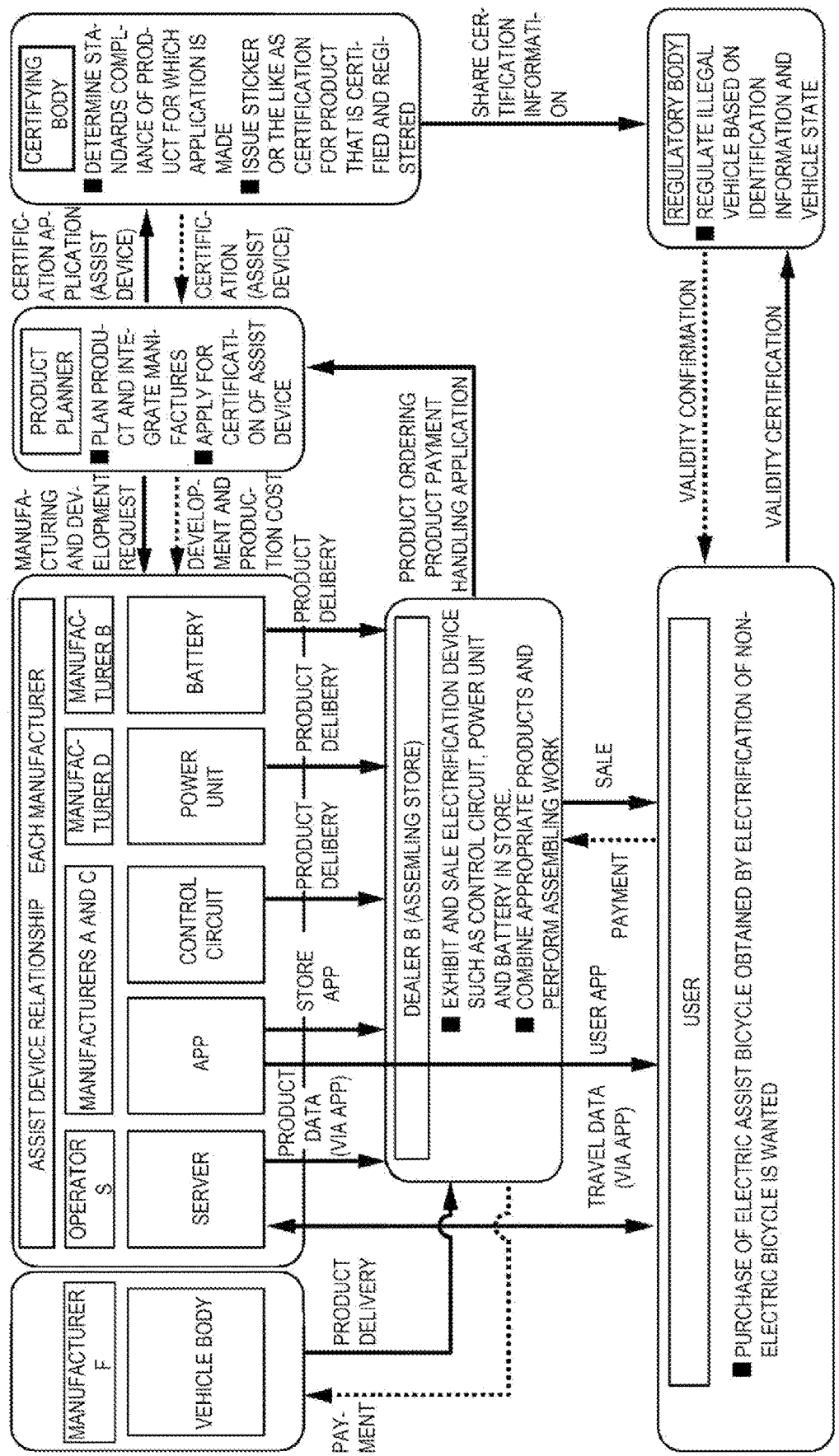
FIG. 24 is a diagram illustrating a correlation between parties involved in an electric bicycle management method according to another embodiment of the present invention.

In this example, as illustrated in FIG. 24, it is assumed that the dealer B purchases a vehicle body of a non-electric bicycle from the manufacturer F and assembles an assist device (power unit, control circuit, battery) to the vehicle body. The electric bicycle to which the assist device sold by the dealer B is assembled is a brand-new electric bicycle. Unlike a case where the manufacturer F manufacturing the vehicle body manufactures the new electric bicycle as a completed vehicle, the assist device is assembled, at the dealer B, to the non-electric bicycle manufactured and sold by the manufacturer F, and the dealer B sells the vehicle as the electric bicycle.

On the premise, a product number and an individual number are recorded in a QR code (registered trademark) in each of the power unit, the battery, and the vehicle body. Control software (such as a rotation speed-output map) is installed in the control circuit in advance. Further, in the server, a combination of the vehicle body and each part (power unit, battery) which is certified and registered by the certifying body is registered, and a control parameter for each combination is registered.

That is, in a case of a certified vehicle, control parameters thereof are registered in the server. Examples of the control parameters include the circumferential length of the rear wheel and the number of teeth of the drive sprocket and the driven sprocket. In the case of a certified vehicle, the control parameters such as the circumferential length of the rear wheel, the gear ratio, and the like are known and registered in the server in advance. In a case other than a certified vehicle, control parameters are not provided and the gear ratio and the like are required to be registered from the above-described equations. Hereinafter, the case of a certified vehicle will be described. In the case of a certified vehicle, the gear ratio registered in advance in the server is referred to as an assumed gear ratio.

Figure 25:
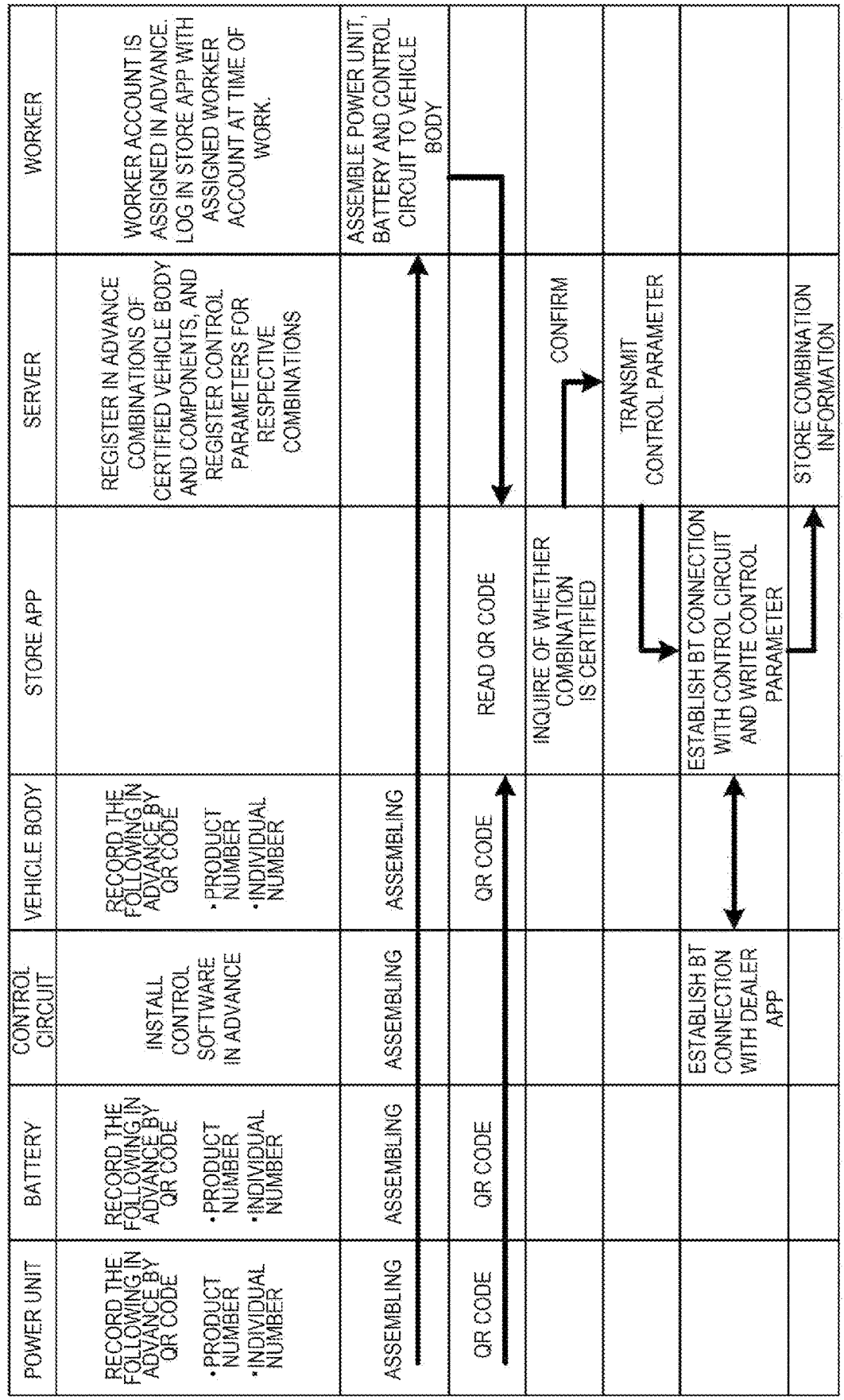
FIG. 25 is a diagram illustrating an example of a flow at the time of assembling an assist device.

First, the flow at the time of assembling will be described. FIG. 25 is a diagram illustrating an example of the flow at the time of assembling of the assist device (the relationship between the devices at the time of assembling is illustrated in FIG. 21).

A worker account is assigned in advance to a worker of the dealer B which assembles the assist device to the vehicle body. The worker logs in the store app of the store tablet 60 with the assigned worker account at the time of the assembling work. The server acquires log-in information for the store app, and records the person and the time of performing the work.

The worker assembles the control circuit, the power unit, and the battery to the vehicle body. The worker reads the QR codes of the vehicle body, the power unit, and the battery using the store tablet 60, in which the store app is installed, at the time of assembling or after the assembling. The store app inquires of the server whether the combination is certified, that is, whether the vehicle is a certified vehicle, based on the product numbers recorded in the QR codes.

When the server receives the inquiry, the server confirms that the inquired combination is a certified combination. When the vehicle is a certified vehicle, the server transmits control parameters associated with the combination to the store app. When the vehicle is not a certified vehicle, a message indicating that the vehicle is not a certified vehicle is transmitted to the store app.

Upon receiving the control parameters, the store app establishes a BT connection (Bluetooth communication) with the control circuit and writes the control parameters to the control circuit. The server stores combination information. In addition, the worker may also save a state of the assembled electric bicycle accordingly. The worker account of the worker of the dealer B may be stored in association with the combination information or the like, and further the user information may be stored in association with the combination information or the like. Such information stored in the server can be acquired from the store tablet 60, in which the store app is installed, at any time in response to a request. The worker of the dealer B performs an assembling check after the assist device is assembled.

Figure 26:
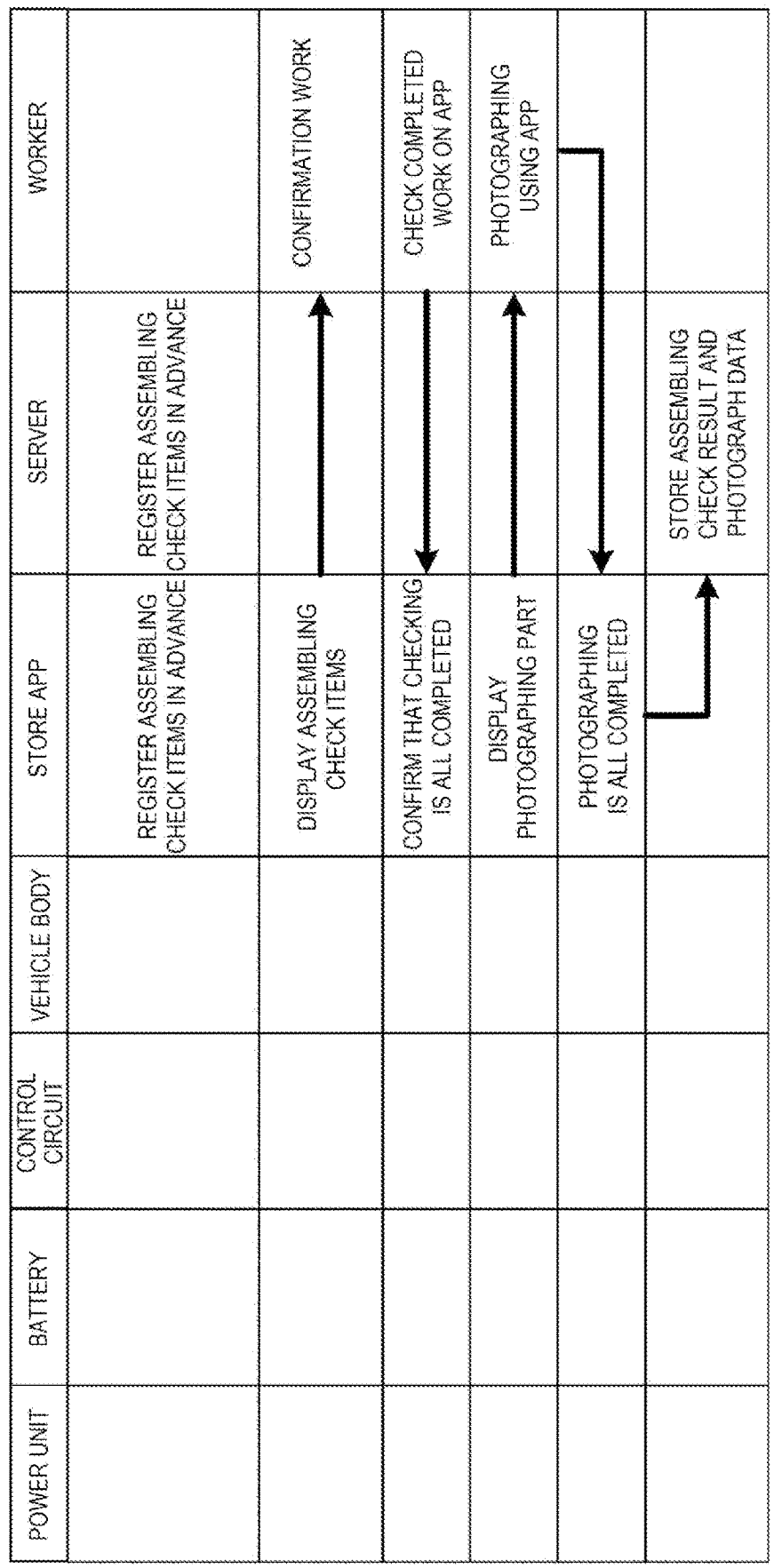
FIG. 26 is a diagram illustrating an example of an assembling check flow at the time of assembling an assist device.

FIG. 26 is a diagram illustrating an example of the assembling check flow at the time of assembling the assist device.

In the store app and the server, assembling check items matching the store are registered in advance. After the assembling, the store app displays the registered assembling check items on the store tablet 60. The worker of the dealer B advances confirmation work according to the check items displayed on the store tablet 60.

FIG. 27 is a diagram illustrating an example of assembling check items displayed on the store tablet 60.

For example, the following 10 items are displayed and exemplified as check items.

"1. Is there looseness or damage in the assist unit?"
"2. Does the assist function perform normally? Is there strange noise?
"3. Is there grease leakage from the assist unit?"
"4. Is there looseness or damage in the connection portion of the electric wiring?"
"5. Is there disconnection of a cord? Is an assembling state to the frame appropriate?"
"6. Does the battery lock key operate?"
"7. Is the assembling state of the battery reliable?"
"8. Is the display lamp turned on? Is an abnormality displayed?"
"9. Does draining of the battery become faster?"
"10. Is it in the maximum gear stage?".

The check items are not limited thereto.

The check item of "10. Is it in the maximum gear stage?" is displayed only when the switching transmission device 30 is provided. This item is for ensuring acquisition of the first gear-ratio-related information to be performed subsequently, and ensuring that the operation check is performed at the maximum gear stage at the time of the operation check.

The worker checks a completed assembling check item on the store app, and the store app confirms that all the assembling checks are completed. Subsequently, the store app displays a photographing part and prompts the worker to photograph the electric bicycle to which the assist device is assembled. For example, as illustrated in FIG. 27, the worker uses the camera of the store tablet 60 to take an entire photograph of the electric bicycle and a photograph of a portion where a vehicle body number is displayed, and stores the captured images. In the store app, when all the photographs are captured, a result (qualified or unqualified) and a date and time of the assembling check are displayed. When the result of the assembling check is qualified, the store app generates information for permitting acquisition of the first gear-ratio-related information or information for prompting acquisition of the first gear-ratio-related information. Here, "qualified" and/or "please perform operation check and gear ratio acquisition" corresponds to this information. The store app transmits the assembling check result and the captured images to the server, and the server stores the assembling check result and the captured images. The worker of the dealer B performs the operation check of the electric bicycle after the assembling check.

Figure 28:
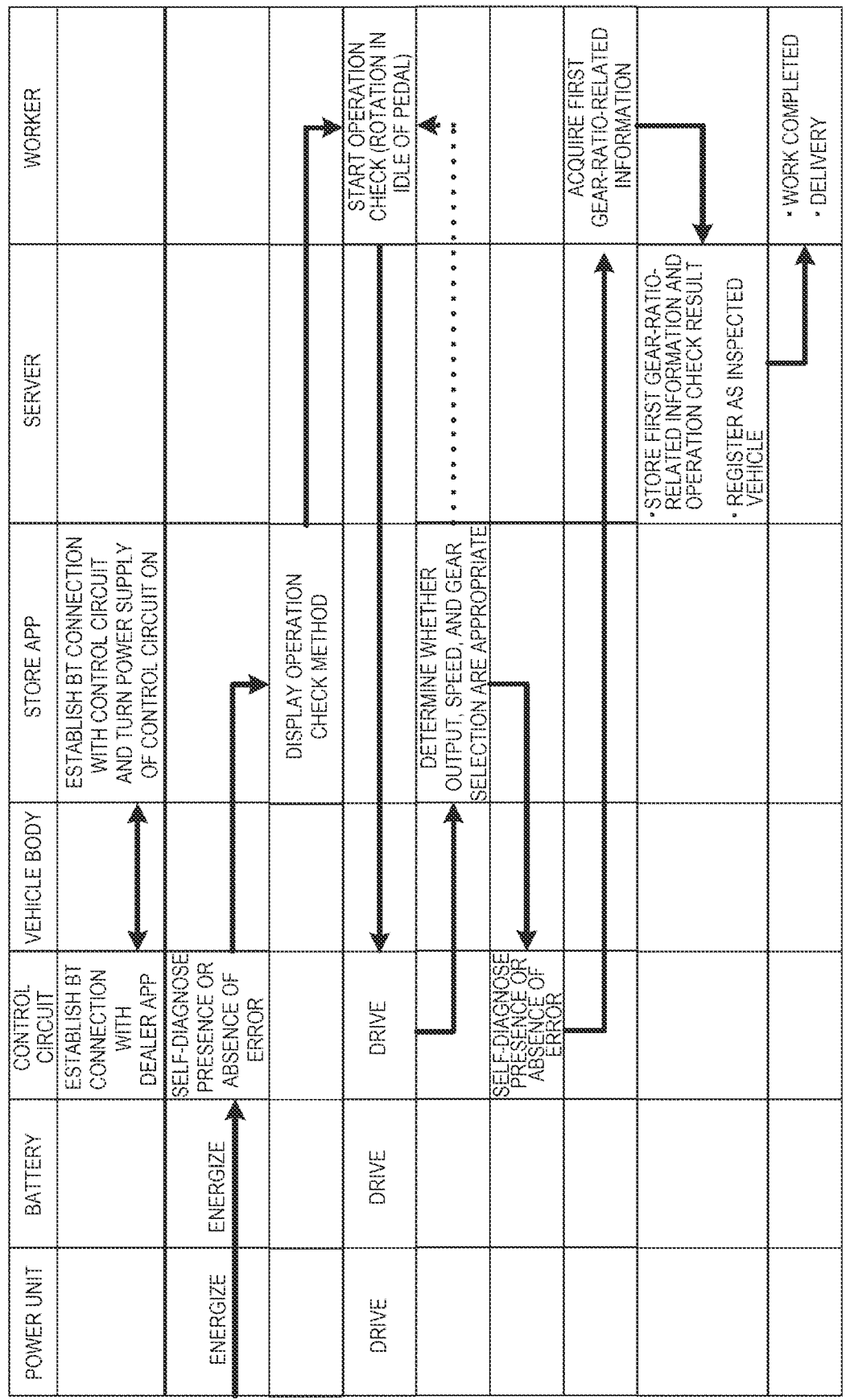
FIG. 28 is a diagram illustrating an example of an operation check flow after assembling of the assist device.

FIG. 28 is a diagram illustrating an example of the operation check flow after the assembling of the assist device.

When the assembling check is completed, the store app establishes a BT connection (Bluetooth communication) with the control circuit and turns on a power supply of the control circuit. The control circuit is energized by the power unit and the battery to perform self-diagnosis of presence or absence of an error, and transmits a diagnosis result to the store app. The store app displays an error code when there is an error, and displays an operation check method on the store tablet 60 when there is no error. The worker of the dealer B advances confirmation work according to the check items displayed on the store tablet 60. The worker of the dealer B rotates the crank pedal in idle by hand in a state where the rear wheel is raised, or rotates the crank pedal in the above-described bench test.

Figure 29:
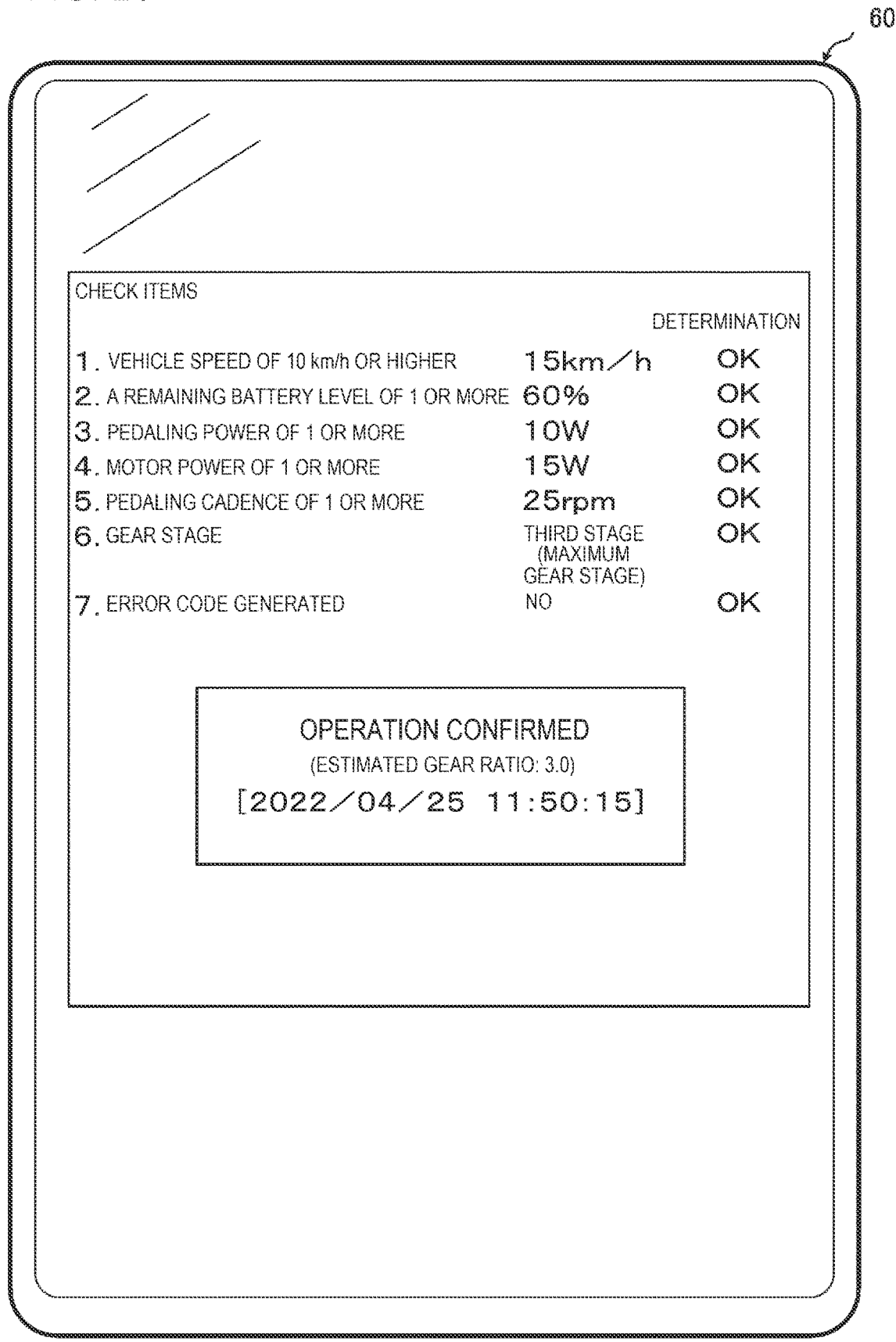
FIG. 29 is a diagram illustrating an example of operation check items displayed on the store tablet 60.

FIG. 29 is a diagram illustrating an example of operation check items displayed on the store tablet 60.

For example, the following 7 items are displayed as check items.

"1. A vehicle speed of 10 km/h or higher"
"2. A remaining battery level of 1 or more"
"3. Pedaling power of 1 or more"
"4. Motor power of 1 or more"
"5. Pedaling cadence of 1 or more"
"6. Gear stage"
"7. Error code generated"

The check items are not limited thereto. "1 or more" is intended to confirm that at least a value larger than 0 is output.

"6. Gear stage" is for ensuring that the acquisition of the first gear-ratio-related information is performed at the maximum gear stage.

When the result of the operation check is that there is an error, the store app displays an error code or prompts work correction or part replacement. When there is no error, for example, a determination result (OK in FIG. 29) for each item and a determination result (operation confirmed in FIG. 29) for all items are displayed. The store app preferably displays a date and time when the determination is made, together with the determination results. The store app may display the gear ratio (an estimated gear ratio) calculated by rotation in idle together with or separately from the display of the determination results. The gear ratio (the estimated gear ratio) is the first gear-ratio-related information described above. In the case of a certified vehicle, since an assumed gear ratio can be obtained, it is possible to confirm whether the gear ratio (the estimated gear ratio) is the same as the assumed gear ratio by comparing the gear ratio (the estimated gear ratio) with the assumed gear ratio. In the case of a certified vehicle, the gear ratio (the estimated gear ratio) calculated by rotation in idle and the assumed gear ratio should be the same value. Accordingly, probability of the gear ratio as the first gear-ratio-related information can be improved, and the first gear-ratio-related information and the second gear-ratio-related information after delivery of the electric bicycle can be compared more accurately.

After acquiring the first gear-ratio-related information, the store app transmits the operation check result and the first gear-ratio-related information (the estimated gear ratio) to the server, and the server stores the operation check result and the first gear-ratio-related information. When the operation check is completed, the server registers the electric bicycle as an inspected electric bicycle. The worker of the dealer B ends the work and delivers the electric bicycle to the user.

Although various embodiments have been described above with reference to the drawings, it is needless to say that the present invention is not limited to these examples. It is apparent that those skilled in the art can conceive of various modifications and changes within the scope described in the claims, and it is understood that such modifications and changes naturally fall within the technical scope of the present invention. In addition, respective constituent elements in the above-described embodiments may be freely combined without departing from the gist of the invention.

For example, although the electric bicycle 10 is exemplified as a vehicle, the present invention is not limited thereto, and the vehicle may be a two-wheeled vehicle without input from the crank pedal 79, a three-wheeled vehicle other than the two-wheeled vehicle, or a four-wheeled vehicle.

In the management method of the electric bicycle 10, the reference value setting processing and the abnormality determination processing of the power transmission mechanism described above may be performed based on the gear ratio of a part of the power transmission mechanism T from the sleeve 26 to the rear wheel 78 without being limited to the gear ratio information related to the gear ratio of the entire power transmission mechanism T.

Further, although the case where the non-electric bicycle after sale is retrofitted with the assist device has been described in the embodiments described above, the present invention is not necessarily limited to the non-electric bicycle after sale, and can also be applied to a completed vehicle obtained by assembling, at a dealer or the like, the assist device to a non-electric bicycle which is a new vehicle. The present invention can also be applied to a completed vehicle manufactured in a factory (that is, an electric bicycle completed vehicle factory) of assembling the assist device which is the same site where the vehicle body is manufactured.

In the present specification, at least the following matters are described. Although corresponding constituent elements or the like in the above-described embodiments are shown in parentheses, the present invention is not limited thereto.

(1) A vehicle management method, including:
assembling a vehicle body of a vehicle and a power source (power unit 20) to be mounted on the vehicle (assembling step S101);
acquiring, at a first time, first gear-ratio-related information (reference composite gear ratio Rc1) which is information (composite gear ratio Rc, vehicle speed No', and travel distance L) related to a gear ratio of a transmission section, the transmission section being a whole or part of a power transmission mechanism (power transmission mechanism T) between the power source and a wheel of the vehicle (first gear-ratio-related information acquisition step S103);
storing the first gear-ratio-related information in a storage unit (memory of the control circuit 40) mounted on the vehicle or a storage unit (memory of a server or memory of the portable terminal 8) of an external device provided to be capable of communication with the vehicle (first gear-ratio-related information storage step S105);
acquiring, at a second time (after assembling) after the first time (time of assembling), second gear-ratio-related information (present composite gear ratio Rc2) which is information (composite gear ratio Rc, vehicle speed No', and travel distance L) related to the gear ratio of the transmission section (second gear-ratio-related information acquisition step S109); and
comparing the first gear-ratio-related information stored in the storage unit with the second gear-ratio-related information (gear-ratio-related information comparison step S111).

According to (1), by comparing the first gear-ratio-related information and the second gear-ratio-related information acquired at different times, it is possible to manage the remodeling and improvement after the assembling, which may cause the regulation non-compliance state. Accordingly, even when the vehicle retrofitted with the power source is remodeled or improved, it is possible to detect the remodeling or improvement. In addition, even an electric bicycle sold as a completed vehicle for which remodeling and improvement are generally difficult is assumingly remodeled or improved, the remodeling and improvement thereof can be detected similarly to a retrofitted vehicle.

The "storage unit mounted on the vehicle" is not limited to the memory of the control circuit 40 of the above-described embodiments, and may be a storage unit of a portable terminal (for example, a smartphone) of an occupant riding the vehicle. The portable terminal of the occupant may be detachably attached to the vehicle body, or may be attached (stored) to the occupant himself/herself or a wearing article (clothes, bag) of the occupant.

In addition, "capable of communication with the vehicle" may be capability of communication with a portable terminal of an occupant riding the vehicle, or may be capability of communication with a portable terminal attached (stored) to the occupant himself/herself or a wearing article (clothes, bag) of the occupant.

The "comparing" can be executed at any time after the second time. The "storing" can be executed at any time before the "comparing" after the "first time".

(2) The vehicle management method according to (1), further including:
(A) executing at least one of (i) to (iii) when the first gear-ratio-related information and the second gear-ratio-related information are different from each other (abnormality determination step S113),
(i) determining the power transmission mechanism as abnormal,
(ii) generating information for suppressing or prohibiting driving using the power transmission mechanism, and
(iii) generating information for reporting to at least one of an occupant of the vehicle, an assembling worker of the vehicle body and the power source, a manufacturer of the vehicle, a manufacturer of the power source, a manager of the vehicle, a manager of the power source, a party which certifies the vehicle, or a regulatory party of the vehicle,
or
(B) executing at least one of (iv) to (vi) when the first gear-ratio-related information and the second gear-ratio-related information are not different from each other,
(iv) determining the power transmission mechanism as normal,
(v) generating information for permitting driving using the power transmission mechanism, and
(vi) generating information for notifying at least one of an occupant of the vehicle, an assembling worker of the vehicle body and the power source, a manufacturer of the vehicle, a manufacturer of the power source, a manager of the vehicle, a manager of the power source, a party which certifies the vehicle, or a regulatory party of the vehicle.

According to (A) of (2), it is possible to detect a state of the vehicle not complying with the regulations by the processing of (i), it is possible to avoid the vehicle from being used in the state of not complying with the regulations by the processing of (ii), and it is possible for the occupant or the like to recognize, by the processing of (iii), that remodeling and improvement causing the regulation non-compliance state are performed on the vehicle. Further, according to (B) of (2), it is possible to detect a state of the vehicle complying with the regulations by the processing of (iv), it is possible to permit using the vehicle in the state of complying with the regulations by the processing of (v), and it is possible for the occupant or the like to recognize, by the processing of (vi), that remodeling and improvement causing the regulation non-compliance state are not performed on the vehicle.

In addition, the "reporting" has a high degree of urgency, and is preferably performed even when there is no request from a reporting destination. On the other hand, the "notifying" has a low urgency, and is preferably performed when there is a request from a notification destination.

(3) The vehicle management method according to (1) or (2), in which
the second gear-ratio-related information is acquired based on:
a rotation state amount (rotation speed Ni) of a first portion (sleeve 26) in the transmission section; and
a rotation state amount (rotation speed No) of a second portion (rear wheel 78) in the transmission section, the second portion being on a side of the wheel rather than the first portion.

According to (3), the second gear-ratio-related information can be acquired with high accuracy.

Regarding the "rotation state amount of a second portion" and the "the second portion being on a side of the wheel", the rotation state amount is detected by the rear wheel rotation speed sensor SE3 disposed downstream of the second one-way clutch 32 in the above-described embodiments. However, the rear wheel rotation speed sensor SE3 may be disposed upstream of the second one-way clutch 32 (downstream of a gearbox when the gearbox is provided). By disposing the rear wheel rotation speed sensor SE3 downstream of the second one-way clutch 32, the vehicle speed can be always accurately detected. On the other hand, by disposing the rear wheel rotation speed sensor SE3 upstream of the second one-way clutch 32, the accuracy of calculation of the gear ratio is improved.

(4) The vehicle management method according to any one of (1) to (3), further including:
generating (second gear-ratio-related information display step S121), at a third time after the second time,
information for displaying the second gear-ratio-related information on a display unit of the vehicle, a display unit of a terminal device provided to be capable of communication with the vehicle, or a display unit of a terminal device provided to be capable of communication with the external device, or
information for displaying information indicating that the second gear-ratio-related information is different or not different from the first gear-ratio-related information, on a display unit of the vehicle, a display unit of a terminal device provided to be capable of communication with the vehicle, or a display unit of a terminal device provided to be capable of communication with the external device.

According to (4), the regulatory body and the like can easily determine that the second gear-ratio-related information is different or not different from the first gear-ratio-related information.

(5) The vehicle management method according to any one of (1) to (4), further including:
setting (generation torque setting step S107), at a fourth time before the second time, a generation power amount (generation torque) to be generated by the power source in a control unit (control circuit 40) configured to control the power source.

According to (5), it is possible to set the generation power amount complying with the regulations.

(6) The vehicle management method according to (5), further including:
generating (target torque display step S123), at a fifth time after the fourth time,
information for displaying the generation power amount on a display unit of the vehicle, a display unit of a terminal device provided to be capable of communication with the vehicle, or a display unit of a terminal device provided to be capable of communication with the external device, or
information for displaying information indicating that the generation power amount (target torque) is different or not different from the generation power amount (generation torque) set at the fourth time, on a display unit of the vehicle, a display unit of a terminal device provided to be capable of communication with the vehicle, or a display unit of a terminal device provided to be capable of communication with the external device.

According to (6), the regulatory body and the like can easily determine that the generation power amount is different or not different from the generation power amount complying with the regulations.

(7) The vehicle management method according to (5) or (6), the generation power amount being set for each speed or each speed range of the vehicle, the method further including:
acquiring (vehicle speed acquisition step S115), at a sixth time after the fourth time, a present speed of the vehicle; and
determining (target torque setting step S117) an instruction generation power amount instructing the power source based on the present speed and the generation power amount (generation torque) which is set, by the control unit.

According to (7), optimal assist corresponding to the present speed can be implemented while complying with the regulations.

(8) The vehicle management method according to (7), the generation power amount being an upper limit generation power amount (generation torque) set for the each speed or the each speed range, the method further including:
determining (target torque setting step S117) the instruction generation power amount (target torque) based on the present speed and the upper limit generation power amount, which is set, by the control unit.

According to (8), the maximum assist can be implemented while complying with the regulations.

(9) The vehicle management method according to any one of (1) to (8), further including:
estimating (wheel output estimation step S135), at a seventh time after the second time, an output power amount (wheel output) to be output from the wheel based on the second gear-ratio-related information.

According to (9), the regulatory body and the like can determine, based on the output power amount output from the wheel, whether the vehicle complies with the regulations.

(10) The vehicle management method according to (9), further including:
storing (wheel output storage step S137), at an eighth time after the seventh time, the output power amount which is estimated in the storage unit.

According to (10), a record of the output power amount can be easily acquired by storing the output power amount.

(11) The vehicle management method according to (10), further including:
generating (wheel output display step S139), at a ninth time after the eighth time,
information for displaying the output power amount on a display unit of the vehicle, a display unit of a terminal device provided to be capable of communication with the vehicle, or a display unit of a terminal device provided to be capable of communication with the external device, or information for displaying information indicating that the output power amount exceeds or does not exceed an upper limit generation output power amount set at a tenth time before the seventh time, on a display unit of the vehicle, a display unit of a terminal device provided to be capable of communication with the vehicle, or a display unit of a terminal device provided to be capable of communication with the external device.

According to (11), the regulatory body and the like can easily determine that the output power amount exceeds or does not exceed the upper limit generation output power amount.

(12) The vehicle management method according to any one of (1) to (11), in which
the power transmission mechanism includes a switching transmission device (switching transmission device 30) capable of switching a plurality of gear stages.

According to (12), the speed change is possible, and the convenience of the vehicle is improved.

(13) The vehicle management method according to (12), in which
when a gear stage of the switching transmission device is a maximum gear stage having a maximum gear ratio among the plurality of gear stages, the first gear-ratio-related information or the second gear-ratio-related information is acquired.

According to (13), by comparing the first gear-ratio-related information and the second gear-ratio-related information that are based on the maximum gear stage, the regulation non-compliance state can be determined most accurately.

(14) The vehicle management method according to (12) or (13), further including:
estimating, at an eleventh time after the second time, a gear stage based on the second gear-ratio-related information.

According to (14), the gear stage can be grasped even without a sensor.

(15) The vehicle management method according to (14), in which
assuming the number of the plurality of gear stages as n, n determination ranges are set within a range of values that the second gear-ratio-related information takes, and when the second gear-ratio-related information is included in an m-th determination range of the n determination ranges, the gear stage is estimated to be an m-th stage.

According to (15), it is possible to acquire the second gear-ratio-related information at the maximum gear stage at which the vehicle is likely to be in the state of not complying with the regulations, and it is possible to more accurately determine the state of the electric bicycle not complying with the regulations.

(16) The vehicle management method according to (14) or (15), in which:
a one-way power transmission unit is provided on the transmission section;
the one-way power transmission unit (second one-way clutch 32) enters an engaged state when rotation power in a forward direction on a side of the switching transmission device is input to a side of the wheel, and enters a non-engaged state when rotation power in a reverse direction on a side of the switching transmission device is input to the side of the wheel;
the one-way power transmission unit enters a non-engaged state when rotation power in a forward direction on a side of the wheel is input to a side of the switching transmission device, and enters an engaged state when rotation power in a reverse direction on side of the wheel is input to the side of the switching transmission device; and
the gear stage is estimated when the one-way power transmission unit is in the engaged state.

According to (16), the gear ratio at the time of estimating the gear stage can be appropriately acquired.

(17) The vehicle management method according to any one of (1) to (16), in which:
a one-way power transmission unit is provided on the transmission section;
the one-way power transmission unit (second one-way clutch 32) enters an engaged state when rotation power in a forward direction on a side of the switching transmission device is input to a side of the wheel, and enters a non-engaged state when rotation power in a reverse direction on a side of the switching transmission device is input to the side of the wheel;
the one-way power transmission unit enters a non-engaged state when rotation power in a forward direction on a side of the wheel is input to a side of the switching transmission device, and enters an engaged state when rotation power in a reverse direction on the side of the wheel is input to the side of the switching transmission device;
the second gear-ratio-related information is acquired based on:
a rotation state amount of a first portion (rotation speed of motor M) in the transmission section, the first portion being on a side of the power source rather than the one-way power transmission unit, and
a rotation state amount of a second portion (rotation speed of rear wheel 78) in the transmission section, the second portion being on the side of the wheel rather than the one-way power transmission unit; and
the second gear-ratio-related information is acquired when the one-way power transmission unit is in the engaged state.

According to (17), the second gear-ratio-related information can be acquired appropriately.

(18) The vehicle management method according to any one of (1) to (17), including:
acquiring, at a twelfth time before or after the first time, assumed gear-ratio-related information which is information related to the gear ratio assumed when the vehicle body and the power source are assembled; and
comparing, at a thirteenth time which is after the twelfth time and after the first time, the assumed gear-ratio-related information with the first gear-ratio-related information.

According to (18), probability of the first gear-ratio-related information can be improved, and the comparison between the first gear-ratio-related information and the second gear-ratio-related information can be more accurately performed. The acquisition of the assumed gear-ratio-related information may be before or after acquisition (first time) of a first gear ratio.

(19) The vehicle management method according to any one of (1) to (18), including:
acquiring vehicle body identification information which is identification information of the vehicle body which has been assembled, and power source identification information which is identification information of the power source which has been assembled; and
storing the vehicle body identification information, the power source identification information, or combination information of the vehicle body identification information and the power source identification information in the storage unit.

According to (19), the vehicle body and the power source can be managed, and it is easy to determine whether the vehicle assembled with the power source is a certified vehicle.

(20) The vehicle management method according to any one of (1) to (19), further including:
acquiring assembling performer identification information which is identification information of an assembling worker of the vehicle body and the power source; and
storing the assembling worker identification information in the storage unit.

According to (20), the assembling worker can be managed. The assembling worker identification information also includes an identification number of an assembling store (organization) to which the assembling worker belongs.

(21) The vehicle management method according to any one of (1) to (20), further including:
acquiring user or the like identification information which is identification information of a user or the like which is a user, an owner, or a manager of the vehicle; and
storing the user or the like identification information in the storage unit.

According to (21), the user or the like can be managed.

(22) The vehicle management method according to any one of (1) to (21), including:
acquiring work information related to assembling work of the vehicle body and the power source or state information related to a state of the vehicle body, the power source or the vehicle after being assembled, from an assembling worker terminal (store tablet 60) which is provided to be capable of communication with the vehicle or an external device (server) different from the vehicle and which includes an information input unit configured to receive an input of information from an assembling worker of the vehicle body and the power source.

According to (22), the work information or the state information can be managed.

(23) The vehicle management method according to (22), the assembling worker terminal further including an imaging unit (camera), the method including:
acquiring imaging information of the vehicle body, the power source, or the vehicle after being assembled which is imaged by the imaging unit.

According to (23), as the imaging information, a more objective record of the assembling work can be kept. The imaging unit obtains at least one of a still image and a moving image.

(24) The vehicle management method according to (22) or (23), including:
determining that assembling of the vehicle body and the power source is appropriately completed, based on the work information or the state information; and
generating information for permitting acquisition of the first gear-ratio-related information, or information for prompting the assembling worker to acquire the first gear-ratio-related information.

According to (24), the first gear-ratio-related information can be acquired at an appropriate timing.

(25) The vehicle management method according to any one of (1) to (21), in which:

the power source includes:
an input part (crank pedal 79) configured to receive an input power from an occupant; and
an electric motor (motor M) provided in parallel with the input part; and
the first gear-ratio-related information or the second gear-ratio-related information is acquired when the input part receives an input power.

According to (25), the second gear-ratio-related information can be acquired appropriately. The input power from the occupant may be a stepping input power other than by pedal or an input power by hand.

(26) A vehicle management method, including:
assembling a vehicle body of a vehicle and a power source to be mounted on the vehicle;
acquiring gear-ratio-related information which is information related to a gear ratio of a transmission section including a switching transmission device, the switching transmission device being included in a power transmission mechanism of the power source and a wheel of the vehicle and being capable of switching n gear stages; and
estimating a gear stage based on the gear-ratio-related information.

According to (26), the gear stage can be grasped even without a sensor.

(27) The vehicle management method according to (26), in which
n determination ranges are set within a range of values that the gear-ratio-related information takes; and
when the gear-ratio-related information is included in an m-th determination range of the n determination ranges, the gear stage is estimated to be an m-th stage.

According to (27), the gear stage can be grasped even without a sensor.

The present application is based on Japanese Patent Application No. 2021-038636 filed on Mar. 10, 2021 the contents of which are incorporated herein as reference.

REFERENCE SIGNS LIST 20 power unit (power source)
26 sleeve (first portion)
30 switching transmission device
40 control circuit (control unit)
78 rear wheel (second portion)
S101 assembling step
S103 first gear-ratio-related information acquisition step
S105 first gear-ratio-related information storage step
S107 generation torque setting step
S109 second gear-ratio-related information acquisition step
S111 gear-ratio-related information comparison step
S113 abnormality determination step
S115 vehicle speed acquisition step
S117 target torque setting step
S123 target torque display step
S121 second gear-ratio-related information display step
S135 wheel output estimation step
S137 vehicle output storage step
S141 gear stage estimation step
Rc gear ratio (information related to gear ratio)
No' vehicle speed (information related to gear ratio)
L travel distance (information related to gear ratio)
Rc1 reference composite gear ratio (first gear-ratio-related information)

Rc2 present composite gear ratio (second gear-ratio-related information)
M motor (electric motor)
T power transmission mechanism

The invention claimed is:

1. A vehicle management method, comprising:
assembling a vehicle body of a vehicle and a power source to be mounted on the vehicle;
acquiring, at a first time, first gear-ratio-related information which is information related to a gear ratio of a transmission section, the transmission section being a whole or part of a power transmission mechanism between the power source and a wheel of the vehicle;
storing the first gear-ratio-related information in a storage unit mounted on the vehicle or a storage unit of an external device provided to be capable of communication with the vehicle;
acquiring, at a second time after the first time, second gear-ratio-related information which is information related to the gear ratio of the transmission section; and
comparing the first gear-ratio-related information stored in the storage unit with the second gear-ratio-related information,
wherein the method further comprises:
(A) executing at least one of (i) to (iii) when the first gear-ratio-related information and the second gear-ratio-related information are different from each other,
  (i) determining the power transmission mechanism as abnormal,
  (ii) generating for suppressing or prohibiting driving using the power transmission mechanism, and
  (iii) generating information for reporting to at least one of an occupant of the vehicle, an assembling worker of the vehicle body and the power source, a manufacturer of the vehicle, a manufacturer of the power source, a manager of the vehicle, a manager of the power source, a party which certifies the vehicle, or a regulatory party of the vehicle,
or
(B) executing at least one of (iv) to (vi) when the first gear-ratio-related information and the second gear-ratio-related information are not different from each other,
  (iv) determining the power transmission mechanism as normal,
  (v) generating information for permitting driving using the power transmission mechanism, and
  (vi) generating information for notifying at least one of an occupant of the vehicle, an assembling worker of the vehicle body and the power source, a manufacturer of the vehicle, a manufacturer of the power source, a manager of the vehicle, a manager of the power source, a party which certifies the vehicle, or a regulatory party of the vehicle.

2. A vehicle management method, comprising:
assembling a vehicle body of a vehicle and a power source to be mounted on the vehicle;
acquiring, at a first time, first gear-ratio-related information which is information related to a gear ratio of a transmission section, the transmission section being a whole or part of a power transmission mechanism between the power source and a wheel of the vehicle;
storing the first gear-ratio-related information in a storage unit mounted on the vehicle or a storage unit of an external device provided to be capable of communication with the vehicle;
acquiring, at a second time after the first time, second gear-ratio-related information which is information related to the gear ratio of the transmission section;
comparing the first gear-ratio-related information stored in the storage unit with the second gear-ratio-related information; and
setting, at a fourth time before the second time, a generation power amount to be generated by the power source in a control unit configured to control the power source.

3. The vehicle management method according to claim 2, further comprising:
generating, at a fifth time after the fourth time,
  information for displaying the generation power amount on a display unit of the vehicle, a display unit of a terminal device provided to be capable of communication with the vehicle, or a display unit of a terminal device provided to be capable of communication with the external device, or
  information for displaying information indicating that the generation power amount is different or not different from the generation power amount set at the fourth time, on a display unit of the vehicle, a display unit of a terminal device provided to be capable of communication with the vehicle, or a display unit of a terminal device provided to be capable of communication with the external device.

4. The vehicle management method according to claim 2, the generation power amount being set for each speed or each speed range of the vehicle, the method further comprising:
acquiring, at a sixth time after the fourth time, a present speed of the vehicle; and
determining an instruction generation power amount instructing the power source based on the present speed and the generation power amount, which is set, by the control unit.

5. The vehicle management method according to claim 4, the generation power amount being an upper limit generation power amount set for the each speed or the each speed range, the method further comprising:
determining the instruction generation power amount based on the present speed and the upper limit generation power amount, which is set, by the control unit.

6. A vehicle management method, comprising:
assembling a vehicle body of a vehicle and a power source to be mounted on the vehicle;
acquiring, at a first time, first gear-ratio-related information which is information related to a gear ratio of a transmission section, the transmission section being a whole or part of a power transmission mechanism between the power source and a wheel of the vehicle;
storing the first gear-ratio-related information in a storage unit mounted on the vehicle or a storage unit of an external device provided to be capable of communication with the vehicle;
acquiring, at a second time after the first time, second gear-ratio-related information which is information related to the gear ratio of the transmission section;
comparing the first gear-ratio-related information stored in the storage unit with the second gear-ratio-related information; and estimating, at a seventh time after the second time, an output power amount to be output from the wheel based on the second gear-ratio-related information.

7. The vehicle management method according to claim 6, further comprising:
storing, at an eighth time after the seventh time, the output power amount which is estimated in the storage unit.

8. The vehicle management method according to claim 7, further comprising:
generating, at a ninth time after the eighth time,
information for displaying the output power amount on a display unit of the vehicle, a display unit of a terminal device provided to be capable of communication with the vehicle, or a display unit of a terminal device provided to be capable of communication with the external device, or
information for displaying information indicating that the output power amount exceeds or does not exceed an upper limit generation output power amount set at a tenth time before the seventh time, on a display unit of the vehicle, a display unit of a terminal device provided to be capable of communication with the vehicle, or a display unit of a terminal device provided to be capable of communication with the external device.

9. A vehicle management method, comprising:
assembling a vehicle body of a vehicle and a power source to be mounted on the vehicle;
acquiring, at a first time, first gear-ratio-related information which is information related to a gear ratio of a transmission section, the transmission section being a whole or part of a power transmission mechanism between the power source and a wheel of the vehicle;
storing the first gear-ratio-related information in a storage unit mounted on the vehicle or a storage unit of an external device provided to be capable of communication with the vehicle;
acquiring, at a second time after the first time, second gear-ratio-related information which is information related to the gear ratio of the transmission section; and
comparing the first gear-ratio-related information stored in the storage unit with the second gear-ratio-related information,
wherein the power transmission mechanism includes a switching transmission device capable of switching a plurality of gear stages.

10. The vehicle management method according to claim 9, wherein
when a gear stage of the switching transmission device is a maximum gear stage having a maximum gear ratio among the plurality of gear stages, the first gear-ratio-related information or the second gear-ratio-related information is acquired.

11. The vehicle management method according to claim 9, further comprising:
estimating, at an eleventh time after the second time, a gear stage based on the second gear-ratio-related information.

12. The vehicle management method according to claim 11, wherein
assuming the number of the plurality of gear stages as n which is a natural number equal to or greater than two, n determination ranges, which are the same number of the number of the plurality of the gear stages, are set within a range of values that the second gear-ratio-related information takes, and when the second gear-ratio-related information is included in an m-th determination range of the n determination ranges, the gear stage is estimated to be an m-th stage.

13. The vehicle management method according to claim 11, wherein
a one-way power transmission unit is provided on the transmission section,
the one-way power transmission unit enters an engaged state when rotation power in a forward direction on a side of the switching transmission device is input to a side of the wheel, and enters a non-engaged state when rotation power in a reverse direction on a side of the switching transmission device is input to the side of the wheel,
the one-way power transmission unit enters a non-engaged state when rotation power in a forward direction on a side of the wheel is input to a side of the switching transmission device, and enters an engaged state when rotation power in a reverse direction on the side of the wheel is input to the side of the switching transmission device, and
the gear stage is estimated when the one-way power transmission unit is in the engaged state.

14. A vehicle management method, comprising:
assembling a vehicle body of a vehicle and a power source to be mounted on the vehicle;
acquiring, at a first time, first gear-ratio-related information which is information related to a gear ratio of a transmission section, the transmission section being a whole or part of a power transmission mechanism between the power source and a wheel of the vehicle;
storing the first gear-ratio-related information in a storage unit mounted on the vehicle or a storage unit of an external device provided to be capable of communication with the vehicle;
acquiring, at a second time after the first time, second gear-ratio-related information which is information related to the gear ratio of the transmission section;
comparing the first gear-ratio-related information stored in the storage unit with the second gear-ratio-related information;
acquiring, at a twelfth time before or after the first time, assumed gear-ratio-related information which is information related to the gear ratio assumed when the vehicle body and the power source are assembled; and
comparing, at a thirteenth time which is after the twelfth time and after the first time, the assumed gear-ratio-related information with the first gear-ratio-related information.

15. A vehicle management method, comprising:
assembling a vehicle body of a vehicle and a power source to be mounted on the vehicle;
acquiring, at a first time, first gear-ratio-related information which is information related to a gear ratio of a transmission section, the transmission section being a whole or part of a power transmission mechanism between the power source and a wheel of the vehicle;
storing the first gear-ratio-related information in a storage unit mounted on the vehicle or a storage unit of an external device provided to be capable of communication with the vehicle;
acquiring, at a second time after the first time, second gear-ratio-related information which is information related to the gear ratio of the transmission section;
comparing the first gear-ratio-related information stored in the storage unit with the second gear-ratio-related information; and acquiring work information related to assembling work of the vehicle body and the power source or state information related to a state of the vehicle body, the power source or the vehicle after being assembled, from an assembling worker terminal which is provided to be capable of communication with the vehicle or an external device different from the vehicle and which includes an information input unit configured to receive an input of information from an assembling worker of the vehicle body and the power source.

16. The vehicle management method according to claim 15, the assembling worker terminal further including an imaging unit, the method comprising:
acquiring imaging information of the vehicle body, the power source, or the vehicle after being assembled which is imaged by the imaging unit.

17. The vehicle management method according to claim 15, comprising:
determining that assembling of the vehicle body and the power source is appropriately completed, based on the work information or the state information; and
generating information for permitting acquisition of the first gear-ratio-related information, or information for prompting the assembling worker to acquire the first gear-ratio-related information.

18. A vehicle management method, comprising:
assembling a vehicle body of a vehicle and a power source to be mounted on the vehicle;
acquiring, at a first time, first gear-ratio-related information which is information related to a gear ratio of a transmission section, the transmission section being a whole or part of a power transmission mechanism between the power source and a wheel of the vehicle;
storing the first gear-ratio-related information in a storage unit mounted on the vehicle or a storage unit of an external device provided to be capable of communication with the vehicle;
acquiring, at a second time after the first time, second gear-ratio-related information which is information related to the gear ratio of the transmission section; and
comparing the first gear-ratio-related information stored in the storage unit with the second gear-ratio-related information, wherein
the second gear-ratio-related information is acquired based on:
a rotation state amount of a first portion in the transmission section; and
a rotation state amount of a second portion in the transmission section, the second portion being on a side of the wheel rather than the first portion.

19. A vehicle management method, comprising:
assembling a vehicle body of a vehicle and a power source to be mounted on the vehicle;
acquiring, at a first time, first gear-ratio-related information which is information related to a gear ratio of a transmission section, the transmission section being a whole or part of a power transmission mechanism between the power source and a wheel of the vehicle;
storing the first gear-ratio-related information in a storage unit mounted on the vehicle or a storage unit of an external device provided to be capable of communication with the vehicle;
acquiring, at a second time after the first time, second gear-ratio-related information which is information related to the gear ratio of the transmission section;
comparing the first gear-ratio-related information stored in the storage unit with the second gear-ratio-related information; and
generating, at a third time after the second time,
information for displaying the second gear-ratio-related information on a display unit of the vehicle, a display unit of a terminal device provided to be capable of communication with the vehicle, or a display unit of a terminal device provided to be capable of communication with the external device, or
information for displaying information indicating that the second gear-ratio-related information is different or not different from the first gear-ratio-related information, on a display unit of the vehicle, a display unit of a terminal device provided to be capable of communication with the vehicle, or a display unit of a terminal device provided to be capable of communication with the external device.

20. A vehicle management method, comprising:
assembling a vehicle body of a vehicle and a power source to be mounted on the vehicle;
acquiring, at a first time, first gear-ratio-related information which is information related to a gear ratio of a transmission section, the transmission section being a whole or part of a power transmission mechanism between the power source and a wheel of the vehicle;
storing the first gear-ratio-related information in a storage unit mounted on the vehicle or a storage unit of an external device provided to be capable of communication with the vehicle;
acquiring, at a second time after the first time, second gear-ratio-related information which is information related to the gear ratio of the transmission section; and
comparing the first gear-ratio-related information stored in the storage unit with the second gear-ratio-related information, wherein
a one-way power transmission unit is provided on the transmission section,
the one-way power transmission unit enters an engaged state when rotation power in a forward direction on a side of the power source is input to a side of the wheel, and enters a non-engaged state when rotation power in a reverse direction on a side of the power source is input to the side of the wheel,
the one-way power transmission unit enters a non-engaged state when rotation power in a forward direction on a side of the wheel is input to a side of the power source, and enters an engaged state when rotation power in a reverse direction on the side of the wheel is input to the side of the power source,
the second gear-ratio-related information is acquired based on:
a rotation state amount of a first portion in the transmission section, the first portion being on a side of the power source rather than the one-way power transmission unit; and
a rotation state amount of a second portion in the transmission section, the second portion being on the side of the wheel rather than the one-way power transmission unit, and
the second gear-ratio-related information is acquired when the one-way power transmission unit is in the engaged state.

21. A vehicle management method, comprising:
assembling a vehicle body of a vehicle and a power source to be mounted on the vehicle;

acquiring, at a first time, first gear-ratio-related information which is information related to a gear ratio of a transmission section, the transmission section being a whole or part of a power transmission mechanism between the power source and a wheel of the vehicle;
storing the first gear-ratio-related information in a storage unit mounted on the vehicle or a storage unit of an external device provided to be capable of communication with the vehicle;
acquiring, at a second time after the first time, second gear-ratio-related information which is information related to the gear ratio of the transmission section; and
comparing the first gear-ratio-related information stored in the storage unit with the second gear-ratio-related information, wherein
the power source includes:
an input part configured to receive an input power from an occupant; and
an electric motor provided in parallel with the input part, and
the first gear-ratio-related information or the second gear-ratio-related information is acquired when the input part receives an input power.

22. A vehicle management method, comprising:
assembling a vehicle body of a vehicle and a power source to be mounted on the vehicle;
acquiring, at a first time, first gear-ratio-related information which is information related to a gear ratio of a transmission section, the transmission section being a whole or part of a power transmission mechanism between the power source and a wheel of the vehicle;
storing the first gear-ratio-related information in a storage unit mounted on the vehicle or a storage unit of an external device provided to be capable of communication with the vehicle;
acquiring, at a second time after the first time, second gear-ratio-related information which is information related to the gear ratio of the transmission section; and
comparing the first gear-ratio-related information stored in the storage unit with the second gear-ratio-related information, wherein the method further comprises:
acquiring vehicle body identification information which is identification information of the vehicle body which has been assembled, and power source identification information which is identification information of the power source which has been assembled, and storing the vehicle body identification information, the power source identification information, or combination information of the vehicle body identification information and the power source identification information in the storage unit;
acquiring assembling worker identification information which is identification information of an assembling worker of the vehicle body and the power source, and storing the assembling worker identification information in the storage unit; or
acquiring user or the like identification information which is identification information of a user or the like which is a user, an owner, or a manager of the vehicle, and storing the user or the like identification information in the storage unit.

23. A vehicle management method, comprising:
assembling a vehicle body of a vehicle and a power source to be mounted on the vehicle;
acquiring gear-ratio-related information which is information related to a gear ratio of a transmission section including a switching transmission device, the switching transmission device being included in a power transmission mechanism of the power source and a wheel of the vehicle and being capable of switching n gear stages; and
estimating a gear stage based on the gear-ratio-related information, wherein
n determination ranges are set within a range of values that the gear-ratio-related information takes, and
when the gear-ratio-related information is included in an m-th determination range of the n determination ranges, the gear stage is estimated to be an m-th stage.

* * * * *